(12) United States Patent
Park

(10) Patent No.: US 12,212,829 B2
(45) Date of Patent: Jan. 28, 2025

(54) CAMERA MODULE AND OPTICAL INSTRUMENT COMPRISING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 51 days.

(21) Appl. No.: 17/928,049

(22) PCT Filed: Jun. 15, 2021

(86) PCT No.: PCT/KR2021/007451
§ 371 (c)(1),
(2) Date: Nov. 28, 2022

(87) PCT Pub. No.: WO2021/256819
PCT Pub. Date: Dec. 23, 2021

(65) Prior Publication Data
US 2023/0217106 A1 Jul. 6, 2023

(30) Foreign Application Priority Data

Jun. 18, 2020 (KR) .................. 10-2020-0074225
Aug. 12, 2020 (KR) .................. 10-2020-0101084

(51) Int. Cl.
*H04N 23/54* (2023.01)
*G03B 13/36* (2021.01)
(Continued)

(52) U.S. Cl.
CPC ............ *H04N 23/54* (2023.01); *G03B 13/36* (2013.01); *H02K 41/0354* (2013.01);
(Continued)

(58) Field of Classification Search
None
See application file for complete search history.

(56) References Cited

U.S. PATENT DOCUMENTS

2012/0106936 A1* 5/2012 Lim .................. G03B 5/02
396/55
2013/0182136 A1 7/2013 Ishizue
(Continued)

FOREIGN PATENT DOCUMENTS

| CN | 111953881 A | * 11/2020 | ........... H04N 5/2251 |
| JP | 2019-512734 | 5/2019 | |

(Continued)

OTHER PUBLICATIONS

International Search Report dated Sep. 23, 2021 issued in Application No. PCT/KR2021/007451.

*Primary Examiner* — Quan Pham
(74) *Attorney, Agent, or Firm* — KED & ASSOCIATES, LLP

(57) ABSTRACT

An embodiment comprises: a display panel including an active area; and a camera module for receiving light passing through the active area, wherein the camera module includes: a lens fixed to be spaced apart from the display panel; an image sensor spaced apart from the lens; and a driving unit for moving the image sensor in an optical axis direction.

19 Claims, 41 Drawing Sheets

(51) Int. Cl.
  *H02K 41/035* (2006.01)
  *H04N 23/51* (2023.01)
  *H04N 23/53* (2023.01)
  *H04N 23/57* (2023.01)
  *H04N 23/67* (2023.01)

(52) U.S. Cl.
  CPC ............ *H04N 23/51* (2023.01); *H04N 23/53* (2023.01); *H04N 23/57* (2023.01); *H04N 23/67* (2023.01)

(56) References Cited

U.S. PATENT DOCUMENTS

| | | | | |
|---|---|---|---|---|
| 2019/0020822 | A1* | 1/2019 | Sharma | G03B 3/10 |
| 2019/0158713 | A1* | 5/2019 | Mcmillan | H04N 23/90 |
| 2021/0195073 | A1* | 6/2021 | Saito | G02B 7/09 |
| 2021/0281761 | A1* | 9/2021 | Wang | H04N 23/57 |

FOREIGN PATENT DOCUMENTS

| | | |
|---|---|---|
| KR | 10-2011-0011243 | 2/2011 |
| KR | 10-2018-0085279 | 7/2018 |
| KR | 10-2019-0006689 | 1/2019 |
| KR | 10-2019-0036194 | 4/2019 |
| KR | 10-2019-0098169 | 8/2019 |
| KR | 10-2020-0066273 | 6/2020 |
| WO | WO 2019-058974 | 3/2019 |

* cited by examiner

CAMERA MODULE AND OPTICAL INSTRUMENT COMPRISING SAME

CROSS-REFERENCE TO RELATED PATENT APPLICATIONS

This application is a U.S. National Stage Application under 35 U.S.C. § 371 of PCT Application No. PCT/KR2021/007451, filed Jun. 15, 2021, which claims priority to Korean Patent Application Nos. 10-2020-0074225, filed Jun. 18, 2020 and 10-2020-0101084, filed Aug. 12, 2020, whose entire disclosures are hereby incorporated by reference.

TECHNICAL FIELD

Embodiments relate to a camera module and an optical instrument including the same.

BACKGROUND ART

Voice coil motor (VCM) technology, which is used in conventional general camera modules, is difficult to apply to a micro-scale camera module, which is intended to exhibit low power consumption, and study related thereto has been actively conducted.

A camera module, which is configured to be mounted in small electronic products, such as smartphones, may frequently receive shock when in use, and may shake minutely due to, for example, shaking of the user's hand while taking a photograph. In consideration thereof, technology for additionally mounting a hand tremor compensation device in a camera module has recently been developed.

DISCLOSURE

Technical Problem

Embodiments provide a camera module and an optical instrument capable of smoothly performing autofocus operation without insufficiency in amount of light in the configuration in which the amount of light is reduced by a display module.

Technical Solution

An optical instrument according to an embodiment includes a display panel including an active area, and a camera module configured to receive light passing through the active area. The camera module includes a lens fixedly disposed at a position spaced apart from the display panel, an image sensor disposed so as to be spaced apart from the lens, and a driving unit configured to move the image sensor in an optical-axis direction.

At least a portion of the lens may overlap the active area in the optical-axis direction.

At least a portion of the lens may overlap the active area in a direction perpendicular to the display panel.

At least a portion of the lens may be disposed under the active area.

The active area may include a plurality of pixels, and at least a portion of the lens may overlap at least one of the plurality of pixels in the optical-axis direction.

At least a portion of the image sensor may overlap the active area in the optical-axis direction.

The active area may be a display area displaying an image thereon.

At least a portion of the image sensor may be disposed under the active area.

The image sensor and the active area may be disposed parallel to each other.

The display panel may include a non-viewing area disposed around the active area.

The lens may face the active area in the optical-axis direction.

The optical instrument may include a front surface, which includes a viewing area that is visible to a user and displays an image thereon and a non-viewing area that is invisible to the user. The lens may face the viewing area in the optical-axis direction, and at least a portion of the lens may overlap the viewing area.

The embodiment relates to a camera module configured to receive light passing through an active area of a display panel. The camera module may include a lens fixed in an optical-axis direction, an image sensor disposed so as to be spaced apart from the lens, and a driving unit configured to move the image sensor in the optical-axis direction.

A camera module according to still another embodiment may include a first circuit board, a housing disposed on the first circuit board, a lens barrel coupled to the housing and disposed so as to be spaced apart from the first circuit board, a second circuit board disposed between the lens barrel and the first circuit board and spaced apart from the first circuit board, an image sensor disposed on the second circuit board, a holder coupled to the second circuit board, a coil disposed in one of the housing and the holder, and a magnet disposed in the other of the housing and the holder. The lens barrel may be stationary, and the image sensor may be movable in an optical-axis direction.

A support member conductively connecting the first circuit board to the second circuit board may be included.

The lens barrel may be fixed in the optical-axis direction.

The lens barrel may be fixed in a direction perpendicular to the optical axis.

The camera module may include a filter coupled to the holder and a support member conductively connecting the first circuit board to the second circuit board and supporting the image sensor so that the image sensor is movable.

The first circuit board and the image sensor may be moved in the optical-axis direction due to interaction between the coil and the magnet.

The lens barrel may be fixedly disposed at a position spaced apart from the first circuit board in the optical-axis direction by a predetermined distance.

The coil may face or overlap the magnet in the optical-axis direction.

The coil may face or overlap the magnet in a direction perpendicular to the optical-axis direction.

The camera module may include an elastic member coupled to the housing and to the holder.

The camera module may include a position sensor disposed in one of the housing and the holder, in which the coil is disposed.

The magnet may be disposed on the holder, the coil may be disposed in the housing, and the camera module may include a position sensor disposed on the first circuit board so as to face or overlap the magnet in the optical-axis direction.

The camera module may include a sensing magnet disposed on the holder and a position sensor facing or overlapping the sensing magnet in the optical-axis direction.

The camera module may include a filter disposed on the holder and located between the lens barrel and the image sensor.

A mobile device according to another embodiment includes a display panel including an active area, and a camera module configured to receive light passing through the active area. The camera module includes an optical-path changing unit, which includes a first surface into which light that has passed through the active area is introduced and a second surface from which the light introduced into the first surface is emitted, a lens disposed so as to be spaced apart from the second surface, a moving unit configured to move the lens, and an image sensor disposed so as to be spaced apart from the lens.

The reflection member may overlap the active area in a direction perpendicular to the display panel. The active area may include a plurality of pixels, and at least a portion of the optical-path changing unit may overlap at least one of the plurality of pixels in a direction perpendicular to the display panel.

At least a portion of the moving unit may overlap the active area in a direction perpendicular to the display panel. The moving unit may move the lens in a direction parallel to the display panel.

The active area may be a display area displaying an image thereon. The image sensor and the active area may be disposed perpendicular to each other. The display panel may include a non-viewing area disposed around the active area.

The mobile device may include a front surface, which includes a viewing area that is visible to a user and displays an image thereon and a non-viewing area that is invisible to the user. The optical-path changing unit may face the viewing area in a direction perpendicular to the display panel, and at least a portion of the optical-path changing unit may overlap the viewing area.

The lens may face the second surface in a direction parallel to the display panel. The first surface may overlap the active area in a direction perpendicular to the display panel. The first surface may be spaced apart from the display panel.

The optical-path changing unit may include a reflection member including the first surface and the second surface, a holder accommodating the reflection member, and a cover member, which includes an upper plate facing the display panel, a lower plate located opposite the upper plate, and a side plate connecting the upper plate to the lower plate and accommodates the reflection member and the holder.

The upper surface of the upper plate may be in contact with the display panel. Alternatively, the upper surface of the upper plate may be spaced apart from the display panel.

The mobile device may include a shock-absorbing member disposed between the upper surface of the upper plate and the display panel. The upper surface of the upper plate may be located closer to the display panel than the first surface. A ratio of the distance between the second surface and the lens to the distance between the rear surface of the display panel and the first surface may be 1:0.5 to 1:5.

The display panel may be an LCD panel, and a ratio of the distance between the second surface and the lens to the distance between the front surface of the display panel and the first surface may be 1:2.1 to 1:15. Alternatively, the display panel may be an OLED panel, and a ratio of the distance between the second surface and the lens to the distance between the front surface of the display panel and the first surface may be 1:0.7 to 1:6.

A ratio of the distance between the rear surface of the display panel and the first surface to the distance between the second surface and the image sensor may be 1:3.2 to 1:22.

The display panel may be an LCD panel, and a ratio of the distance between the front surface of the display panel and the first surface to the distance between the second surface and the image sensor may be 1:1.1 to 1:5.1.

The display panel may be an OLED panel, and a ratio of the distance between the front surface of the display panel and the first surface to the distance between the second surface and the image sensor may be 1:2.7 to 1:16.5.

A camera module according to another embodiment may include a first cover member, which includes an upper plate, a lower plate located opposite the upper plate, a side plate connecting the upper plate to the lower plate, and an opening formed in the upper plate, a reflection member, which is disposed in the cover member and includes a first surface into which light is introduced through the opening and a second surface from which the light introduced into the first surface is emitted, an image sensor disposed so as to face the second surface, a lens disposed between the second surface and the image sensor, and a moving unit configured to move the lens. A ratio of a first distance between the second surface and the lens to a second distance between the first surface and the upper surface of the upper plate may be 1:0.5 to 1:5. The first distance may be shorter than the second distance.

The moving unit may include a second cover member, which includes an upper plate and a side plate connected to the upper plate, a housing disposed in the second cover member, and a bobbin disposed in the housing and coupled to the lens. The side plate of the first cover member may be coupled to the upper plate of the second cover member.

Advantageous Effects

Embodiments may smoothly perform autofocus operation without insufficiency in amount of light in the configuration in which the amount of light is reduced by a display module.

In addition, according to embodiments, since a constant distance is maintained between a display panel and an incidence surface of a reflection member regardless of autofocus operation of a lens, a constant amount of light may be introduced into the reflection member in the configuration in which the amount of light is reduced by the display panel.

In addition, according to embodiments, since a constant amount of light is introduced into a camera module, AF operation may be smoothly performed, and deterioration in the resolution of the camera module may be prevented in the configuration in which the amount of light is reduced by the display panel.

BEST MODE

Figure 1:
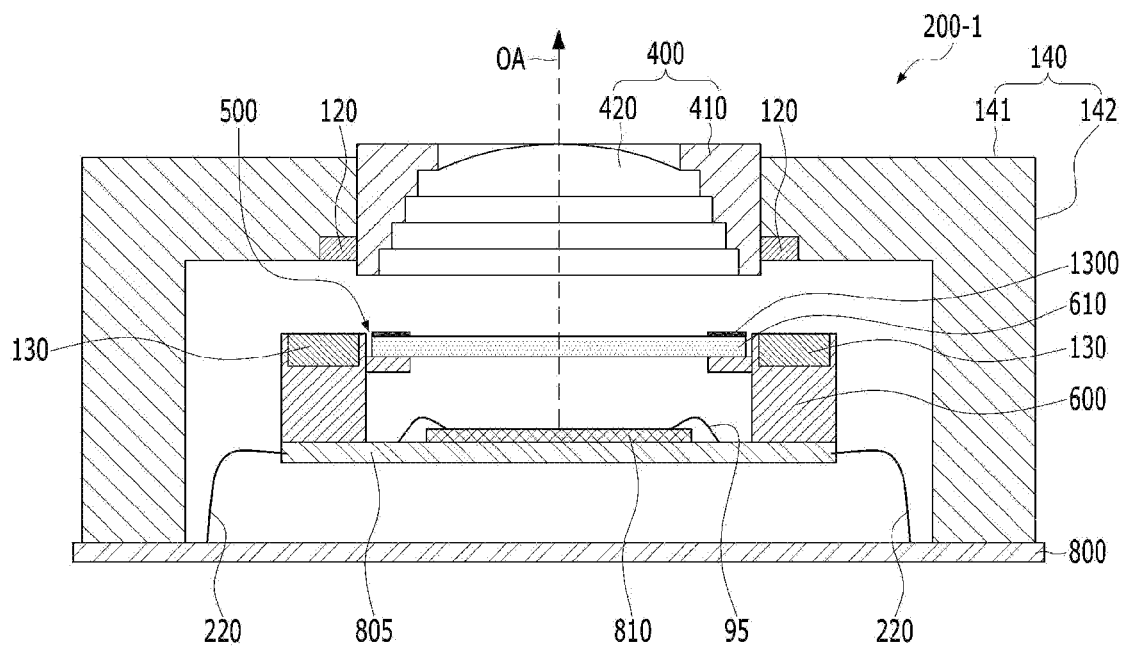
FIG. 1 is a schematic cross-sectional view of a camera module according to an embodiment.

Hereinafter, embodiments of the present disclosure, which may concretely realize the objects described above, will be described with reference to the accompanying drawings.

In the following description of the embodiments, it will be understood that, when each element is referred to as being "on" or "under" another element, it can be directly on or under the other element, or can be indirectly formed such that one or more intervening elements are also present. In addition, when an element is referred to as being "on or under," "under the element" as well as "on the element" may be included based on the element.

In addition, the relational terms "first," "second," "on/upper part/above," and "under/lower part/below" are used herein only to distinguish between one subject or element and another subject or element without necessarily requiring or involving any physical or logical relationship or sequence between such subjects or elements. Wherever possible, the same reference numerals will be used throughout the drawings to refer to the same parts.

Additionally, the terms "comprises," "includes," and "has" described herein should be interpreted not to exclude other elements but to further include such other elements, since the corresponding elements may be inherent unless mentioned otherwise. In addition, the term "corresponding to" described herein may encompass at least one of the meanings of "facing" and "overlapping."

Hereinafter, a camera module and an optical instrument including the same according to embodiments will be described with reference to the accompanying drawings. For convenience of description, a camera module according to the embodiments will be described using the Cartesian coordinate system (x, y, z), but the embodiments are not limited thereto, and may be described using other coordinate systems. In the respective drawings, the x-axis and the y-axis may be directions perpendicular to the z-axis, which is an optical-axis (OA) direction, the z-axis direction, which is the optical-axis (OA) direction, may be referred to as a "first direction," the x-axis direction may be referred to as a "second direction," and the y-axis direction may be referred to as a "third direction."

A "hand tremor compensation function" applied to a small camera module of a mobile device such as a smartphone or a tablet PC may be a function of moving a lens in a direction perpendicular to the optical-axis direction or tilting the lens with respect to the optical axis in order to cancel vibration (or motion) caused by shaking of the user's hand.

In addition, an "autofocus function" may be a function of automatically focusing on an object by moving the lens in the optical-axis direction according to the distance to the object so that an image sensor obtains a clear image of the object.

Hereinafter, the "camera module" may alternatively be referred to as an "image-capturing device," a "photographing device," a "camera instrument," a "camera device," or a "camera." The "coil" may alternatively be referred to as a coil unit or a coil portion, and the "elastic member" may alternatively be referred to as an elastic unit or a spring.

In addition, in the following description, the "terminal" may alternatively be referred to as a pad, an electrode, a conductive layer, or a bonding portion.

Figure 2:
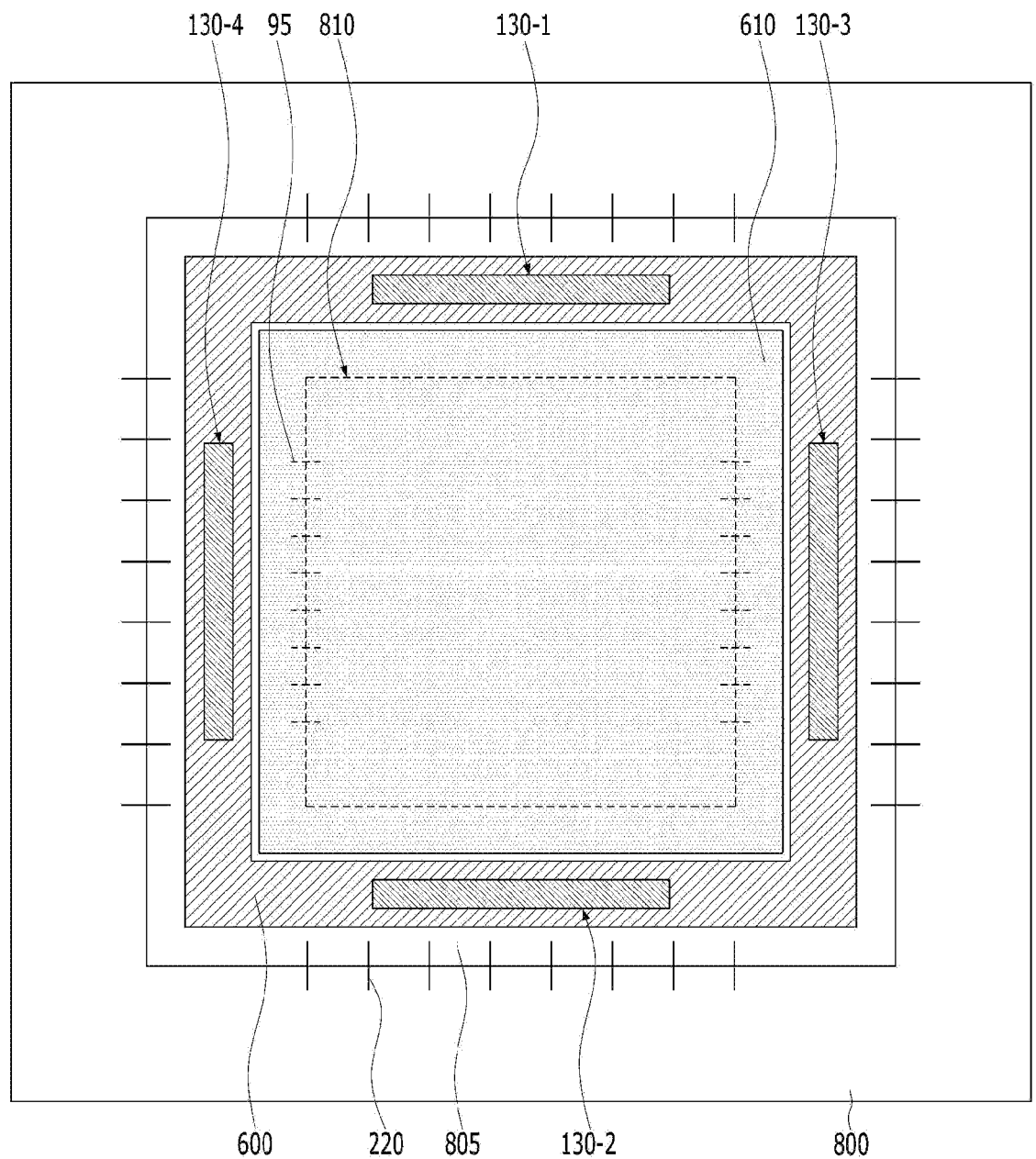
FIG. 2 is a schematic plan view of a first circuit board, a second circuit board, an image sensor, a holder, a magnet, and a filter shown in FIG. 1.
Figure 16:
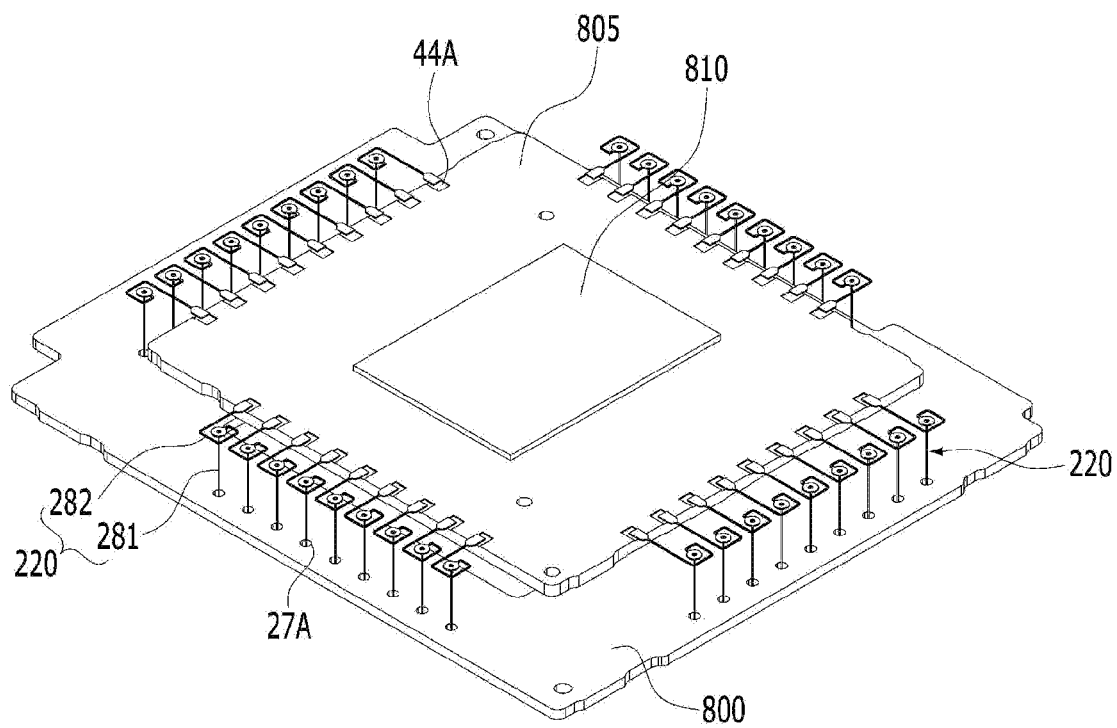
FIG. 16 is a perspective view of a first circuit board, a second circuit board, and an embodiment of a support member shown in FIG. 1.
Figure 17:
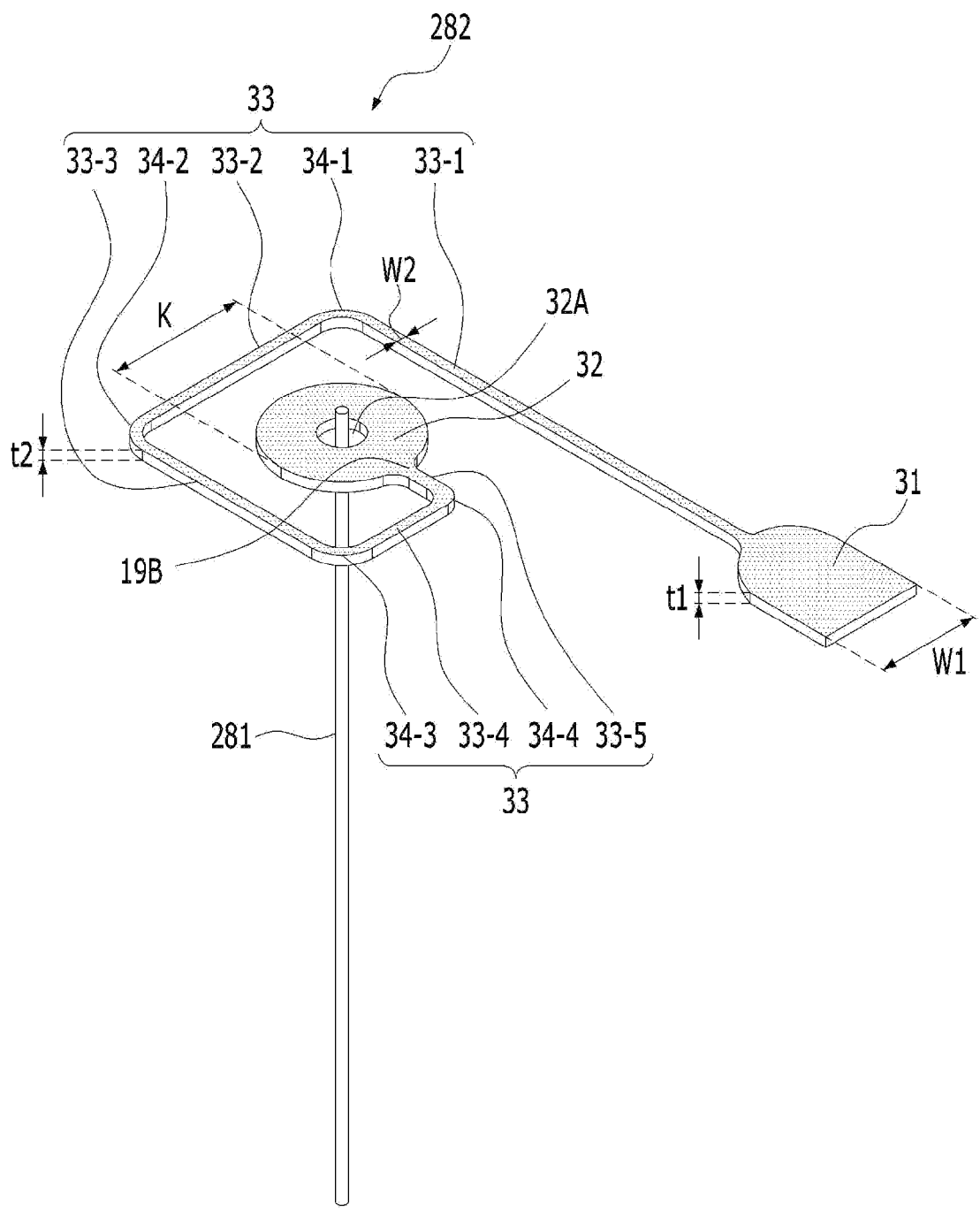
FIG. 17 is an enlarged view of the support member shown in FIG. 16.

FIG. 1 is a schematic cross-sectional view of a camera module 200-1 according to an embodiment, FIG. 2 is a schematic plan view of a first circuit board 800, a second circuit board 805, an image sensor 810, a holder 600, a magnet 130, and a filter 610 shown in FIG. 1, FIG. 16 is a perspective view of the first circuit board 800, the second circuit board 805, and an embodiment of a support member 220 shown in FIG. 1, and FIG. 17 is an enlarged view of the support member 220 shown in FIG. 16.

Referring to FIGS. 1, 2, 16, and 17, the camera module 200-1 may include a first circuit board 800, a second circuit board 805, an image sensor 810, a lens module 400, a coil 120, a magnet 130, and a support member 220.

The camera module 200-1 may further include at least one of a housing 140, a holder 600, or a filter 610.

The second circuit board 805 may be disposed on the first circuit board 800, and may be spaced apart from the first circuit board 800.

The image sensor 810 may be disposed on the second circuit board 805, and may be conductively connected to the second circuit board 805 via at least one wire 95.

The housing 140 may be disposed on the first circuit board 800. The housing 140 may accommodate the lens module 400, and may alternatively be referred to as a "lens holder," a "holder," a "cover," or a "case." Although the housing 140 is illustrated in FIG. 1 as being implemented as a single body, the disclosure is not limited thereto. In another embodiment, the housing 140 may include two or more housings (or holders), which are separated or partitioned from each other, and the lens module 400 may be coupled to any one of the housings (or holders).

In an example, the housing 140 may have an opening formed therein to mount a lens barrel 410 therein. For example, the opening in the housing 140 may be formed in the shape of a through-hole or a cavity that penetrates the housing 140 in the optical-axis (OA) direction. The shape of the opening in the housing 140 and the shape of the lens barrel 410 may be the same as or similar to each other, for example, a circular shape, an elliptical shape, or a polygonal shape. However, the disclosure is not limited thereto.

In an example, the housing 140 may include an upper plate 141 and a side plate 142 extending from the upper plate. The above-described opening in the housing 140 may be formed in the upper plate 141.

The lens module 400 may be disposed above the image sensor 810, and may be supported by the housing 140. In an example, the lens module 400 may be disposed in the housing 140, and may be coupled to the housing 140.

The lens module 400 may alternatively be referred to as a "lens unit" or a "lens assembly." The lens module 400 may include a lens barrel 410 coupled to the housing 140 and a lens array 420 disposed in the lens barrel 410. The lens array 420 may include at least one lens, and may alternatively be referred to as a "lens."

The lens barrel 410 may have a cylindrical or polyhedral structure, and the cross-section thereof cut in a direction perpendicular to the optical axis may have a circular shape, an elliptical shape, or a polygonal shape, but the disclosure is not limited thereto. In an example, the lens barrel 410 may have a screw thread or a screw groove formed in the outer side surface thereof in order to be coupled to a bobbin 110, and the housing 140 may have a screw thread or a screw groove formed therein in order to be coupled to the lens barrel. In another embodiment, the screw thread or the screw groove of each of the lens barrel and the housing may be omitted.

The coil 120 may be disposed in the housing 140 or on the lens module 400.

In an example, the coil 120 may be coupled to the housing 140 or the lens barrel 410.

In an example, the housing 140 or the lens barrel 410 may have a groove formed therein to allow the coil 120 to be disposed or received therein.

The coil 120 may be disposed on the outer side surface of the lens barrel 410, and may be a driving coil that electromagnetically interacts with the magnet 130.

A driving signal (e.g. driving current or voltage) may be applied to the coil 120 in order to generate electromagnetic force due to interaction with the magnet 130. The driving signal applied to the coil 120 may be a DC signal and/or an AC signal.

The coil 120 may be conductively connected to the first circuit board 800. In an example, a driving signal may be applied to the coil 120 through the first circuit board 800.

In an example, the housing 140 may be provided with a conductive layer, a conductor, or a circuit pattern to conductively connect the coil 120 to the first circuit board 800. Alternatively, a separate circuit board for conductively connecting the coil 120 to the first circuit board 800 may be disposed in the housing 140.

An AF operation unit may be moved in the first direction, for example, the upward direction (the +Z-axis direction) or the downward direction (the −Z-axis direction), by electromagnetic force resulting from interaction between the coil 120 and the magnet 130.

The camera module 200-1 may perform both unidirectional driving and bidirectional driving for autofocus. Here, unidirectional driving refers to movement of the AF operation unit in one direction (e.g. the upward direction (the +Z-axis direction)) based on the initial position of the AF operation unit, and bidirectional driving refers to movement of the AF operation unit in two directions (e.g. the upward direction or the downward direction) based on the initial position of the AF operation unit.

The intensity and/or direction of electromagnetic force resulting from interaction between the coil 120 and the magnet 130 may be controlled by controlling the intensity and/or polarity (e.g. the direction in which current flows) of a driving signal applied to the coil 120, whereby movement of the AF operation unit in the first direction may be controlled, and as a result, an autofocus function may be performed.

The AF operation unit may include an image sensor 810, which is elastically supported by a support member 220 and/or an elastic member 150 to be described later. In addition, the AF operation unit may include components that move together with the image sensor 810.

The AF operation unit may alternatively be referred to as a "moving unit."

In an example, the AF operation unit may include a second circuit board 805 and an image sensor 810. Alternatively, in another example, the AF operation unit may further include a holder 600 and a magnet 130.

In an example, the coil 120 may be disposed on the lens barrel 410 so as to have a closed-loop shape. In an example, the coil 120 may be formed in the shape of a closed loop that is wound in the clockwise or counterclockwise direction about the optical axis OA, and may be wound around or disposed on the outer side surface of the lens barrel 410.

In another embodiment, the coil 120 may include at least one coil ring. In an example, the coil 120 may include a plurality of coil units, and each of the plurality of coil units may be implemented in the form of a coil ring. The number of coil rings may be the same as the number of magnets 130, but the disclosure is not limited thereto.

The holder 600 may be in contact with, attached to, or fixed to the upper surface of the second circuit board 805. The holder 600 may alternatively be referred to as a sensor base.

The holder 600 may be disposed below the lens module 400.

The holder 600 may include an opening corresponding to the image sensor 810.

The opening in the holder 600 may be formed through the holder 600 in the optical-axis (OA) direction, and may alternatively be referred to as a "hole" or a "through-hole."

In an example, the opening in the holder 600 may be formed through the center of the holder 600, and may be disposed so as to correspond to or face the image sensor 810 (e.g. an active area of the image sensor 810).

The holder 600 may include a seating portion 500, which is depressed in the upper surface thereof to allow the filter 610 to be seated therein, and the filter 610 may be disposed in the seating portion 500. The seating portion 500 may include a bottom surface and a side surface, and the opening in the holder 600 may be formed in the bottom surface of the seating portion.

The filter 610 may be disposed on the holder 600. The filter 610 may have a plate shape or a flat quadrangular shape, but the disclosure is not limited thereto.

The opening 501 in the holder 600 may have the same shape as the filter 610, or may have a shape suitable for accommodating the filter 610. The shape of the opening 501 when viewed from above may be, for example, a polygonal shape (e.g. a quadrangular shape), a circular shape, or an elliptical shape, but the disclosure is not limited thereto.

Light that has passed through the lens module 400 may be introduced into the image sensor 810 through the filter 610.

The filter 610 may serve to block introduction of light within a specific frequency band, among the light that has passed through the lens module 400, into the image sensor 810. The filter 610 may be, for example, an infrared cut filter, but the disclosure is not limited thereto. In another embodiment, the filter may be an infrared pass filter. In an example, the filter 610 may be disposed parallel to the xy-plane, which is perpendicular to the optical axis OA.

A first adhesive member (not shown) may be disposed between the filter 610 and the holder 600, and the first adhesive member may couple the filter 610 and the holder 600 to each other. In addition, a second adhesive member (not shown) may be disposed between the holder 600 and the second circuit board 805, and the second adhesive member may couple the holder 600 and the second circuit board 805 to each other.

A third adhesive member (not shown) may be disposed between the housing 140 and the first circuit board 800, and the third adhesive member may couple the housing 140 and the first circuit board 800 to each other. Each of the first to third adhesive members may be, for example, an epoxy, a thermosetting adhesive, or an ultraviolet curable adhesive.

Each of the first circuit board 800 and the second circuit board 805 may be, for example, a printed circuit board (PCB). The first circuit board 800 and the second circuit board 805 may be conductively connected to each other.

Each of the first and second circuit boards 800 and 805 may include at least one of a rigid printed circuit board or a flexible printed circuit board.

The image sensor 810 may include an active area (or an effective image area) into which the light that has passed through the filter 610 is introduced so as to form an image contained in the light.

The optical axis of the image sensor 810 and the optical axis of the lens module 400 may be aligned with each other. The image sensor 810 may convert light radiated to the active area into an electrical signal, and may output the converted electrical signal.

In an example, the filter 610 and the active area of the image sensor 810 may be spaced apart from each other so as to face each other in the optical-axis (OA) direction.

At least one circuit element (not shown) may be disposed or mounted on the first circuit board 800. In an example, at least one circuit element (not shown) may be conductively connected to the circuit board 800, and may constitute a controller that controls driving signals applied to the image sensor 810 and to the coil 120.

In an example, the circuit element may include at least one of at least one capacitor, a memory, a controller, a sensor (e.g. a motion sensor), or an integrated circuit (IC).

In an example, the first circuit board 800 may be conductively connected to the coil 120. In an example, a driving signal may be applied to the coil 120 through the first circuit board 800.

The camera module according to another embodiment may further include a blocking member 1300, which is disposed on the upper surface of the filter 610. The blocking member 1300 may alternatively be referred to as a "masking portion."

In an example, the blocking member 1300 may be disposed on the edge region of the upper surface of the filter 610, and may serve to prevent at least a portion of the light that passes through the lens module 400 and is introduced into the edge region of the filter 610 from passing through the filter 610. In an example, the blocking member 1300 may be coupled or attached to the upper surface of the filter 610 by means of an adhesive member.

For example, the filter 610 may have a quadrangular shape when viewed from above, and the blocking member 1300 may be formed along the respective sides of the upper surface of the filter 610 so as to be symmetrical with respect to the filter 610. In an example, the blocking member 1300 may be formed to have a constant width on the respective sides of the upper surface of the filter 610. In an example, the blocking member 1300 may be formed of an opaque material. In an example, the blocking member 1300 may be implemented as an opaque adhesive material that is applied to the filter 610, or may be implemented in the form of a film that is attached to the filter 610.

The filter 610 and the active area of the image sensor 810 may be disposed so as to face or overlap each other in the optical-axis direction, and the blocking member 1300 may not overlap the active area of the image sensor 810 in the optical-axis direction. In addition, at least a portion of the blocking member 1300 may overlap the terminal of the second circuit board 805 and/or the wire 95 in the optical-axis direction.

Since the blocking member 1300 is disposed such that at least a portion thereof overlaps the terminal of the second circuit board 805 and/or the wire 95 in the optical-axis direction, the blocking member 1300 may block introduction of light into the terminal of the second circuit board 805 and/or the wire, among the light that has passed through the lens module 400, thereby preventing the occurrence of a flare phenomenon, thus preventing the image formed by the image sensor 810 from being distorted or deteriorated in quality.

In another embodiment, the blocking member 1300 may be omitted. In still another embodiment, both the filter 610 and the blocking member 1300 may be omitted.

The magnet 130 may be disposed on the holder 600.

In an example, the magnet 130 may be disposed or arranged so as to correspond to or face the coil 120 in the optical-axis (OA) direction or in a direction parallel to the optical axis.

In an example, the magnet 130 may be a monopolar-magnetized magnet, which includes one N pole and one S pole, or may be a bipolar-magnetized magnet, which includes two N poles and two S poles.

The magnet 130 may include one or more magnet units. The holder 600 may be provided with an accommodating portion in which the magnet 130 is disposed. In this case, the accommodating portion may be formed in the shape of a recess or a hole.

Referring to FIG. 1, the magnet 130 may be disposed on the upper surface of the holder 600. The reason for this is to reduce the spacing distance to the coil 120, thus increasing the electromagnetic force. In another embodiment, the magnet 130 may be disposed on the side surface or the lower surface of the holder 600.

The support member 220 may elastically support the second circuit board 805.

In an example, the support member 220 may support the second circuit board 805 so that the second circuit board 805 is movable in the optical-axis direction, and may conductively connect the first circuit board 800 to the second circuit board 805.

In an example, one end of the support member 220 may be coupled to the first circuit board 800 by means of a solder, and the other end of the support member 220 may be coupled to the second circuit board 805 by means of a solder.

The support member 220 may be implemented as a member that is conductive and can elastically support other components, such as, for example, a suspension wire, a leaf spring, or a coil spring.

Alternatively, in another embodiment, the support member may be integrally formed with the first circuit board 800. In still another embodiment, the support member may be integrally formed with the second circuit board 805.

As shown in FIG. 2, the support member 220 may include a plurality of support members, and the plurality of support members may support the second circuit board 805, and may conductively connect the first circuit board 800 to the second circuit board 805. A driving signal applied to the coil 120 may be transmitted from the first circuit board 800 to the second circuit board 805 through the support member 220.

Referring to FIGS. 16 and 17, the first circuit board 800 may include a plurality of through-holes 27A, which are arranged so as to be spaced apart from each other.

The support member 220 may include a plurality of support members. Each of the plurality of support members may include a first elastic member 281 and a second elastic member 282.

The first elastic member 281 may pass through a corresponding one of the plurality of through-holes in the first circuit board 800, and one end of the first elastic member 281 may be coupled to the lower surface of the first circuit board 800. In an example, one end of the first elastic member 281 may be coupled to a terminal provided on the lower surface of the first circuit board 800 by means of a solder, and the two elements may be conductively connected to each other.

The second elastic member 282 may be coupled to the first elastic member 281. In an example, one end of the second elastic member 282 may be coupled to the other end of the first elastic member 281, and the other end of the second elastic member 282 may be coupled to the second circuit board 805.

In an example, the other end of the second elastic member 282 may be coupled to a terminal 44A formed on the upper surface of the second circuit board 805, and the two elements may be conductively connected to each other.

The second elastic member 282 may include a first coupling portion 31 coupled to the terminal 44A of the second circuit board 805, a second coupling portion 32 coupled to the other end of the first elastic member 281, and a connecting portion 33 interconnecting the first coupling portion 31 and the second coupling portion 32.

In an example, the first coupling portion 31 may be disposed on the upper surface of the second circuit board 805, and may be coupled to the terminal 44A of the second circuit board 805 by means of a solder or a conductive adhesive member.

The second coupling portion 32 may be coupled to the other end of the first elastic member 281 by means of a solder or a conductive adhesive member.

The second coupling portion 32 may have formed therein a hole 32A through which the other end of the first elastic member 281 passes.

The other end of the first elastic member 281 that has passed through the hole 32A in the second coupling portion 32 may be directly coupled to the second coupling portion 32 by means of a conductive adhesive member or a solder, and the second coupling portion 32 and the first elastic member 281 may be conductively connected to each other.

For example, the second coupling portion 32 is a region in which a solder for coupling to the first elastic member 281 is disposed, and may include the hole 32A and a region around the hole 32A. Although the second coupling portion 32 is illustrated in FIG. 17 as having a circular shape, the disclosure is not limited thereto. In another embodiment, the second coupling portion 32 may have a polygonal shape (e.g. a quadrangular shape) or an elliptical shape.

In an example, the diameter K of the second coupling portion 32 may be greater than the width W1 of the first coupling portion 31, but the disclosure is not limited thereto. In another embodiment, the diameter K of the second coupling portion 32 may be equal to or less than the width of the first coupling portion 31.

The connecting portion 33 may connect the first coupling portion 31 and the second coupling portion 32 to each other, and may include at least one straight portion and at least one curved portion.

In an example, the curved portion may have a shape that extends from the straight portion in a direction perpendicular to the optical axis so as to be bent to the right or the left.

In an example, the connecting portion 33 may include a spiral shape, but the disclosure is not limited thereto.

In an example, the connecting portion 33 may include a first straight portion 33-1 coupled to the first coupling portion 31, a first curved portion 34-1 bent and extending from the first straight portion 33-1 in a first lateral direction, a second straight portion 33-2 connected to the first curved portion 34-1, a second curved portion 34-2 bent and extending from the second straight portion 33-2 in a second lateral direction, a third straight portion 33-3 connected to the second curved portion 34-2, a third curved portion 34-3 bent and extending from the third straight portion 33-3 in a third lateral direction, a fourth straight portion 33-4 connected to the third curved portion 34-3, a fourth curved portion 34-4 bent and extending from the fourth straight portion 33-4 in a fourth lateral direction, and a fifth straight portion 33-5 connecting the fourth curved portion 34-4 to the second coupling portion 32. For example, each of the first to fourth lateral directions may be a leftward direction, but the disclosure is not limited thereto. At least one of the first to fourth lateral directions may be a rightward direction.

The width W2 of the connecting portion 33 may be less than the width W1 of the first coupling portion 31 and the diameter K of the second coupling portion 32 (W2<W1 and W2<K). Accordingly, the second elastic member 282 may elastically support the AF operation unit, and may enable the AF operation unit to easily move in the optical-axis direction.

In another embodiment, the width of the connecting portion 33 may be equal to or greater than the diameter of the second coupling portion 32.

The thickness t1 of the first coupling portion 31, the thickness t2 of the connecting portion 33, and the thickness of the second coupling portion 32 may be equal to each other. In another embodiment, at least one of the thickness t1 of the first coupling portion 31, the thickness t2 of the connecting portion 33, or the thickness of the second coupling portion 32 may be different from the others. For example, the thickness t2 of the connecting portion 33 may be smaller than the thickness of the first coupling portion 31 and the thickness of the second coupling portion 32.

In the embodiment shown in FIGS. 16 and 17, the second elastic member 282 is connected to the upper end of the first elastic member 281 and is coupled to the second circuit board 805, but the disclosure is not limited thereto. In another embodiment, one end (the upper end) of the first elastic member may be directly connected to the second circuit board 805 by means of a solder, and the second elastic member may connect the lower end of the first elastic member to the first circuit board 800. In an example, the second coupling portion of the second elastic member may be coupled to the lower end of the first elastic member 281, and the first coupling portion of the second elastic member may be coupled to the terminal of the first circuit board 800.

In another embodiment, the support member may include a first elastic member 281, a second elastic member connected to the upper end of the first elastic member 281, and a third elastic member connected to the lower end of the first elastic member 281. In this case, the description of the second elastic member 282 shown in FIG. 17 may also be applied to each of the second and third elastic members. That is, one end (or the upper end) of the first elastic member 281 may be coupled to the second coupling portion 32 of the second elastic member, and the first coupling portion 31 of the second elastic member may be coupled to the terminal 44A of the second circuit board 805. In addition, the other end (or the lower end) of the first elastic member 281 may be coupled to the second coupling portion 32 of the third elastic member, and the first coupling portion 31 of the third elastic member may be coupled to the terminal of the first circuit board 800.

In the embodiment, the lens module 400 may be secured to the housing 140, and may not move in the optical-axis direction. That is, the lens module 400 constitutes a fixed unit together with the housing 140. On the other hand, in the embodiment, the second circuit board 805 and the image sensor 810 may be moved in the optical-axis direction due to interaction between the magnet 130 and the coil 120 to which a driving signal is applied. That is, the second circuit board 805 and the image sensor 810 constitute a movable unit. That is, in the embodiment, AF operation may be implemented by controlling displacement of the image sensor 810 in the optical-axis (OA) direction.

The size of a display module of a portable terminal, in which a camera module is mounted, is gradually increasing. As a method of increasing the size of a display module of a portable terminal and realizing a thin bezel, a camera module may be disposed on the lower surface of a display or below the display.

In the case in which a camera module ("under-display camera module") is disposed on the lower surface of a display module or below the display module, the light transmittance of the display module is a very important factor in AF operation. The reason for this is that the amount of light that is introduced into the camera module decreases as the light passes through the display module.

In a general camera module in which an image sensor is stationary and a lens module is moved in the optical-axis direction to perform autofocus operation, the distance between the lens module and the display module may be changed by the autofocus operation.

Figure 3A:
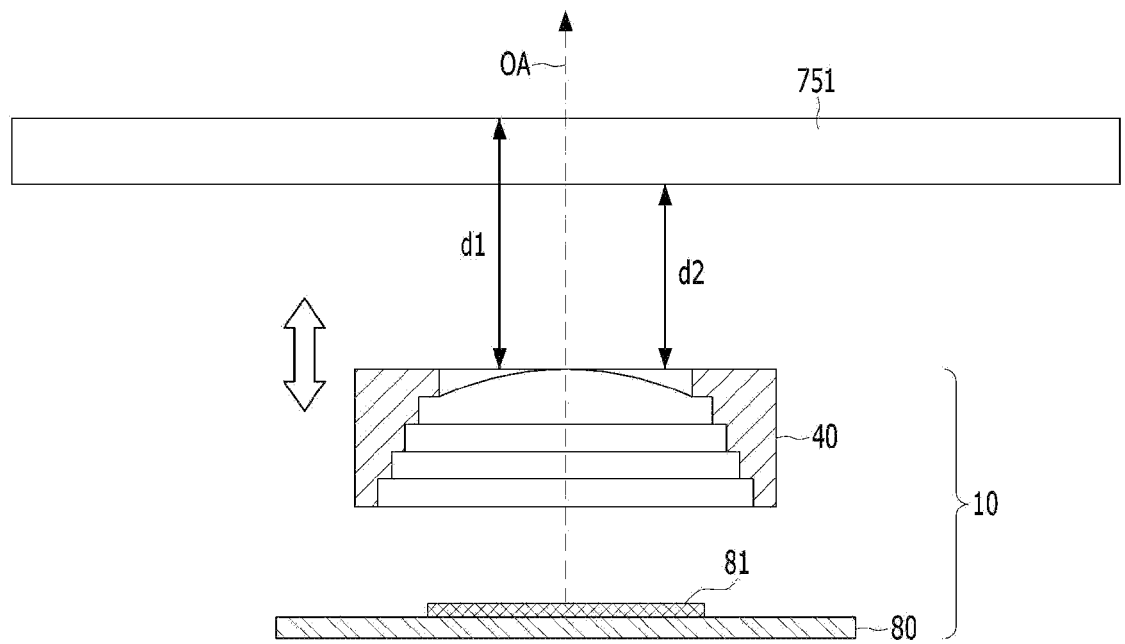
FIG. 3A is a schematic conceptual view of a general camera module, which is disposed below a display panel.
Figure 3B:
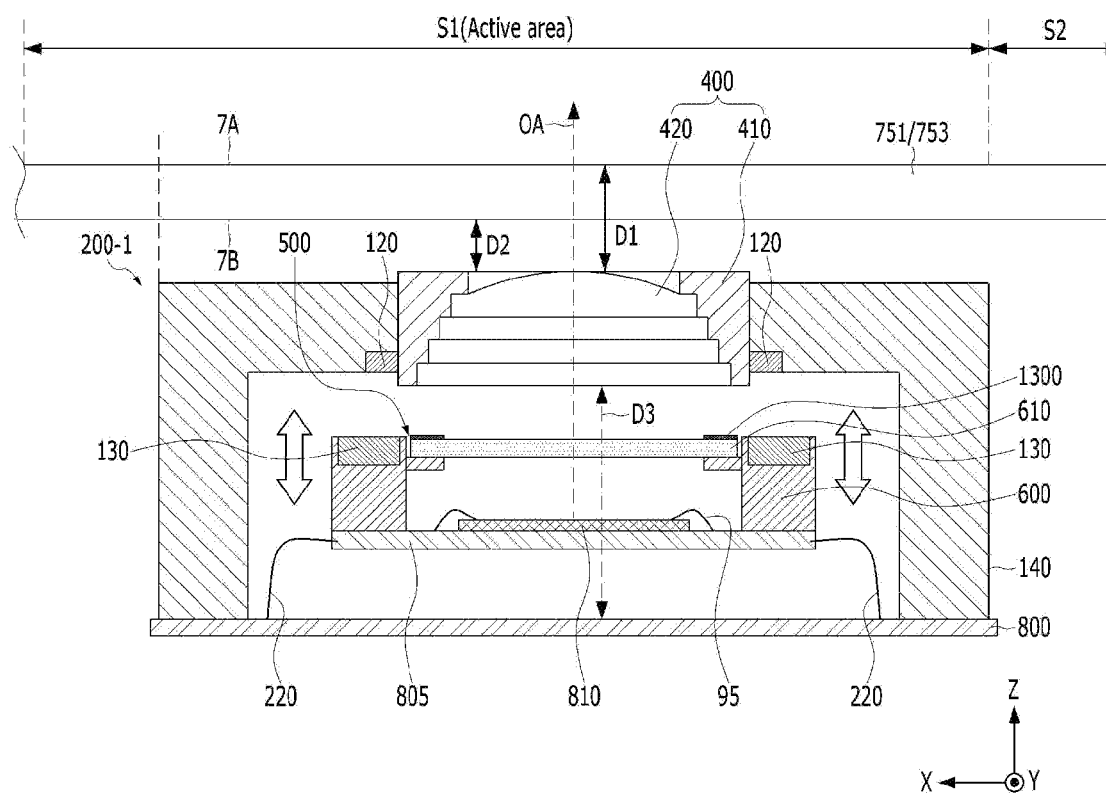
FIG. 3B shows a camera module according to an embodiment, which is disposed below a display panel.

FIG. 3A is a schematic conceptual view of a camera module 10 according to a comparative example, which is disposed below a display panel, and FIG. 3B shows the camera module 200-1 according to the embodiment, which is disposed below the display panel.

Referring to FIG. 3A, the camera module 10 may include a circuit board 80, an image sensor 81 disposed on the circuit board 80, and a lens-driving unit 40 disposed on the image sensor 81. The lens-driving unit 40 may be disposed between the lower surface (or the rear surface) of the display panel 751 and the image sensor 81.

The lens-driving unit 40 may include a lens module and a driving unit for moving the lens module in the optical-axis direction. As the lens module of the lens-driving unit 40 is moved in the optical-axis direction, the distance d1 or d2 between the lens module (or the lens) of the lens-driving unit 40 and the front surface (or the rear surface) of the display panel 751 may be changed.

As d1 (or d2) increases, the amount of light that is introduced into the lens module of the lens-driving unit 40 may decrease. In addition, as shown in FIG. 3A, as the lens module moves in the optical-axis direction, the amount of light that is introduced into the lens module may be greatly changed.

In the camera module shown in FIG. 3A, in which the amount of light is reduced by the display module, the amount of light that is introduced into the lens module of the lens-driving unit 40 is further reduced as d1 (or d2) increases. Therefore, AF operation may not be performed normally, an image generated by the image sensor 81 may be dark, and the resolution of the image sensor 81 may be reduced.

In particular, when the lens-driving unit 40 reaches a position farthest from the display panel 751 during AF operation, the amount of light that is introduced into the image sensor 81 may be greatly reduced.

Referring to FIG. 3B, in the embodiment, the lens module 400 is stationary, rather than moving in the optical-axis direction. In an example, the lens barrel 410 may be fixedly disposed at a position spaced apart from the first circuit board 800 by a predetermined distance D3 in the optical-axis (OA) direction.

In an example, the lens barrel 410 may be stationary in the optical-axis direction, which may mean that the lens barrel 410 does not move or shift in the optical-axis direction.

In addition, in an example, the lens barrel 410 may be stationary in a direction perpendicular to the optical axis, which may mean that the lens barrel 410 does not move or shift in a direction perpendicular to the optical axis.

The distance D1 between the front surface 7A of the portable terminal 200A and the lens module 400 in the optical-axis direction may be a preset distance, and may be constant, rather than being changed by AF operation of the camera modules 200-1 to 200-11. In addition, the distance D2 between the rear surface 7B of the display panel 751 and the lens module 400 in the optical-axis direction may be a preset distance, and may be constant, rather than being changed by AF operation of the camera modules 200-1 to 200-11.

For example, the front surface 7A of the portable terminal 200A may be the front surface of the display module. For example, in an embedded type in which the display module is integrated with a touchscreen module, the front surface 7A of the portable terminal 200A may be the front surface of the display module.

Alternatively, for example, in an add-on type in which the display module is provided separately from a touchscreen module, the front surface 7A of the portable terminal 200A may be the front surface of the touchscreen module.

Alternatively, for example, the lens module 400 may be in contact with the rear surface 7B of the display panel 751, and D1 may be zero. In this case, the rear surface of the display panel 751 may be the rear surface of the component (e.g. glass) closest to the camera module, among the components constituting the general display panel 751.

Even in the configuration in which the amount of light is reduced by the display panel 751, since the distance D1 is constant, the amount of light that is introduced into the lens module 400 may be constant. Therefore, according to the embodiment, the lens module may receive a sufficient amount of light for AF operation. Accordingly, AF operation may be smoothly performed even in the configuration in which the amount of light is reduced by the display panel 751.

According to the embodiment, since the image sensor 810 is moved in the optical-axis direction to perform autofocus, the lens module 400 may have a large-diameter lens, which may lead to an increase in the resolution of the camera module.

Figure 4:
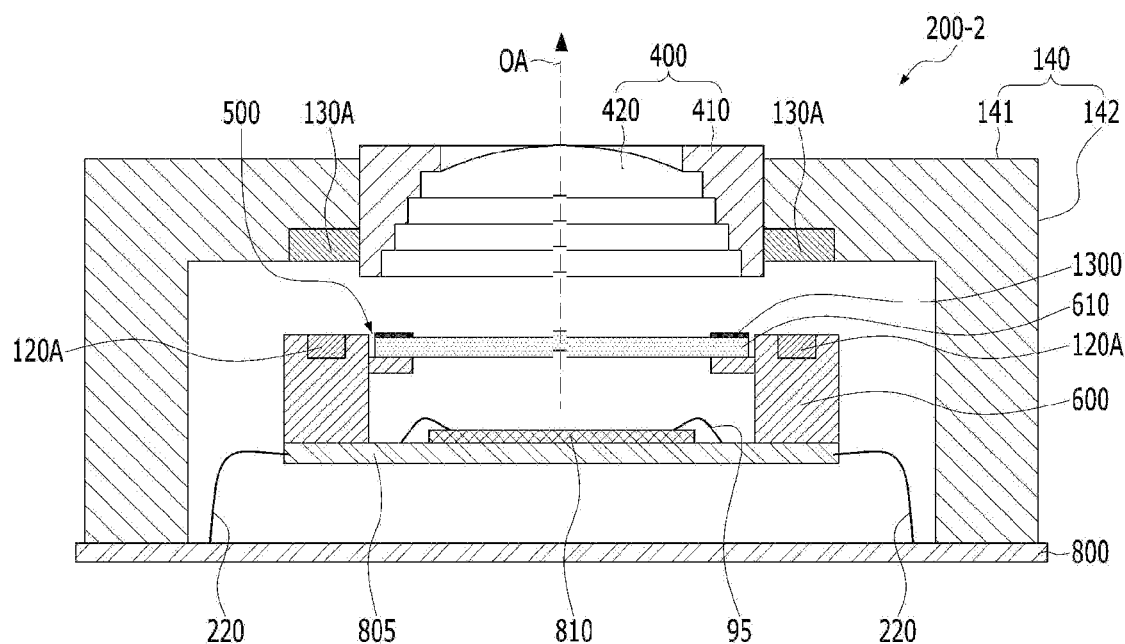
FIG. 4 is a schematic cross-sectional view of a camera module according to another embodiment.

FIG. 4 is a schematic cross-sectional view of a camera module 200-2 according to another embodiment.

FIG. 4 shows a modified example of the camera module shown in FIG. 1. In FIG. 4, the same reference numerals as those in FIG. 1 denote the same components, and a description thereof will be omitted or given in brief.

As shown in FIG. 4, a magnet 130A is disposed in the housing 140, and a coil 120A is disposed on a holder 600. The housing 140 shown in FIG. 4 may have a groove formed therein to allow the magnet 130A to be disposed therein, and the holder 600 shown in FIG. 4 may have a groove formed therein to allow the coil 120A to be disposed therein.

That is, as shown in FIG. 4, the magnet 130A may be secured to the housing 140 so as not to be movable, and the coil 120A may be moved in the optical-axis direction together with a circuit board 805, an image sensor 810, and the holder 600.

The coil 120A may be coupled to the holder 600. In an example, the coil 120A may be disposed on the upper surface of the holder 600, but the disclosure is not limited thereto.

In an example, the coil 120A may be disposed on the holder 600 so as to have a closed-loop shape. In an example, the coil 120A may have a shape of a closed loop wound in the clockwise or counterclockwise direction about the optical axis OA, and may be wound around or disposed on the holder 600.

In another embodiment, the coil may include at least one coil ring. In an example, the coil may include a plurality of coil units, and each of the plurality of coil units may be implemented in the form of a coil ring. The number of coil rings may be the same as the number of magnets 130A, but the disclosure is not limited thereto.

The magnet 130A may face or overlap the coil 120A in the optical-axis direction.

The coil 120A disposed on the holder 600 may be conductively connected to the second circuit board 805. The coil 120A shown in FIG. 4 may be conductively connected to the first circuit board 800 via the second circuit board 805 and the support member 220.

In an example, the holder 600 shown in FIG. 4 may be provided with a conductive layer, a conductor, or a circuit pattern to conductively connect the coil 120A to the second circuit board 805. Alternatively, a separate circuit board for conductively connecting the coil 120A to the second circuit board 805 may be disposed on the holder 600 shown in FIG. 4.

In another embodiment, the coil 120A may be disposed on the second circuit board 805 and may be directly connected to the second circuit board 805.

Figure 5:
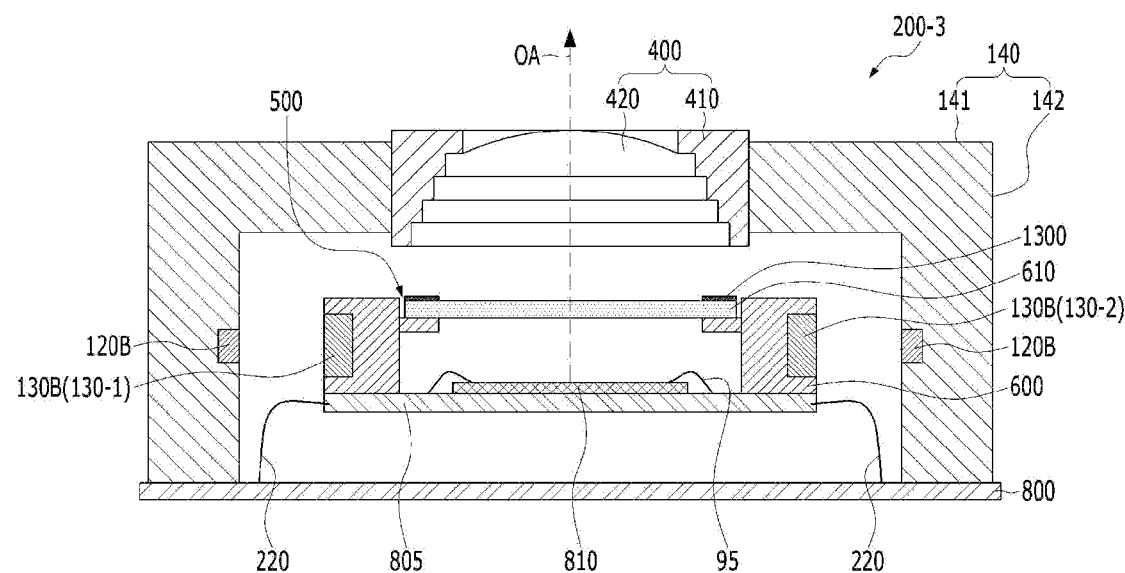
FIG. 5 is a schematic cross-sectional view of a camera module according to still another embodiment.
Figure 6A:
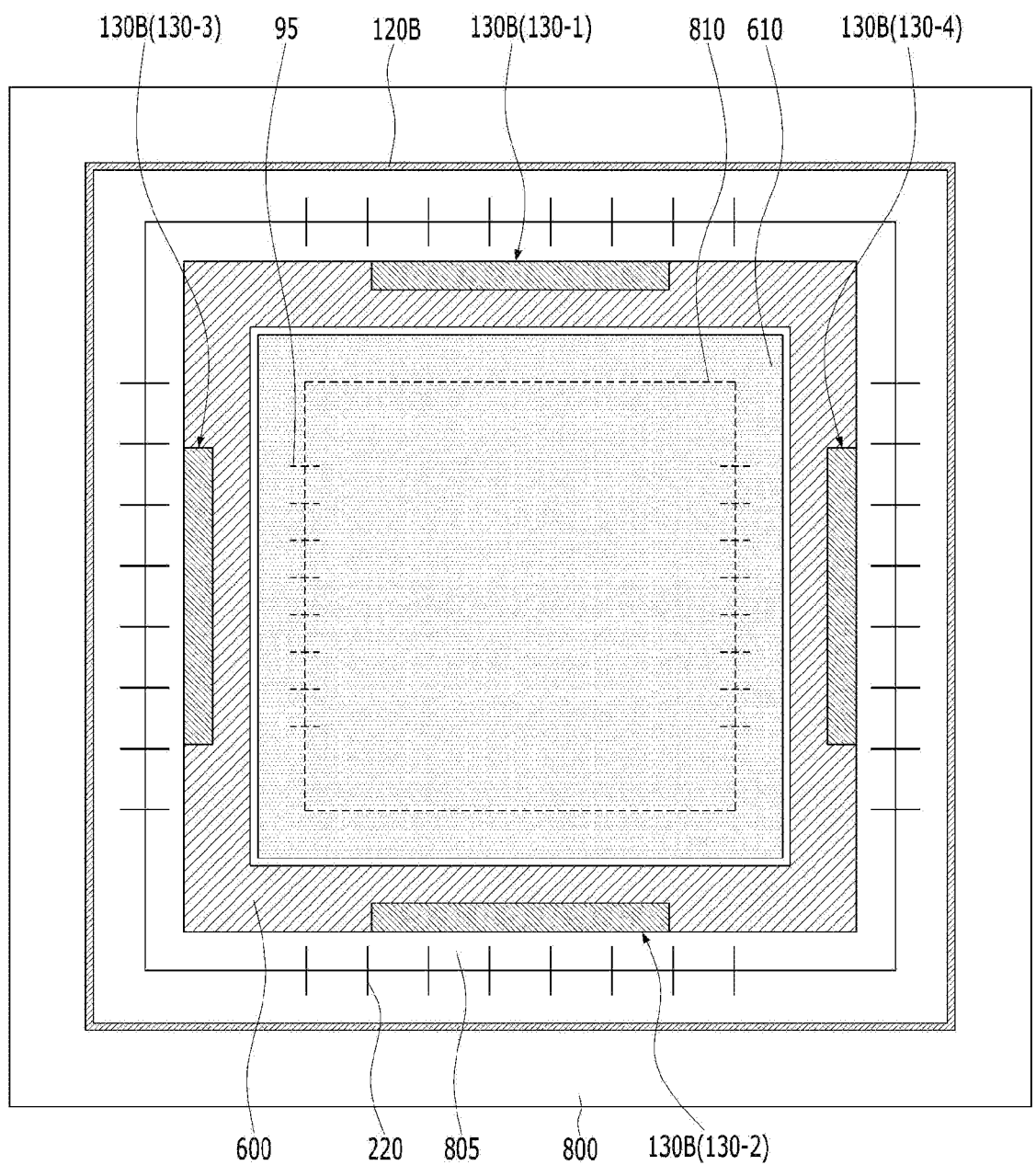
FIG. 6A is a schematic plan view of a first circuit board, a second circuit board, an image sensor, a holder, a filter, a coil, and a magnet shown in FIG. 5.

FIG. 5 is a schematic cross-sectional view of a camera module 200-3 according to still another embodiment, and FIG. 6A is a schematic plan view of a first circuit board 800, a second circuit board 805, an image sensor 810, a holder 600, a filter 610, a coil 1208, and a magnet 130B shown in FIG. 5.

The camera module 200-3 is a modified example of the camera module 200-1 shown in FIG. 1. The coil 1208 may be disposed on the side plate 142 of the housing 140, and the magnet 130B may be disposed on the side surface (e.g. the outer side surface) of the holder 600.

In an example, the coil 1208 and the magnet 1308 may face or overlap each other in a direction parallel to a line that is perpendicular to the optical axis OA and passes through the optical axis.

The only difference between the coil 120B and the coil 120 shown in FIG. 1 is a disposition position thereof in the housing 140, and thus the coil 120 and the description related thereto may also be applied to the coil 120B.

The magnet 130B may include a plurality of magnets 130-1 to 130-4, which are disposed on the holder 600 so as to be spaced apart from each other.

Each of the plurality of magnets 130-1 to 130-4 may be disposed on a corresponding one of the side portions of the holder 600.

Figure 6B:
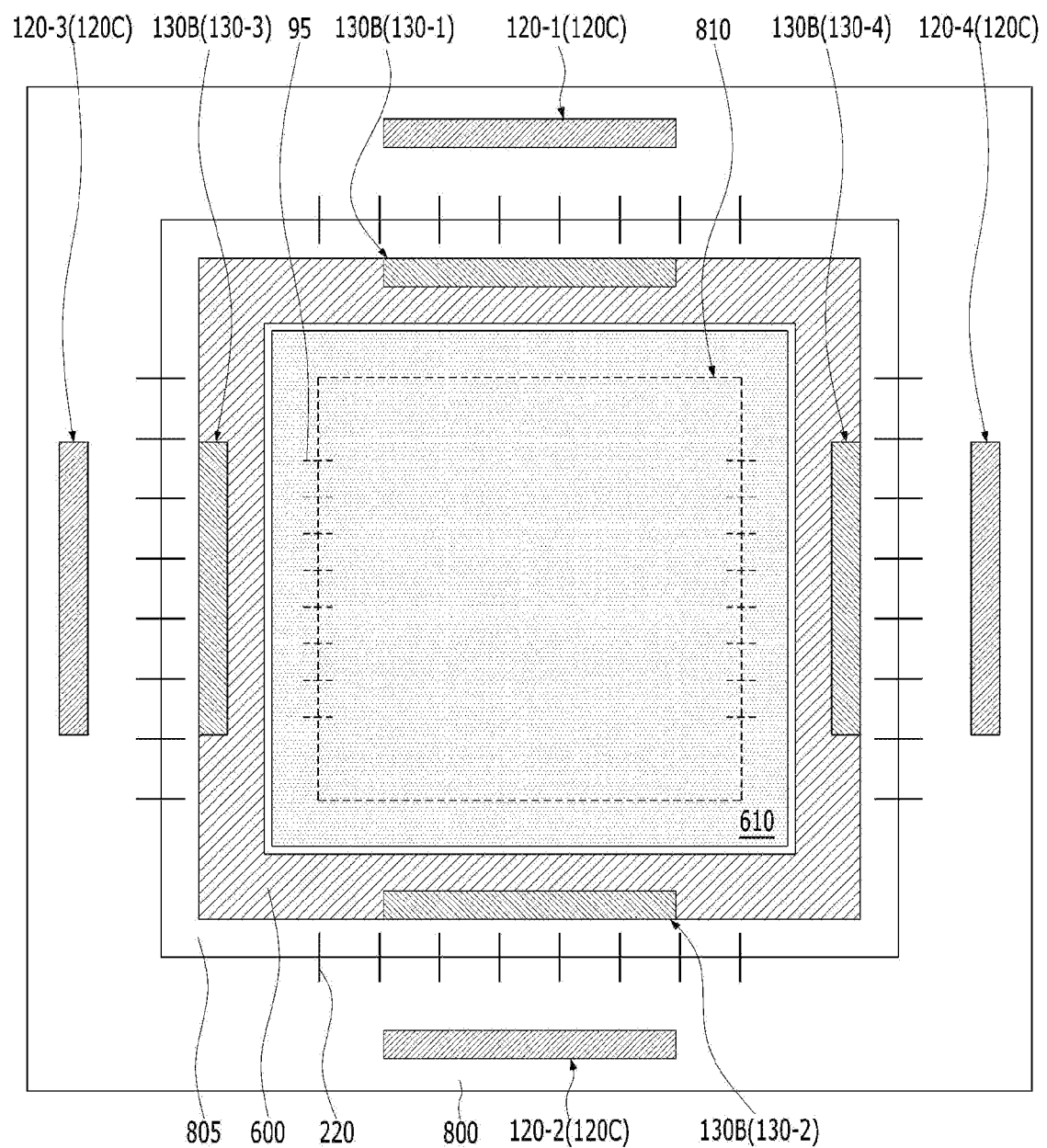
FIG. 6B is a modified embodiment of the coil shown in FIG. 6A.

FIG. 6B is a modified embodiment 120C of the coil 120B shown in FIG. 6A.

The coil 120B shown in FIG. 6A is formed in the shape of a single closed curve, for example, the shape of a ring. However, the coil 120C shown in FIG. 6B may include a plurality of coil units 120-1 to 120-4 corresponding to the plurality of magnets 130-1 to 130-4. In an example, the plurality of coil units 120-1 to 120-4 may be connected to each other in series, and may receive a single driving signal.

The length of the coil unit (e.g. 120-1) in the transverse direction (e.g. the X-axis direction) may be longer than the length of the corresponding magnet 130-1 in the transverse direction, but the disclosure is not limited thereto. In another embodiment, the length of the coil unit (e.g. 120-1) in the transverse direction may be shorter than or equal to the length of the corresponding magnet 130-1 in the transverse direction.

The length of the coil unit (e.g. 120-1) in the longitudinal direction (e.g. the Y-axis direction) may be longer than the length of the corresponding magnet 130-1 in the longitudinal direction, but the disclosure is not limited thereto. In another embodiment, the length of the coil unit (e.g. 120-1) in the longitudinal direction may be shorter than or equal to the length of the corresponding magnet 130-1 in the longitudinal direction.

The length of the coil unit (e.g. 120-1) in the optical-axis direction (e.g. the Z-axis direction) may be longer than the length of the corresponding magnet 130-1 in the optical-axis direction, but the disclosure is not limited thereto. In another embodiment, the length of the coil unit (e.g. 120-1) in the optical-axis direction may be shorter than or equal to the length of the corresponding magnet 130-1 in the optical-axis direction.

Figure 7:
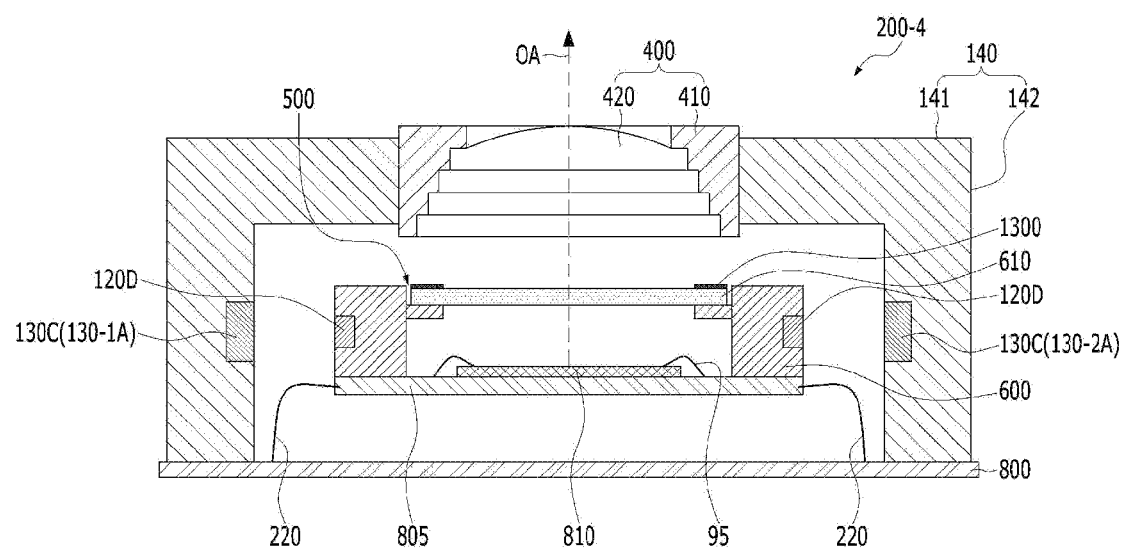
FIG. 7 is a schematic cross-sectional view of a camera module according to still another embodiment.
Figure 8:
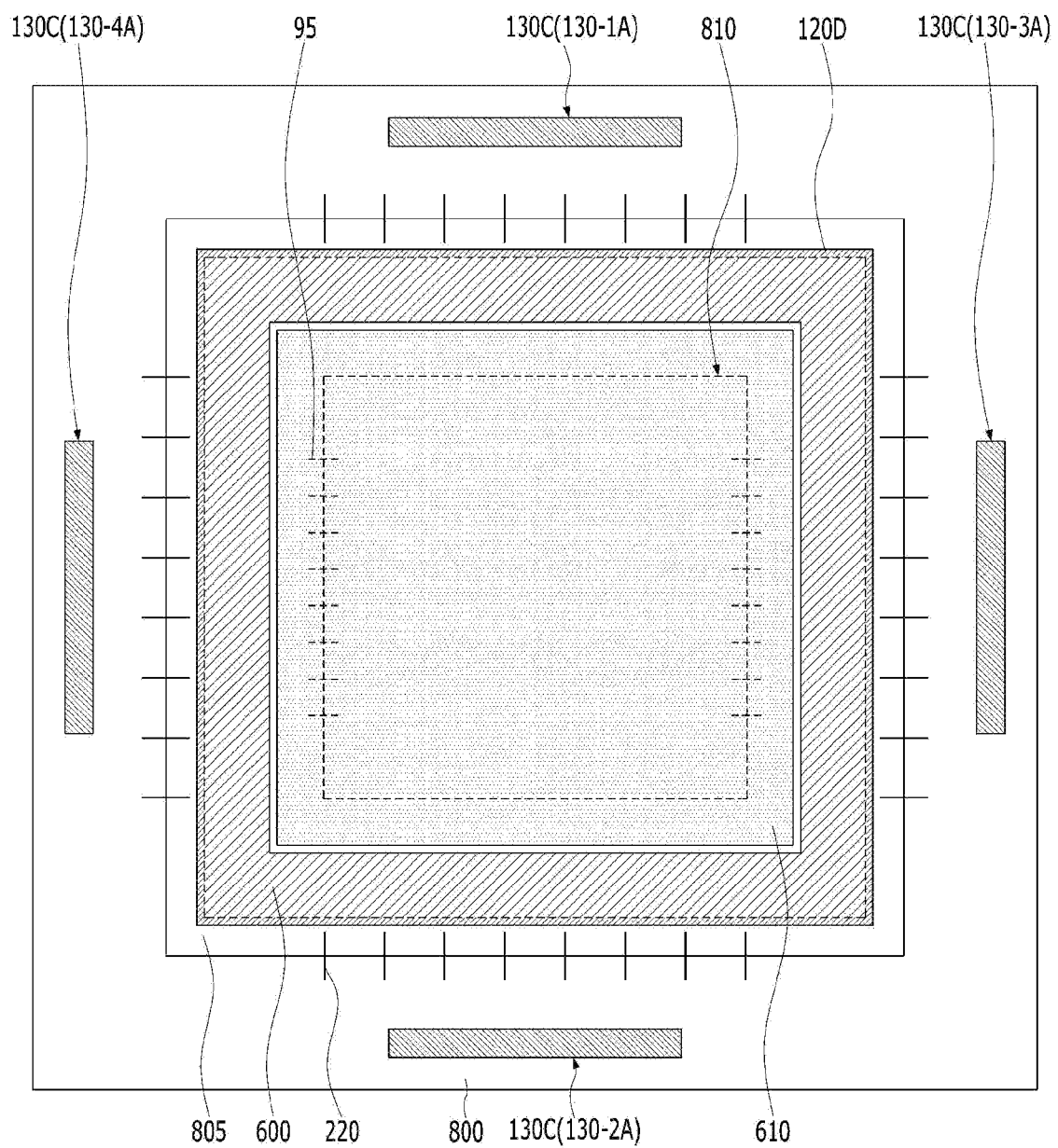
FIG. 8 is a schematic plan view of a first circuit board, a second circuit board, an image sensor, a holder, a filter, a coil, and a magnet shown in FIG. 7.

FIG. 7 is a schematic cross-sectional view of a camera module 200-4 according to still another embodiment, and FIG. 8 is a schematic plan view of a first circuit board 800, a second circuit board 805, an image sensor 810, a holder 600, a filter 610, a coil 120D, and a magnet 130C shown in FIG. 7.

The camera module 200-4 shown in FIGS. 7 and 8 may be a modified example of the camera module shown in FIG. 5. In FIGS. 7 and 8, the same reference numerals as those in FIG. 5 denote the same components, and a description thereof will be omitted or given in brief.

As shown in FIGS. 7 and 8, the magnet 130C may be disposed on the side plate 142 of the housing 140, and the coil 120D may be disposed on the side surface of the holder 600. The housing 140 shown in FIG. 7 may have a groove formed in the side plate 142 thereof to allow the magnet 130C to be disposed therein, and the holder 600 shown in FIG. 7 may have a groove formed in the side surface thereof to allow the coil 120D to be disposed therein.

The magnet 130C may face or overlap the coil 120D in a direction parallel to a line that is perpendicular to the optical axis OA and passes through the optical axis OA.

As shown in FIGS. 7 and 8, the magnet 130C may be secured to the housing 140 so as not to be movable, and the coil 120D may be moved in the optical-axis direction together with the circuit board 805, the image sensor 810, and the holder 600.

The coil 120D may be coupled to the holder 600. In an example, the coil 120D may be disposed on the side surface of the holder 600, but the disclosure is not limited thereto.

In an example, the coil 120D may be disposed on the side surface of the holder 600 so as to have a closed-loop shape. In an example, the coil 120D may have a shape of a closed loop wound in the clockwise or counterclockwise direction about the optical axis OA, and may be wound around or disposed on the side surface of the holder 600.

In another embodiment, the coil may include at least one coil ring. In an example, the coil may include a plurality of coil units, and each of the plurality of coil units may be implemented in the form of a coil ring. The number of coil rings may be the same as the number of magnets 130C, but the disclosure is not limited thereto.

The magnet 130C may face or overlap the coil 120D in the optical-axis direction. In an example, the magnet 130C may include a plurality of magnets 130-1A to 130-4A, which are disposed on the side plate 142 of the housing 140 so as to be spaced apart from each other. Each of the plurality of magnets 130-1A to 130-4A may be disposed on a corresponding one of the side portions of the housing 140.

The coil 120D disposed on the holder 600 may be conductively connected to the second circuit board 805. The coil 120D shown in FIG. 7 may be conductively connected to the first circuit board 800 via the second circuit board 805 and the support member 220.

In an example, the holder 600 shown in FIG. 7 may be provided with a conductive layer, a conductor, or a circuit pattern to conductively connect the coil 120D to the second circuit board 805. Alternatively, a separate circuit board for conductively connecting the coil 120D to the second circuit board 805 may be disposed on the holder 600 shown in FIG. 7.

In another embodiment, the coil 120D may be disposed on the second circuit board 805 and may be directly connected to the second circuit board 805 in a conductive and physical manner.

Figure 9:
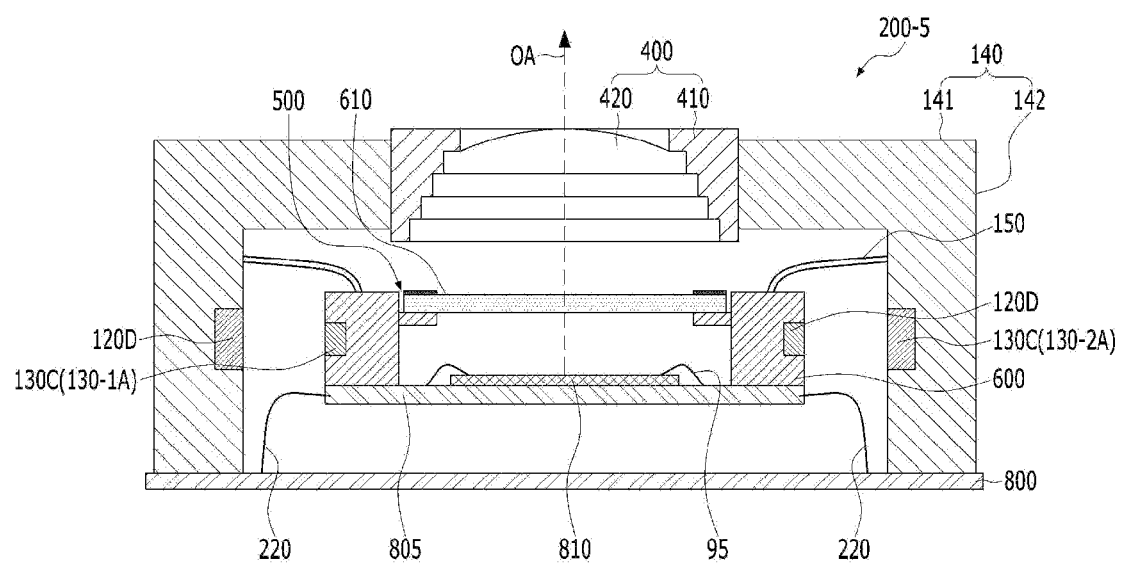
FIG. 9 is a schematic cross-sectional view of a camera module according to still another embodiment.

FIG. 9 is a schematic cross-sectional view of a camera module 200-5 according to still another embodiment. Referring to FIG. 9, the camera module 200-5 may further include an elastic member 150, which is coupled to the housing 140 and the holder 600.

One end of the elastic member 150 may be coupled to the housing 140, and the other end of the elastic member 150 may be coupled to the holder 600. Referring to FIG. 9, one end of the elastic member 150 is coupled to the side plate 142 of the housing 140, and the other end of the elastic member 150 is coupled to the upper surface of the holder 600. However, the disclosure is not limited thereto.

In another embodiment, one end of the elastic member 150 may be coupled to the upper plate 141 or the side plate 142 of the housing 140. In addition, the other end of the elastic member 150 may be coupled to the upper surface, the side surface, or the lower surface of the holder 600, or may be coupled to the second circuit board 805.

The elastic member 150 may elastically support the holder 600 and the second circuit board 805 with respect to the housing 140. The second circuit board 805 may be located so as to be spaced apart from the first circuit board 800 due to at least one of the elastic member 150 or the support member 220.

In an example, the elastic member 150 may include a first coupling portion coupled to the holder 600, a second coupling portion coupled to the housing 140, and a connecting portion interconnecting the first coupling portion and the second coupling portion. The first coupling portion of the elastic member 150 may alternatively be referred to as a "first frame" or an "internal portion," and the second coupling portion may alternatively be referred to as a "second frame" or an "external portion." In this case, the connecting portion may be bent or curved at least once in order to form a pattern having a predetermined shape.

In addition, the elastic member 150 may include a plurality of elastic units, which are spaced apart from each other. For example, the elastic member 150 may be implemented as a leaf spring, but the disclosure is not limited thereto. The elastic member 150 may be implemented as a coil spring or a suspension wire.

The elastic member 150 may also be applied to the camera modules 200-1 to 200-4 according to the embodiments described above.

Figure 10:
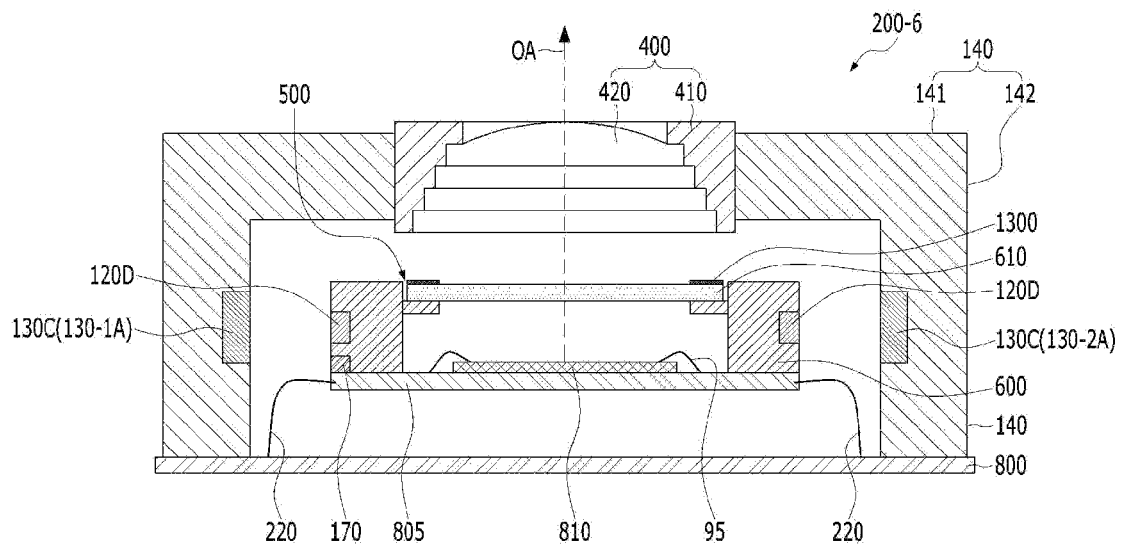
FIG. 10 is a schematic cross-sectional view of a camera module according to still another embodiment.
Figure 11:
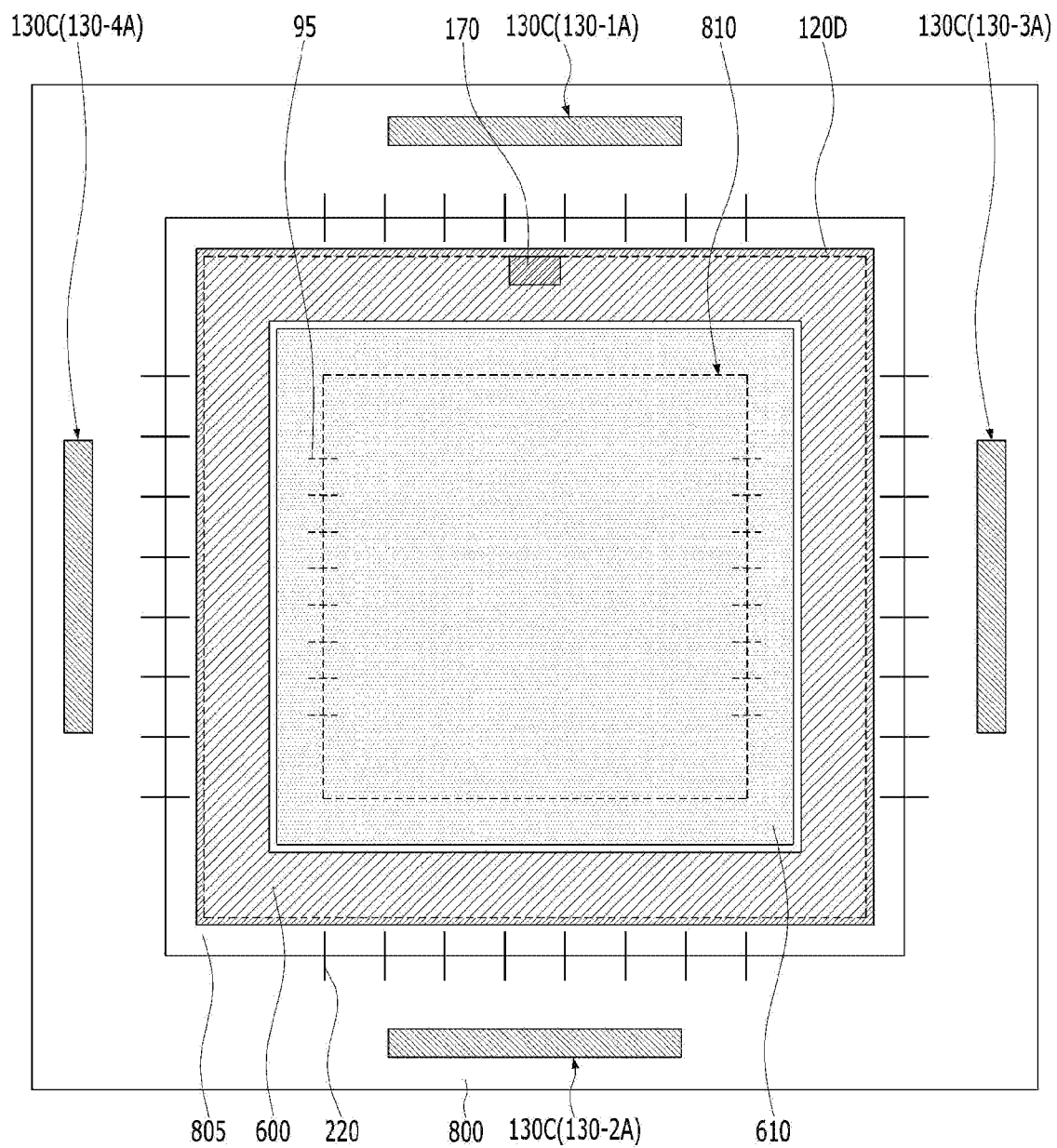
FIG. 11 is a schematic plan view of a first circuit board, a second circuit board, an image sensor, a holder, a filter, a coil, a magnet, and a position sensor shown in FIG. 10.

FIG. 10 is a schematic cross-sectional view of a camera module 200-6 according to still another embodiment, and FIG. 11 is a schematic plan view of a first circuit board 800, a second circuit board 805, an image sensor 810, a holder 600, a filter 610, a coil 120D, a magnet 130C, and a position sensor 170 shown in FIG. 10.

Referring to FIGS. 10 and 11, the camera module 200-6 may further include a position sensor 170. The position sensor 170 may be disposed on the holder 600.

The position sensor 170 disposed on the holder 600 may be moved in the optical-axis direction by electromagnetic force resulting from interaction between the coil 120D and the magnet 130C. The position sensor 170 may detect the intensity of a magnetic field of the magnet 130C, and may output an output signal corresponding to the result of detection.

For example, the position sensor 170 may be implemented as a Hall sensor or a driver IC including a Hall sensor.

The position sensor 170 may be conductively connected to the second circuit board 805. In addition, the position sensor 170 may be conductively connected to the first circuit board 800.

In an example, the position sensor 170 may be conductively connected to the first circuit board 800 via the second circuit board 805 and the support member 220. A driving signal may be applied to the position sensor 170 from the first circuit board 800, and the output from the position sensor 170 may be transmitted to the first circuit board 800.

When the position sensor 170 is implemented as a Hall sensor alone, the position sensor 170 may include two input terminals for receiving a driving signal and two output terminals for outputting an output signal. The two input terminals and the two output terminals may be conductively connected to the second circuit board 805 and the first circuit board 800.

When the position sensor 170 is implemented as a driver IC, the position sensor 170 may include first and second terminals for receiving a driving signal and third and fourth terminals for transmitting and receiving a clock signal and a data signal related to the output from the Hall sensor using data communication using a protocol, for example I2C communication. In this case, the first to fourth terminals of the position sensor 170 may be conductively connected to the first and second circuit boards 805 and 800. In addition, in this case, the position sensor 170 may be conductively connected to the coil 120D, and may directly apply a driving signal to the coil 120D.

When the AF operation unit is located at the initial position, at least a portion of the position sensor 170 may overlap the magnet 130C in the horizontal direction, but the disclosure is not limited thereto. In another embodiment, the position sensor 170 and the magnet 130C may not overlap each other in the horizontal direction. The horizontal direction may be a direction perpendicular to the optical axis OA or a direction parallel to a line that is perpendicular to the optical axis OA and passes through the optical axis OA.

At least a portion of the position sensor 170 may overlap the coil 120D in the vertical direction, but the disclosure is not limited thereto. In another embodiment, the position sensor 170 may not overlap the coil 120D in the vertical direction. The vertical direction may be an optical-axis (OA) direction or a direction parallel to the optical axis OA.

In an example, the position sensor 170 may be directly disposed or mounted on the second circuit board 805, and may be directly connected to the second circuit board 805 in a conductive manner.

In another embodiment, the holder 600 may be provided with a conductive layer, a conductor, or a circuit pattern to conductively connect the position sensor 170 to the second circuit board 805. Alternatively, a separate circuit board for conductively connecting the position sensor 170 to the second circuit board 805 may be disposed on the holder 600.

Referring to FIG. 10, the position sensor 170 and the coil 120D are disposed on the holder 600, and the magnet 130C is disposed in the housing 140. However, the disclosure is not limited thereto.

In the above-described embodiment 200-1 or 200-3 in which the coil 120 or 120B is disposed in the housing 140 and the magnet 130 or 130B is disposed on the holder 600, the position sensor may be disposed in the housing 140. In this case, the position sensor may be conductively connected to the first circuit board 800. The position sensor may detect the intensity of a magnetic field of the magnet 130 or 130B, which is moved in the optical-axis direction together with the holder 600, and may output an output signal corresponding to the result of detection.

In addition, in an example, the housing 140 may be provided with a conductive layer, a conductor, or a circuit pattern to conductively connect the position sensor to the first circuit board 800. Alternatively, a separate circuit board for conductively connecting the position sensor to the first circuit board 800 may be disposed in the housing 140.

That is, the position sensor 170 applied to the embodiment 200-4 shown in FIG. 7 is illustrated in FIG. 10, but the disclosure is not limited thereto. The position sensor may also be applied to the other embodiments 200-1 to 200-3 and 200-5. In the embodiments 200-1 to 200-6, the position sensor may correspond to or face the magnet in the vertical direction or the horizontal direction.

Figure 12:
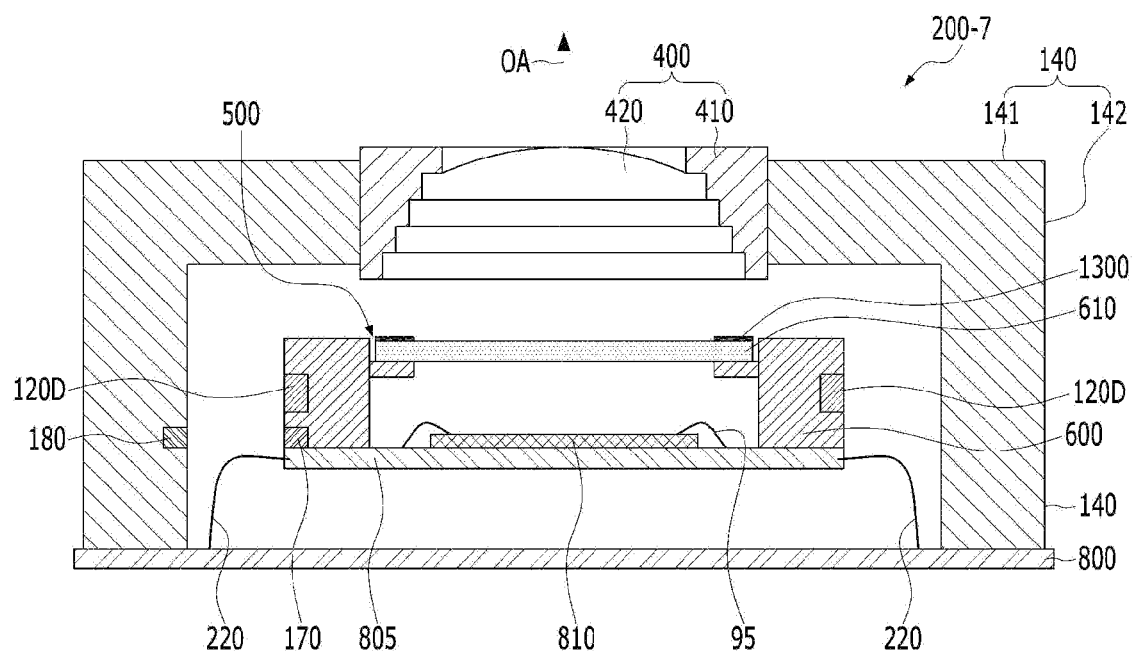
FIG. 12 is a schematic cross-sectional view of a camera module according to still another embodiment.
Figure 13A:
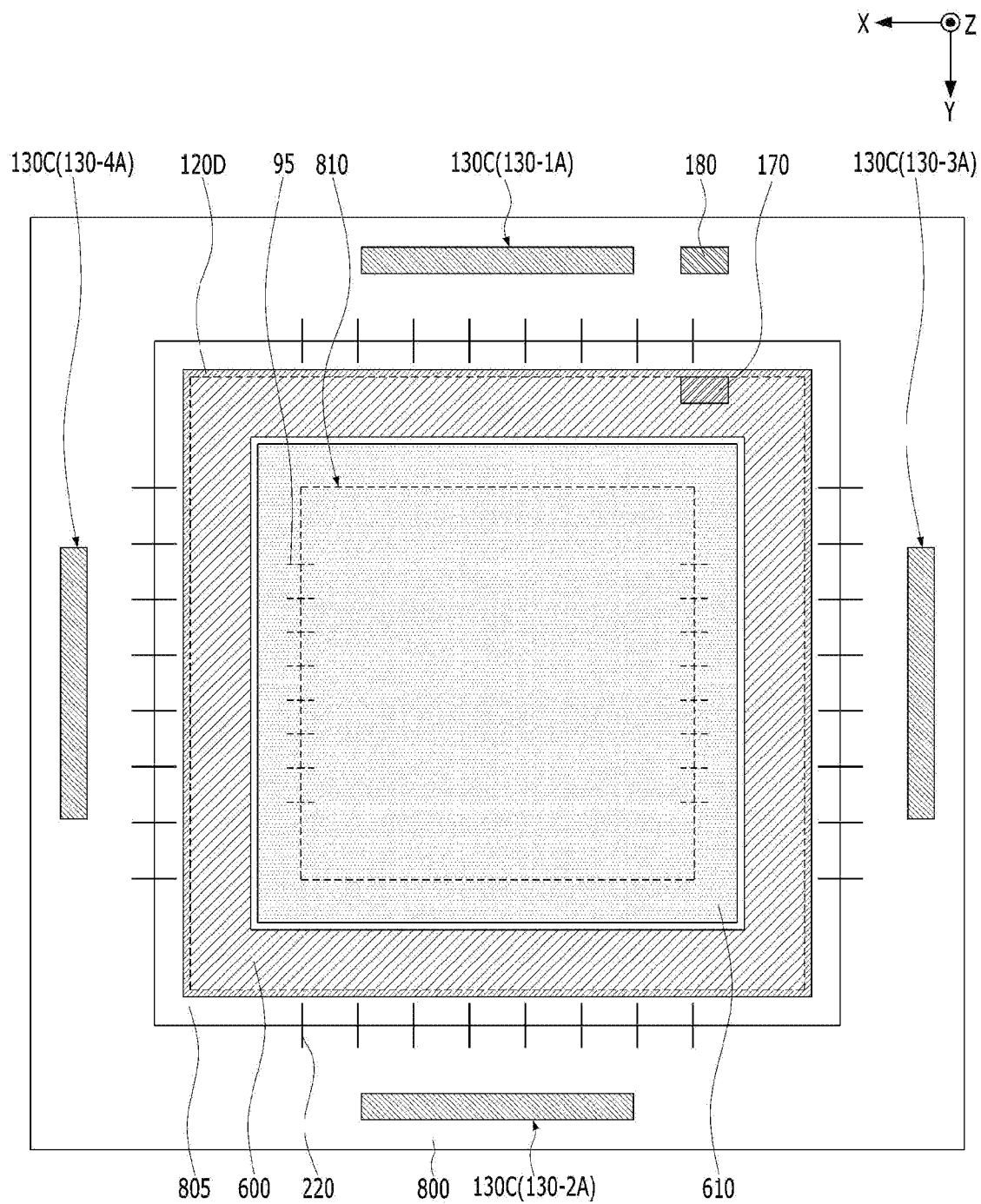
FIG. 13A is a schematic plan view of a first circuit board, a second circuit board, an image sensor, a holder, a filter, a coil, a magnet, a position sensor, and a sensing magnet shown in FIG. 12.
Figure 13B:
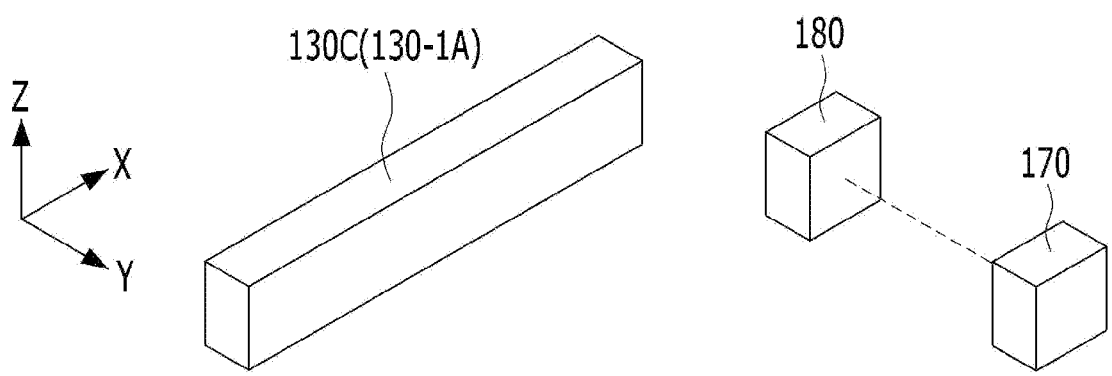
FIG. 13B shows an embodiment of relative disposition between the magnet, the sensing magnet, and the position sensor.

FIG. 12 is a schematic cross-sectional view of a camera module 200-7 according to still another embodiment, FIG. 13A is a schematic plan view of a first circuit board 800, a second circuit board 805, an image sensor 810, a holder 600, a filter 610, a coil 120D, a magnet 130C, a position sensor 170, and a sensing magnet 180 shown in FIG. 12, and FIG. 13B shows an embodiment of relative disposition between the magnet 130C, the sensing magnet 180, and the position sensor.

Referring to FIGS. 12, 13A, and 13B, the camera module 200-7 may further include a sensing magnet 180. The sensing magnet 180 may be disposed in the housing 140 so as to be spaced apart from the magnet 140. For example, the sensing magnet 180 may be a monopolar-magnetized magnet, which includes one N pole and one S pole, or may be a bipolar-magnetized magnet, which includes two N poles and two S poles.

In another embodiment, the sensing magnet 180 may be disposed on the holder 600, and the position sensor 170 may be disposed on the housing 140.

At least a portion of the sensing magnet 180 may overlap the position sensor 170 in a direction perpendicular to the optical axis, but the disclosure is not limited thereto. In another embodiment, the two components may not overlap each other in a direction perpendicular to the optical axis.

The coil 120D and the sensing magnet 180 may overlap each other in the optical-axis direction, but the disclosure is not limited thereto. In another embodiment, the two components may not overlap each other in the optical-axis direction.

The coil 120D and the sensing magnet 180 may overlap each other in a direction perpendicular to the optical axis, but the disclosure is not limited thereto. In another embodiment, at least a portion of the sensing magnet 180 may overlap the coil 120D in a direction perpendicular to the optical axis.

The position sensor 170 may be moved in the optical-axis (OA) direction together with the holder 600 by electromagnetic force resulting from interaction between the coil 120D and the magnet 130C, and the position sensor 170 may detect the intensity of a magnetic field of the sensing magnet 180, and may output an output signal corresponding to the result of detection. In an example, the position sensor 170 may detect the intensity of a magnetic field of the magnet 130C and the intensity of a magnetic field of the sensing magnet 180, and may output an output signal corresponding to the result of detection.

At least a portion of the position sensor 170 may face or overlap the sensing magnet 180 in the vertical direction, but the disclosure is not limited thereto. In another embodiment, the position sensor may not overlap the sensing magnet in the vertical direction.

As shown in FIG. 13B, the magnet 130C may not overlap the sensing magnet 180 in a direction perpendicular to the optical axis. In addition, the magnet 130C may not overlap the sensing magnet 180 in the optical-axis direction. In another embodiment, the magnet may overlap the sensing magnet in a direction perpendicular to the optical axis. In still another embodiment, the magnet may overlap the sensing magnet in the optical-axis direction.

The sensing magnet 180 applied to the embodiment 200-4 shown in FIGS. 7 and 8 is illustrated in FIGS. 12 and 13A, but the embodiments are not limited thereto. The sensing magnet may also be applied to the other embodiments 200-1 to 200-3 and 200-5. In an example, in the embodiments 200-1 and 200-3, the sensing magnet may be disposed on the holder 600. In addition, in the embodiments 200-1 to 200-6, at least a portion of the position sensor may face or overlap the sensing magnet in the vertical direction or the horizontal direction, but the disclosure is not limited thereto. In another embodiment, the two components may not overlap each other in the vertical direction or the horizontal direction.

Figure 14:
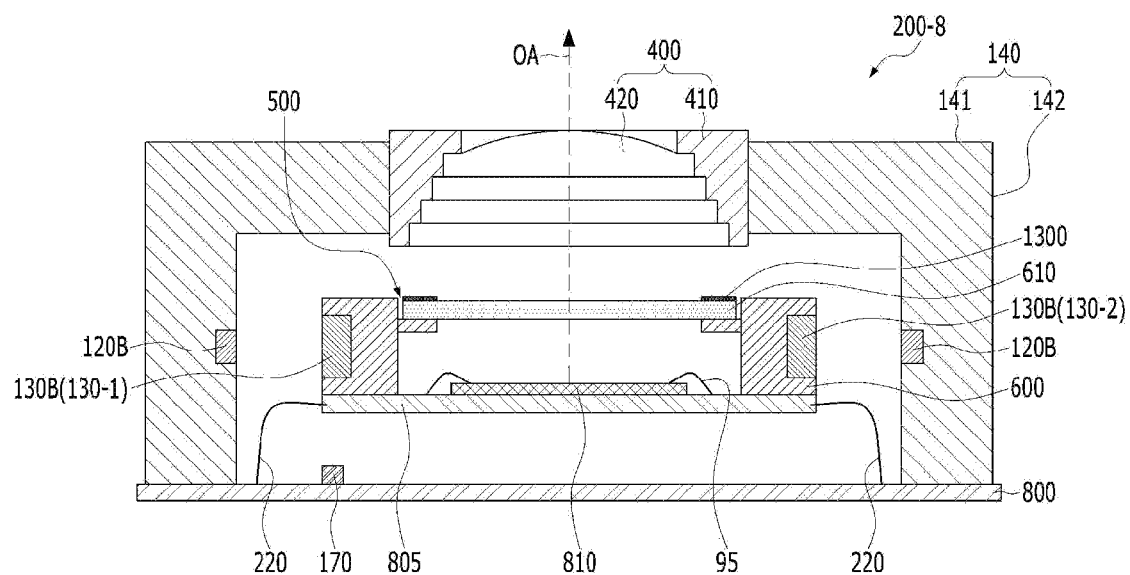
FIG. 14 is a schematic cross-sectional view of a camera module according to still another embodiment.

FIG. 14 is a schematic cross-sectional view of a camera module 200-8 according to still another embodiment.

Referring to FIG. 14, when the magnet 130B is disposed on the holder 600 and the coil 120B is disposed in the housing 140, the position sensor 170 may be disposed on the first circuit board 800.

In an example, at least a portion of the position sensor 170 may face or overlap the magnet 130B in the vertical direction, but the disclosure is not limited thereto. In another embodiment, the two components may not face or overlap each other in the vertical direction. In this case, the position sensor 170 may be mounted on the first circuit board 800, and may be directly connected to the first circuit board 800 in a conductive manner.

Figure 15A:
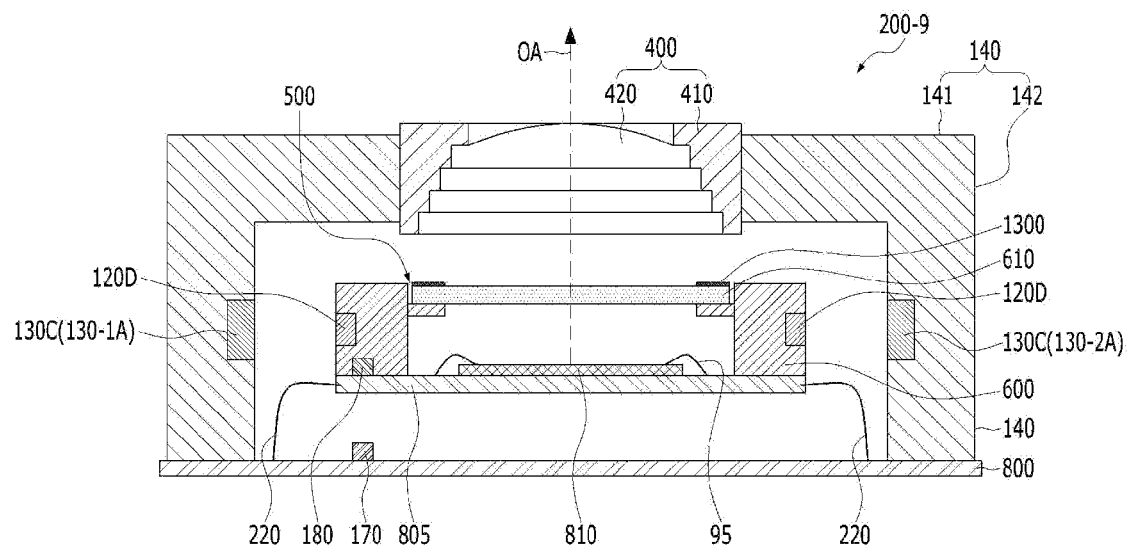
FIG. 15A is a schematic cross-sectional view of a camera module according to still another embodiment.

FIG. 15A is a schematic cross-sectional view of a camera module 200-9 according to still another embodiment.

Referring to FIG. 15A, in the camera module 200-9, the sensing magnet 180 may be disposed on the holder 600, and the position 170 may be disposed on the first circuit board 800.

At least a portion of the position sensor 170 may face or overlap the sensing magnet 180 in the vertical direction, but the disclosure is not limited thereto. In another embodiment, the two components may not face or overlap each other in the vertical direction.

In another embodiment, the position sensor may be disposed on the holder 600, and the sensing magnet may be disposed on the first circuit board 800.

Figure 15B:
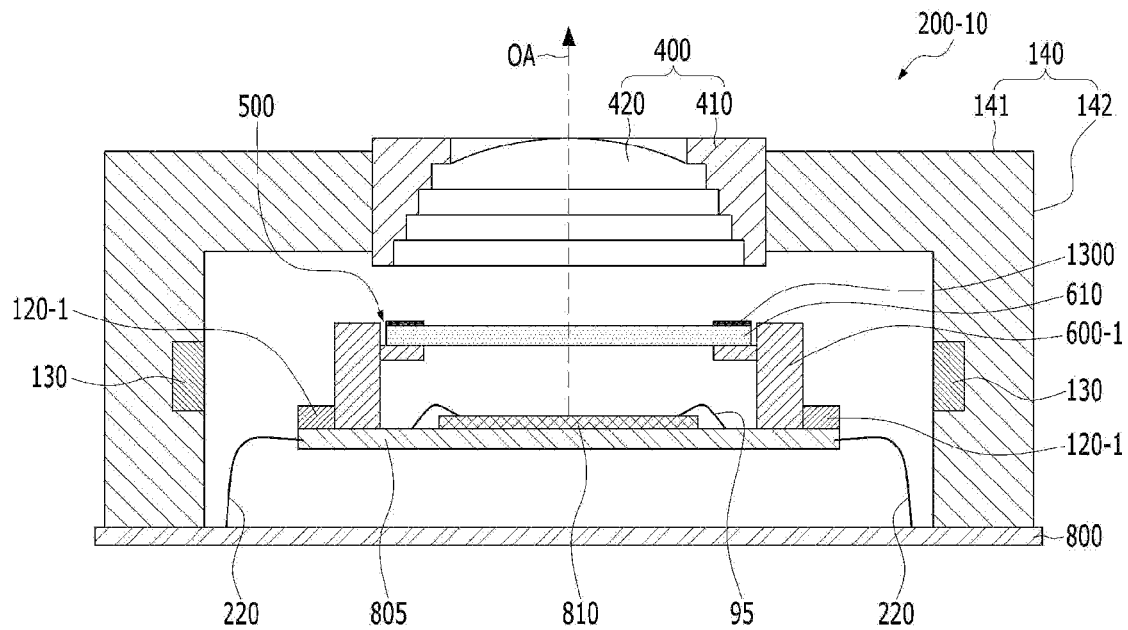
FIG. 15B is a schematic cross-sectional view of a camera module according to still another embodiment.

FIG. 15B is a schematic cross-sectional view of a camera module 200-10 according to still another embodiment. Referring to FIG. 15B, a coil 120-1 may be disposed on the upper surface of the second circuit board 805. In an example, the coil 120-1 may be disposed on the upper surface of the second circuit board 805 in the form of a coil unit. The coil 120-1 may be coupled to the second circuit board 805. In addition, the coil 120-1 may be conductively connected to the second circuit board 805.

Alternatively, in another embodiment, the coil 120-1 may be formed in the second circuit board 805 in the form of a circuit pattern or a wiring.

In an example, the coil 120-1 may be disposed in one region of the upper surface of the second circuit board 805, which is adjacent to the holder 600-1. The coil 120-1 may be disposed so as to be in contact with the holder 600-1, but the disclosure is not limited thereto. In another embodiment, the coil 120-1 may be disposed so as to be spaced apart from the holder 600-1.

In another embodiment, the magnet 130 may be disposed on the upper surface of the second circuit board 805, and the coil may be disposed in the housing 140.

Figure 15C:
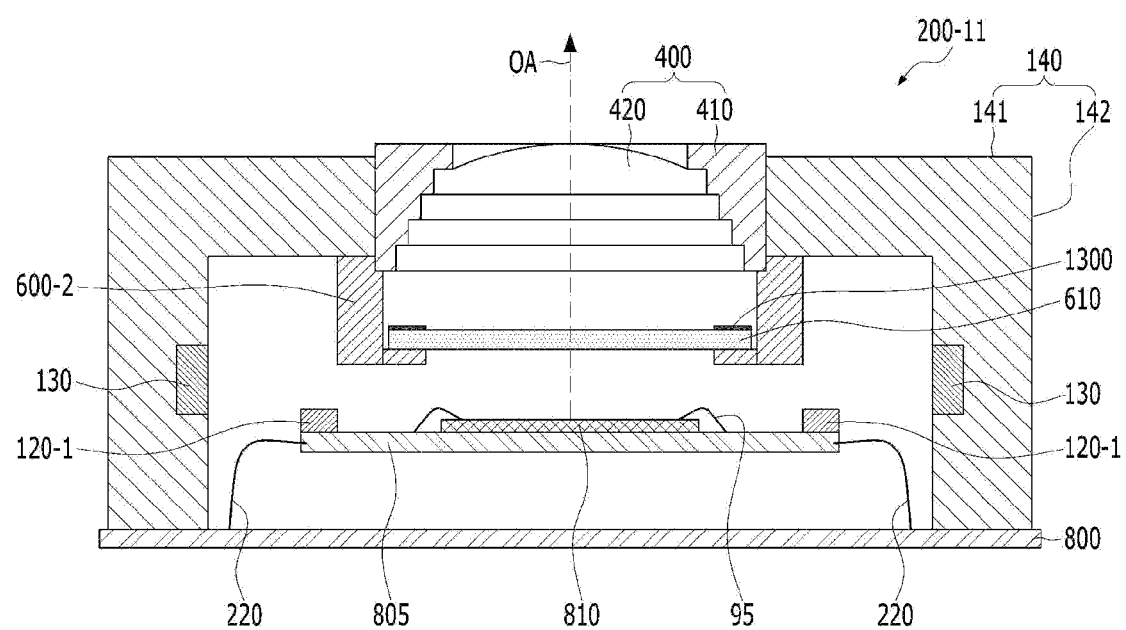
FIG. 15C is a schematic cross-sectional view of a camera module according to still another embodiment.

FIG. 15C is a schematic cross-sectional view of a camera module 200-10 according to still another embodiment.

Referring to FIG. 15C, a holder 600-2 may be spaced apart from the movable unit, and may be secured to the fixed unit.

In an example, the holder 600-2 may be secured to the lens barrel 410 or the housing 140.

In an example, the upper surface, the upper end, or the upper portion of the holder 600-2 may be coupled or attached to the lens barrel 410 or the housing 140. The filter 610 may be disposed on the holder 600-2.

As shown in FIG. 15C, the holder 600-2 and the filter 610 may be included in the fixed unit. When the movable unit (e.g. the image sensor 810) is moved in the optical-axis direction, the holder 600-2 and the filter 610 may be stationary in the optical-axis direction or a direction perpendicular to the optical axis, rather than being moved together with the movable unit.

The position sensor 170 shown in FIG. 14 may also be applied to the other embodiments shown in FIGS. 1 to 13 and 15A to 15C.

The sensing magnet 180 disposed on the holder 600 and the position sensor 170 disposed on the first circuit board 800 shown in FIG. 15A may also be applied to the other embodiments shown in FIGS. 1 to 14 and 15A to 15C.

The description of the holder 600-1 or 600-2, the coil 120-1, and the filter 610 shown in FIGS. 15B and 15C may also be applied to the other embodiments shown in FIGS. 1 to 14.

Figure 18:
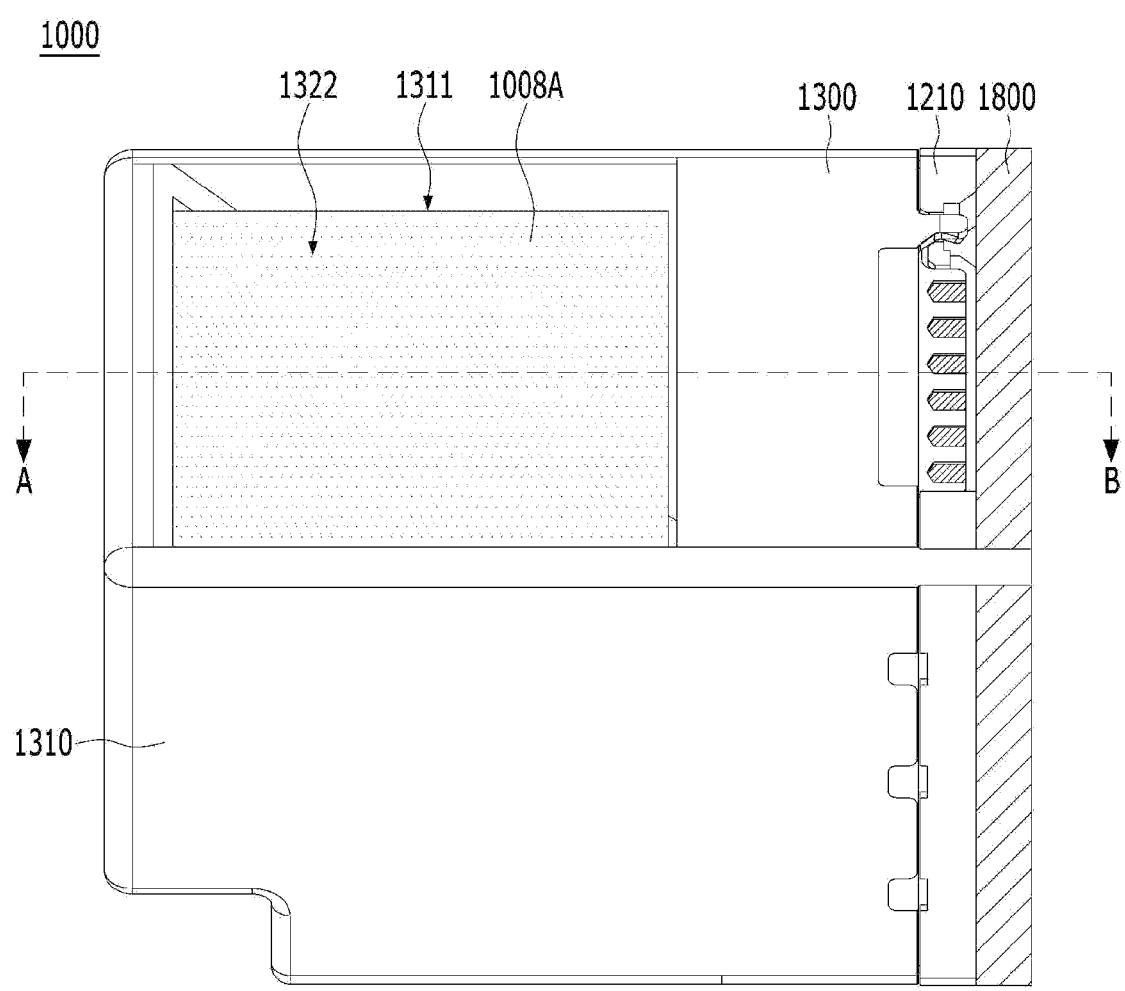
FIG. 18 is a perspective view of a camera module according to an embodiment.
Figure 19:
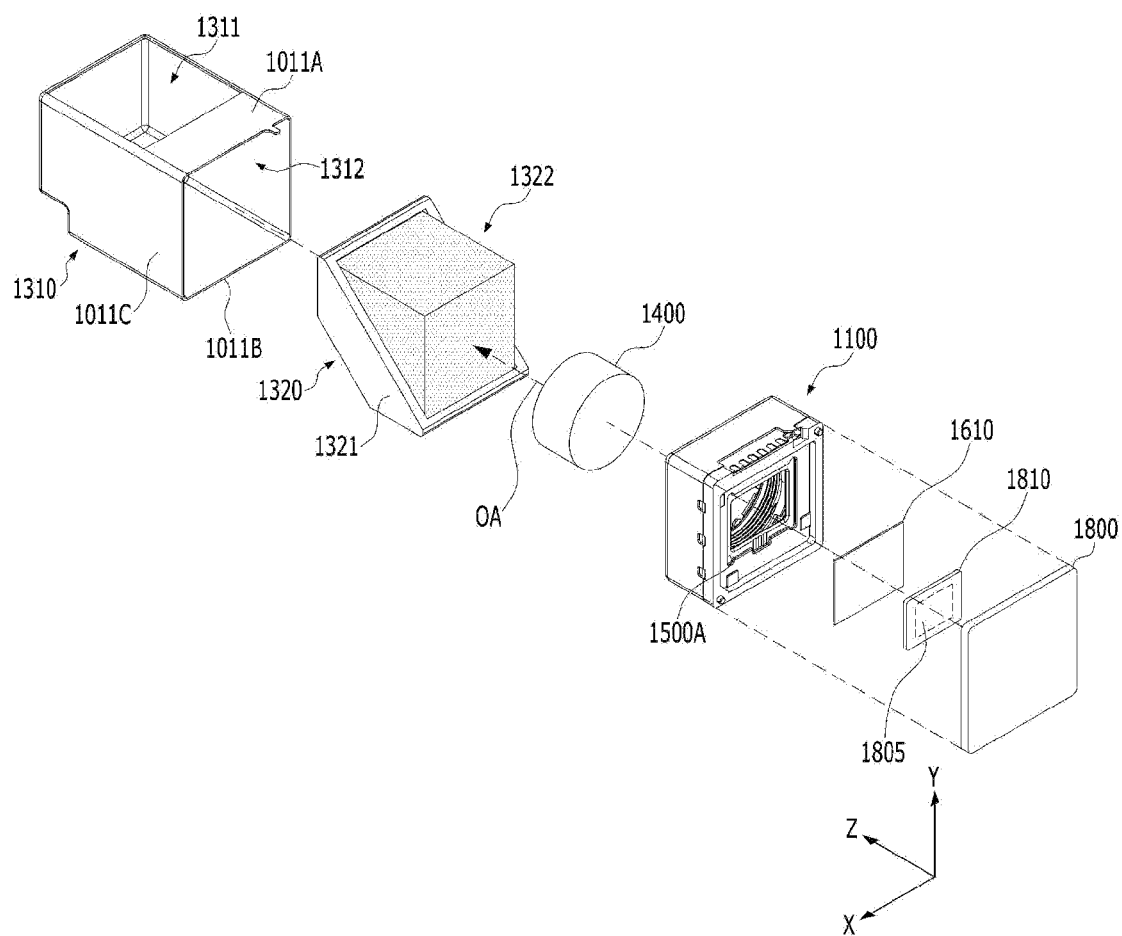
FIG. 19 is an exploded perspective view of the camera module shown in FIG. 18.
Figure 20:
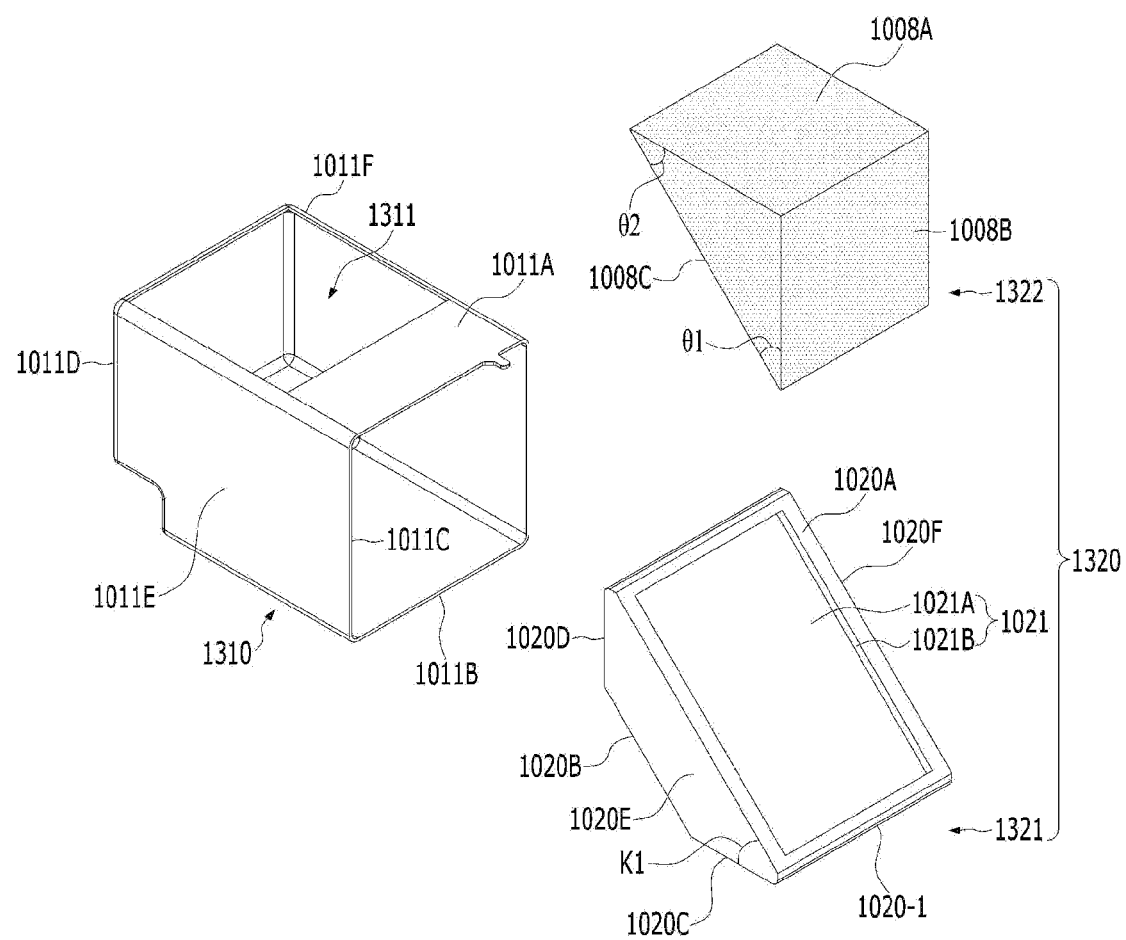
FIG. 20 is an exploded perspective view of a cover member and an optical-path changing unit.
Figure 21:
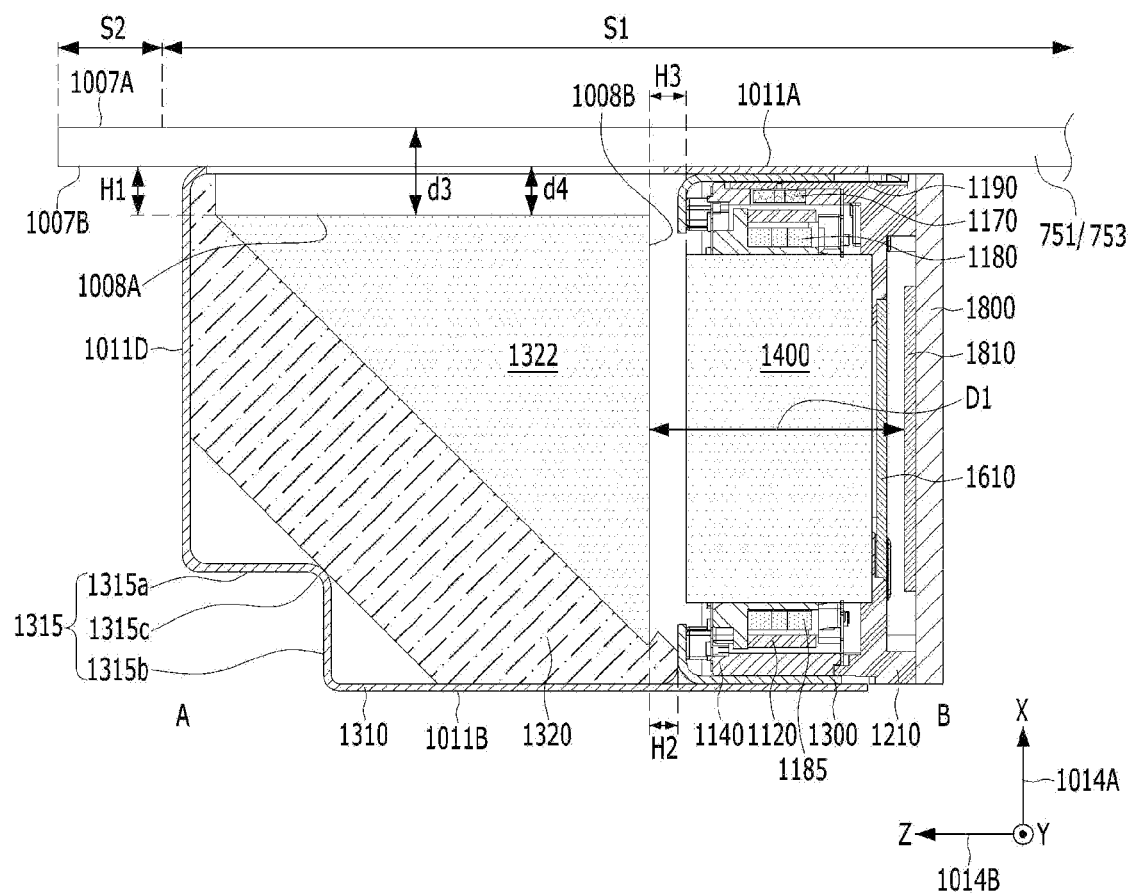
FIG. 21 is a cross-sectional view of the cover member and the optical-path changing unit shown in FIG. 20, taken along line AB.

FIG. 18 is a perspective view of a camera module 1000 according to an embodiment, FIG. 19 is an exploded perspective view of the camera module 1000 shown in FIG. 18, FIG. 20 is an exploded perspective view of a cover member 1310 and an optical-path changing unit 1320, and FIG. 21 is a cross-sectional view of the cover member 1310 and the optical-path changing unit shown in FIG. 20, taken along line AB.

Referring to FIGS. 18 to 21, the camera module 1000 may include an optical-path changing unit 1320, a moving unit 1100, and an image sensor 1810.

The moving unit 1100 may alternatively be referred to as a "lens-driving device," a "driving unit", a "voice coil motor (VCM)," an "actuator," or a "lens-moving device."

The camera module 1000 may further include at least one of the lens module 1400, the cover member 1310, or the circuit board 1800.

The cover member 1310 may accommodate the optical-path changing unit 1320, the moving unit 1100, and the lens module 1400.

The cover member 1310 may include an upper plate 1011A, a lower plate 1011B located opposite the upper plate 1011A, and side plates 1011C to 1011F disposed between the upper plate 1011A and the lower plate 1011B.

In an example, the side plates 1011C to 1011F may interconnect the upper plate 1011A and the lower plate 1011B, and may include a plurality of side plates. In an example, the cover member 1310 may include four side plates 1011C to 1011F, but the disclosure is not limited thereto.

The upper plate 1011A of the cover member 1310 may have a first opening 1311 formed therein to expose a first surface 1008A of a reflection member 1322.

In an example, the first surface 1008A of the reflection member 1322 may be located below the upper plate 1011A of the cover member 1310. In an example, the first surface 1008A of the reflection member 1322 may be disposed so as to be spaced apart from the inner surface of the upper plate 1011A of the cover member 1310.

In an example, the first surface 1008A of the reflection member 1322 may be located closer to the lower plate 1011B of the cover member 1310 than to the inner surface of the upper plate 1011A of the cover member 1310.

In addition, among the side plates of the cover member 1310, the first side plate 1011C may have a second opening 1312 formed therein, and the optical-path changing unit 1320 and the moving unit 1100 may be inserted into the cover member 1310 through the second opening 1312. In an example, the first side plate 1011C may be a side plate that faces the moving unit 1100.

In addition, a protrusion 1318 for coupling to a base 1210 may be formed on one side of the upper plate 1011A of the cover member 1310, which is adjacent to the second opening 1312.

In addition, a support portion 1315 for coupling to a holder 1321 of the optical-path changing unit 1320 may be formed on the inner side of the cover member 1310.

In an example, the support portion 1315 may be disposed between the side plate 1011D and the lower plate 1011B.

In an example, the support portion 1315 may be formed so as to protrude from the side plate 1011D, but the disclosure is not limited thereto. In an example, the support portion 1315 may include at least one bent portion or curved portion.

In an example, the support portion 1315 may include a first portion 1315a formed parallel to the upper plate 1011A, a second portion 1315b formed parallel to the side plate 1011D, and a third portion 1315c interconnecting the first portion 1315a and the second portion 1315b. In an example, the third portion 1315c may be a bent portion or a curved portion, and may support one surface (e.g. the lower surface 1020S) of the holder 1321.

The cover member 1310 shown in FIG. 18 accommodates both the optical-path changing unit 1320 and the moving unit 1100, but the disclosure is not limited thereto. In another embodiment, the cover member may include a first cover can (or a first cover) for accommodating the optical-path changing unit and a second cover can (or a second cover) for accommodating the moving unit 1100.

In addition, as shown in FIG. 18, a portion of the base 1210 of the moving unit 1100 and the circuit board 1800 are located outside the cover member 1310, but the disclosure is not limited thereto. In another embodiment, both the base 1210 and the circuit board 1800 may be disposed in the cover member.

Although not shown in FIGS. 18 and 19, the camera module 1000 may further include at least one of a connector disposed on the circuit board 1800, a motion sensor, or a controller.

The image sensor 1810 may receive an image contained in the light that is introduced thereinto through the optical-path changing unit 1320 and the lens module 1400, and may convert the received image into an electrical signal.

In an example, the image sensor 1810 may include a photographing area 1805 (refer to FIG. 19) for sensing the light that has passed through the lens module 1400. Here, the photographing area 1805 (refer to FIG. 19) may alternatively be referred to as an effective area, a light-receiving area, or an active area.

In an example, the image sensor 1810 may be a part into which the light that has passed through the filter 1610 is introduced so that an image contained in the light is formed.

The image sensor 1810 may be disposed or mounted on the circuit board 1800.

The circuit board 1800 may be provided with various circuits, elements, and a controller in order to convert an image formed in the image sensor 1810 into an electrical signal and to transmit the electrical signal to an external device. In addition, the circuit board 1800 may be provided with a circuit pattern, which is conductively connected to the image sensor and various elements.

The camera module 1000 may further include a filter 1610, which is disposed between the lens module 1400 and the image sensor 1810. The filter 1610 may be seated on or coupled to the lower surface of the base 1210 of the moving unit 1100. A seating portion 1500A, in which the filter 1610 is seated or disposed, may be provided in the lower surface of the base 1210. The seating portion 1500A may be formed in the shape of a recess depressed in the lower surface of the base 1210.

In another embodiment, a "sensor base" in which the filter is seated or disposed may be disposed between the base 1210 and the circuit board 1800.

The optical-path changing unit 1320 may include a reflection member 1322.

The optical-path changing unit 1320 may further include a holder 1321 for coupling, securing, or attaching the reflection member 1322 to the cover member 1310.

In another embodiment, the reflection member 1322 may be directly coupled, secured, or attached to the cover member 1310.

The holder 1321 may be disposed in the cover member 1310, and may be coupled, secured, or attached to the inner surface of the cover member 1310.

The holder 1321 may include an upper surface 1020A, a lower surface 1020B located opposite the upper surface 1020A, and side surfaces 1020C to 1020F located between the upper surface 1020A and the lower surface 10208.

In an example, the upper surface 1020A and the lower surface 1020B may be parallel to each other.

In an example, the upper surface 1020A of the holder 1321 may be an inclined surface that is inclined at a predetermined angle with respect to the upper plate 1011A of the cover member 1310. An internal angle K1 formed between the upper surface 1020A of the holder 1321 and the first side surface 1020C thereof may be an acute angle, but the disclosure is not limited thereto. In another embodiment, the internal angle formed between the two elements may be an obtuse angle or a right angle.

In an example, a first internal angle formed between the lower surface 10208 of the holder 1321 and the first side surface 1020C thereof may be an obtuse angle, and a second internal angle formed between the lower surface 1020B of the holder 1321 and the second side surface 1020D thereof may be an obtuse angle. In another embodiment, each of the first internal angle and the second internal angle may be an acute angle or a right angle. The second side surface 1020D may be a side surface located opposite the first side surface 1020C.

In an example, at least one of the first side surface 1020C of the holder 1321, the lower surface 1020B thereof, or the second side surface 1020D thereof may be coupled, secured, or attached to the inner surface of the cover member 1310.

In an example, the first side surface 1020C of the holder 1321 may face the inner surface of the lower plate 1011B of the cover member 1310, and may be coupled, secured, or attached to the inner surface of the lower plate 1011B.

In an example, the second side surface 1020D of the holder 1321 may face the inner surface of the second side plate 1011D of the cover member 1310, and may be coupled, secured, or attached to the inner surface of the second side plate 1011D.

In an example, the lower surface 1020B of the holder 1321 may face the support portion 1315 of the cover member 1310, and may be supported by the support portion 1315. In an example, the lower surface 1020B of the holder 1321 may be coupled, secured, or attached to the support portion 1315 of the cover member 1310.

In an example, the third side surface 1020E of the holder 1321 may face the inner surface of the third side plate 1011E of the cover member 1310, and may be coupled, secured, or attached to the inner surface of the third side plate 1011E.

In an example, the fourth side surface 1020F of the holder 1321 may face the inner surface of the fourth side plate 1011F of the cover member 1310, and may be coupled, secured, or attached to the inner surface of the fourth side plate 1011F.

The holder 1321 may include a seating portion 1021, in which the reflection member 1322 is disposed or mounted.

In an example, the seating portion 1021 may be formed in the upper surface 1020A of the holder 1321.

In an example, the seating portion 1021 may be formed in the shape of a recess depressed in the upper surface 1020A of the holder 1321, but the disclosure is not limited thereto. In another embodiment, the seating portion 1021 may be formed in the shape of a flat surface or a protruding portion protruding from the upper surface of the holder 1321.

In an example, the seating portion 1021 may include a bottom surface 1021A, which is stepped with respect to the upper surface 1020A of the holder 1321, and a side surface 1021B, which interconnects the bottom surface 1021A and the upper surface 1020A.

The holder 1321 may be in contact with the cover member 1300 of the moving unit 1100. In an example, the holder 1321 may be in contact with the upper plate 1302 of the cover member 1300 of the moving unit 1100.

In an example, the holder 1321 may be coupled, secured, or attached to the upper plate 1302 of the cover member 1300 of the moving unit 1100. In an example, an adhesive member may be disposed between the holder 1321 and the upper plate 1302 of the cover member 1300, and may couple the two components to each other.

In another embodiment, a first coupling portion may be formed on the holder 1321, a second coupling portion may be formed on the upper plate 1302 of the cover member 1300, and the first coupling portion and the second coupling portion may be coupled to each other. In an example, each of the first coupling portion and the second coupling portion may be formed in the shape of a protrusion, a recess, a hole, or a boss.

In an example, a portion of the first side surface 1020C of the holder 1321 may be coupled, secured, or attached to the upper plate 1302 of the cover member 1300. In an example, an edge portion 1020-1 at which the first side surface 1020C of the holder 1321 and the upper surface 1020A of the holder 1321 meet each other may be coupled, secured, or attached to the upper plate 1302 of the cover member 1300.

In an example, the holder 1321 may be coupled, secured, or attached to one region of the upper plate of the cover member 1300, which is closer to the second side plate of the cover member 1300 than to the first side plate of the cover member 1300. In an example, the first side plate of the cover member 1300 may be a side plate facing the side portion 1141-1 of the housing 1140, on which the circuit board 1190 is disposed, and the second side plate may be a side plate located opposite the first side plate.

At least a portion of the reflection member 1322 may be disposed in the seating portion 1021, and may be coupled, secured, or attached to the seating portion 1021. The holder 1321 may protect the reflection member 1322 from external impact.

In an example, the third surface 1008C of the reflection member 1322 may be coupled, secured, or attached to the bottom surface 1021A of the seating portion 1021. The bottom surface 1021A may be an inclined surface inclined with respect to the optical axis OA.

An emitting surface 1008B of the reflection member 1322 mounted on the holder 1321 may be disposed so as to face the lens module 1400. In an example, the emitting surface 1008B may face the image sensor 1810.

In an example, the emitting surface 1008B of the reflection member 1322 mounted on the holder 1321 may be perpendicular to the optical axis, but the disclosure is not limited thereto.

The reflection member 1322 may be a prism or a mirror, but the disclosure is not limited thereto. Any member may be used, so long as the same is capable of changing an optical path by reflecting or refracting light.

The reflection member 1322 may include a first surface 1008A, which is an incident surface on which light is incident, and a second surface 1008B, which is an emitting surface from which light is emitted.

The reflection member 1322 may reflect light introduced thereinto through the first surface 1008A so that the light is emitted through the second surface 1008B.

In an example, the reflection member 1322 may be a right-angled prism or a mirror, which includes the first surface 1008A, the second surface 1008B, and a third surface 1008C disposed between the first surface 1008A and the second surface 1008B. The first surface 1008A may alternatively be referred to as an "incident surface," the second surface 1008B may alternatively be referred to as an "emitting surface," and the third surface 1008C may alternatively be referred to as a "reflection surface."

In an example, an internal angle between the first surface 1008A and the second surface 1008B may be a right angle. In addition, in an example, each of a first internal angle θ1 between the first surface 1008A and the third surface 1008C and a second internal angle θ2 between the second surface 1008B and the third surface 1008C may be 30 degrees to 60 degrees. In an example, each of the first internal angle θ1 and the second internal angle θ2 may be 45 degrees, but the disclosure is not limited thereto.

In an example, the reflection member 1322 may further include a fourth surface, which faces the inner surface of the third side plate 1011E of the cover member 1310, and a fifth surface, which faces the inner surface of the fourth side plate 1011F of the cover member 1310. The fourth surface and the fifth surface of the reflection member 1322 may be located opposite each other, and may be in contact with the first to third surfaces 1008A to 1008C.

In an example, each of the first to third surfaces 1008A to 1008C may have a quadrangular shape, and each of the fourth and fifth surfaces may have a triangular shape.

The reflection member 1322 may be secured to the cover member 1310, and may move or may not move in the optical-axis direction. Further, the reflection member 1322 may move or may not move in a direction perpendicular to the optical axis OA.

In addition, the reflection member 1322 may not rotate about a first axis, which is parallel to the optical axis OA. In addition, the reflection member 1322 may not rotate about a second axis, which is perpendicular to the optical axis OA.

The lens module 1400 may be disposed on the image sensor 1810, and may be coupled to the bobbin 1110 of the moving unit 1100. The lens module 1400 may alternatively be referred to as a "lens unit" or a "lens assembly."

In an example, the lens module 1400 may include a lens barrel, which is coupled to the bobbin 1110, and a lens array, which is disposed in the lens barrel. The lens array may include at least one lens.

The lens barrel may have a cylindrical or polyhedral structure, and the cross-section thereof cut in a direction perpendicular to the optical axis may have a circular shape, an elliptical shape, or a polygonal shape, but the disclosure is not limited thereto. In an example, the lens barrel may have a screw thread or a screw groove formed in the outer side surface thereof in order to be coupled to the bobbin 1110, and the bobbin 1110 may have a screw thread or a screw groove formed therein in order to be coupled to the lens barrel. In another embodiment, the screw thread or the screw groove of each of the lens barrel and the bobbin may be omitted.

The moving unit 1100 may be coupled to the lens module 1400, and may move the lens module 1400 in the optical-axis direction. In an example, the moving unit 1100 may move at least one of the plurality of lenses included in the lens module 1400 in the optical-axis direction. In an example, the moving unit 1100 may move all of the plurality of lenses in the optical-axis direction. Alternatively, the moving unit 1100 may move some lenses adjacent to the second surface 1008B of the reflection member 1322.

Figure 22:
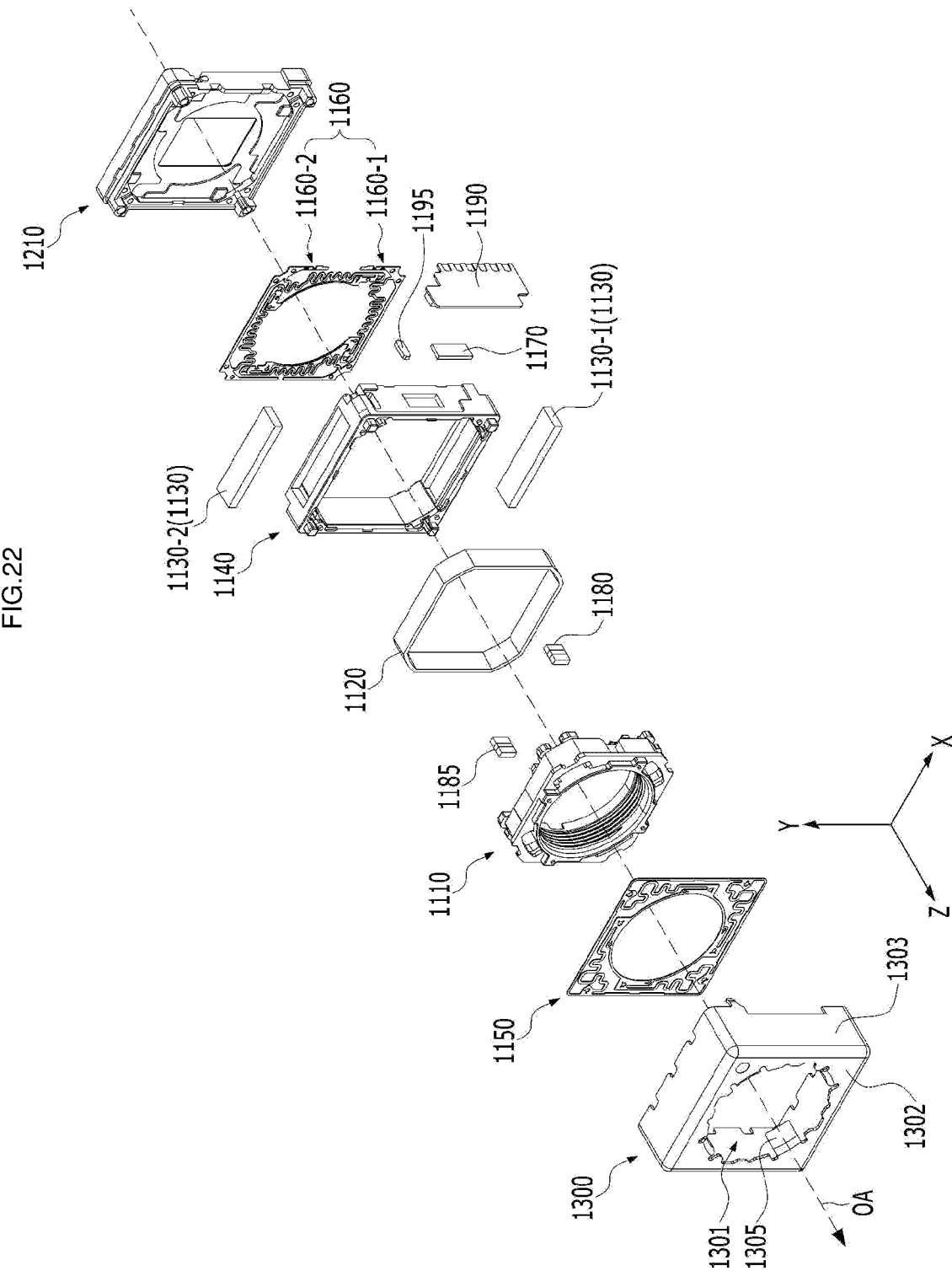
FIG. 22 is an exploded perspective view of a moving unit according to an embodiment.
Figure 23:
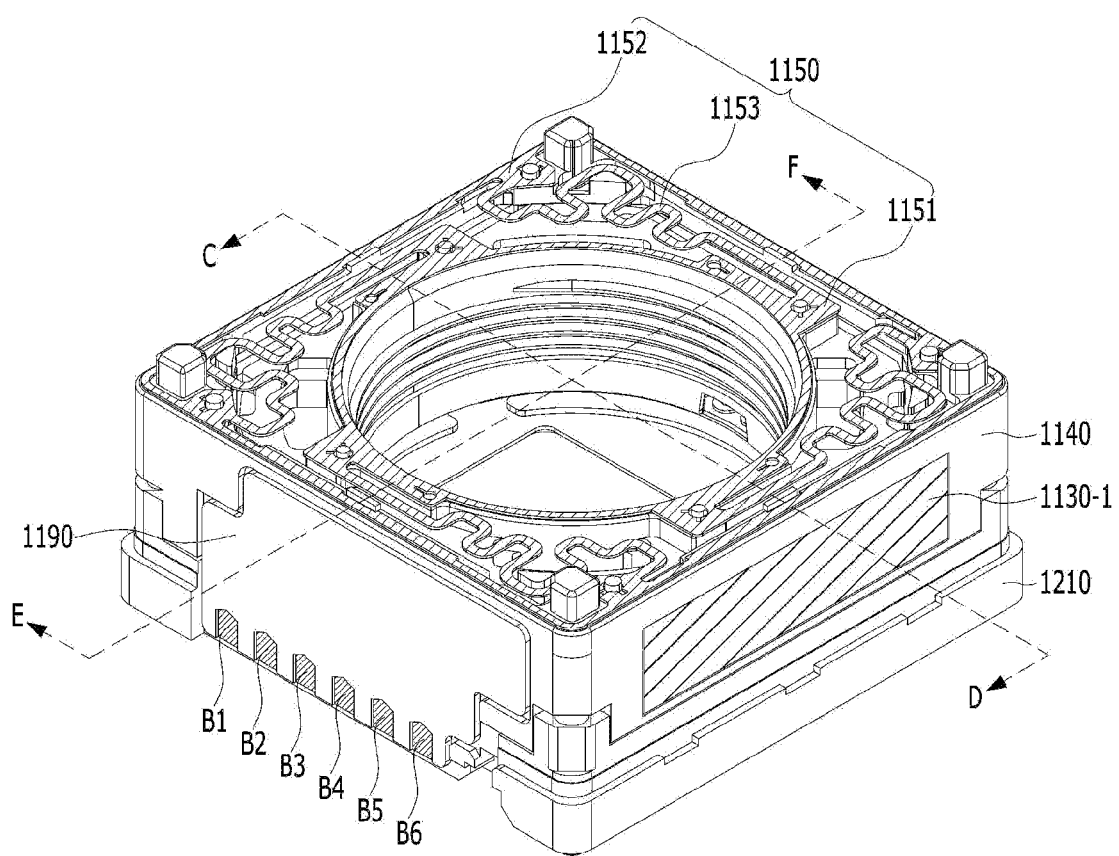
FIG. 23 is a perspective view of the moving unit, with the cover member removed therefrom.
Figure 24A:
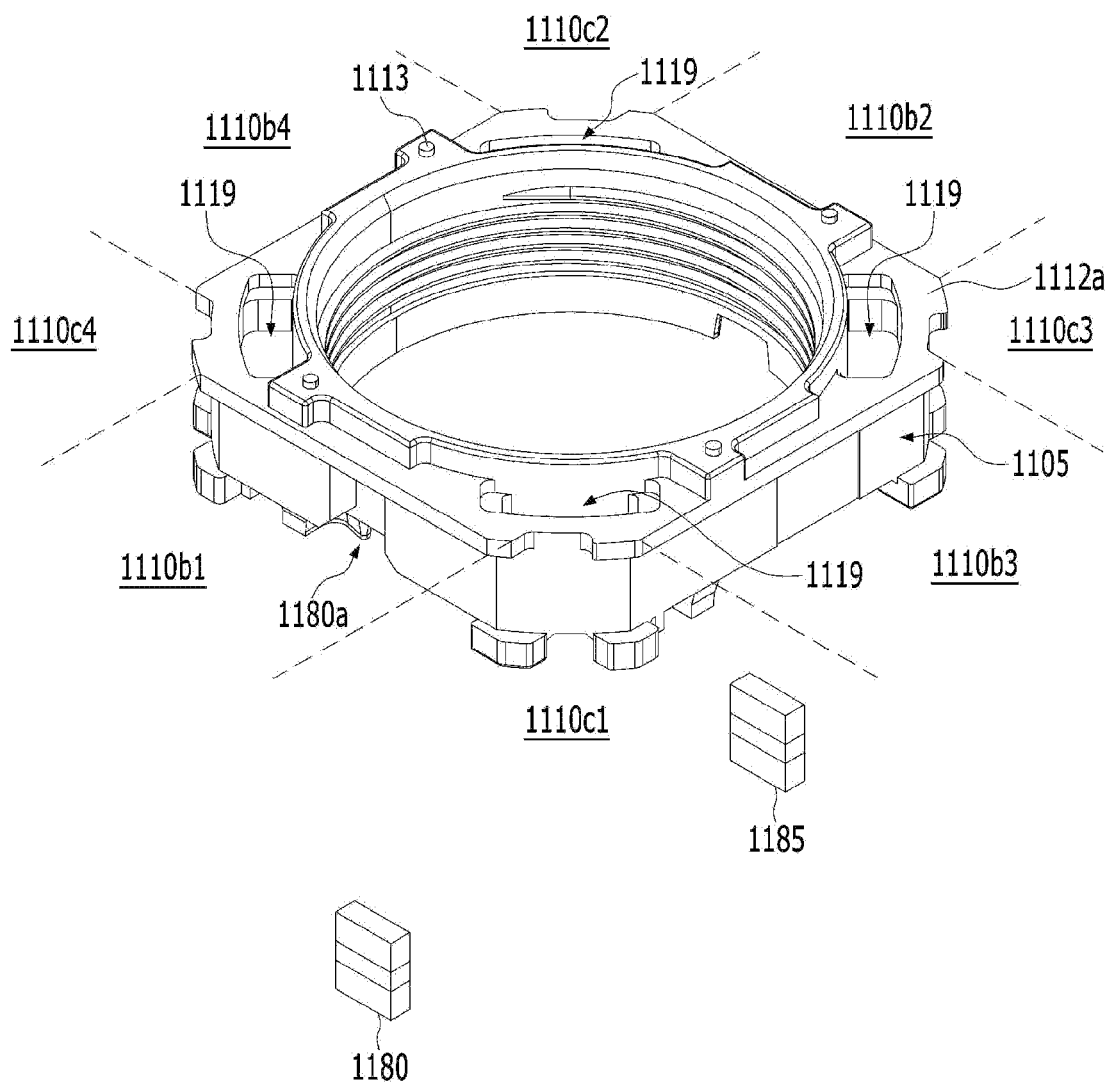
FIG. 24A is a perspective view of a bobbin, a sensing magnet, and a balancing magnet shown in FIG. 22.
Figure 24B:
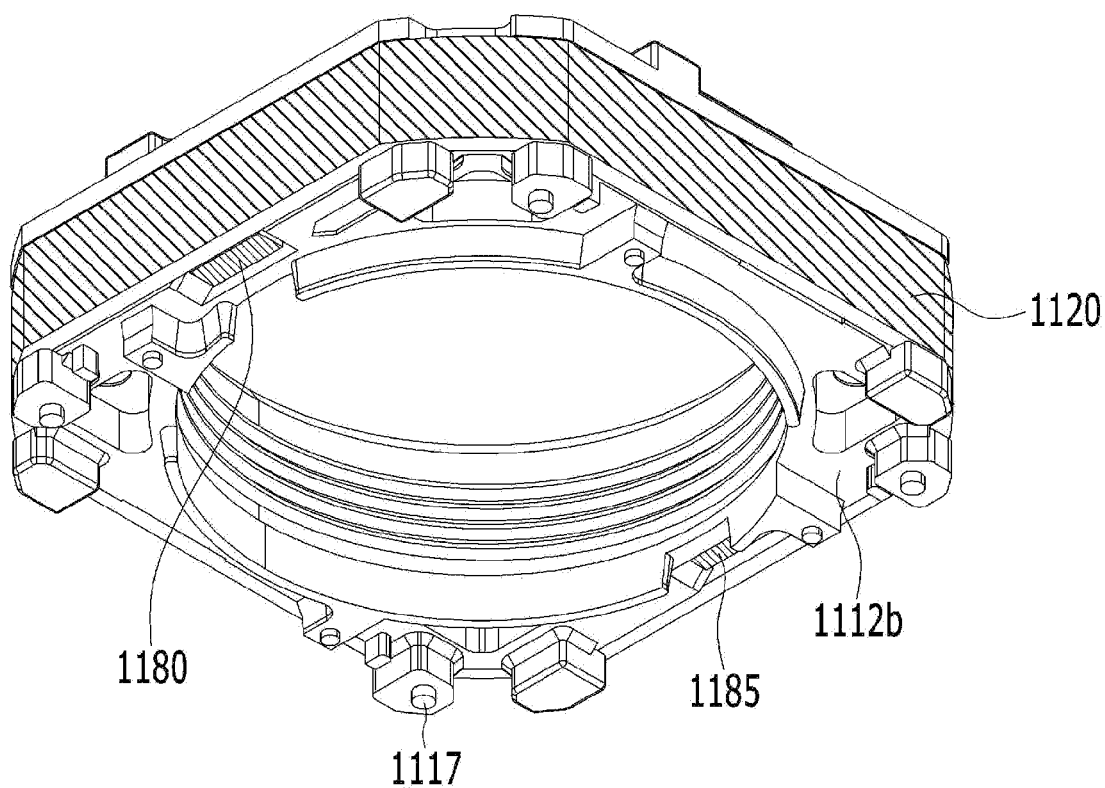
FIG. 24B is a view showing coupling between the bobbin, the coil, the sensing magnet, and the balancing magnet shown in FIG. 22.
Figure 25A:
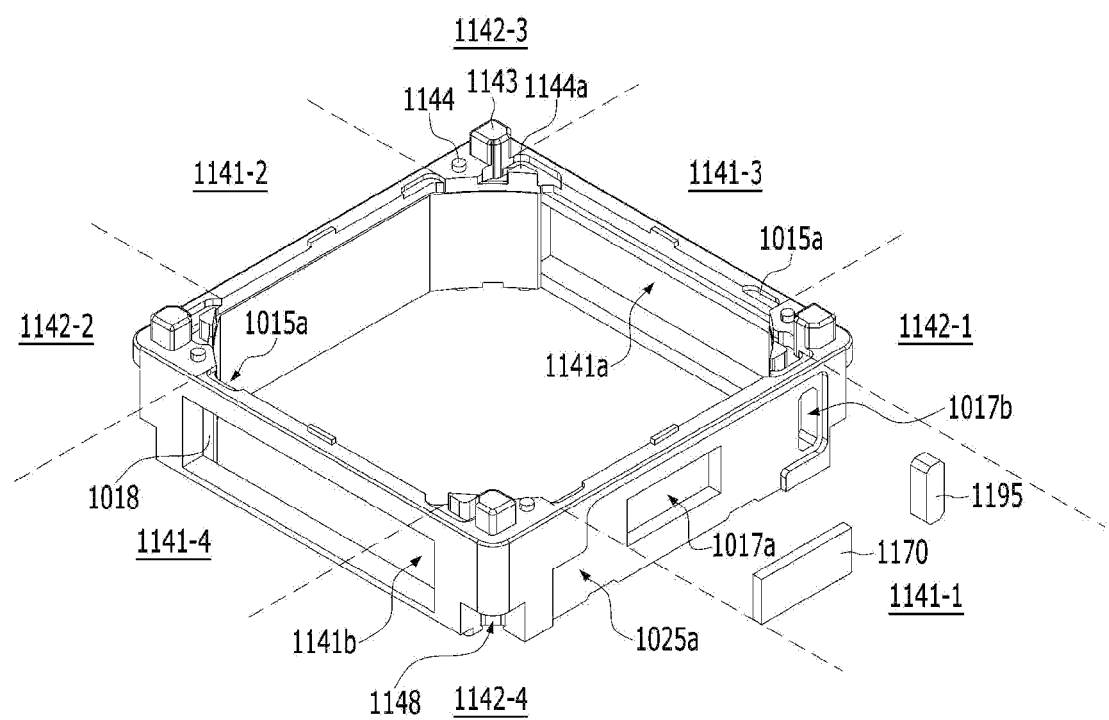
FIG. 25A is a perspective view of a housing, a position sensor, and a capacitor shown in FIG. 22.
Figure 25B:
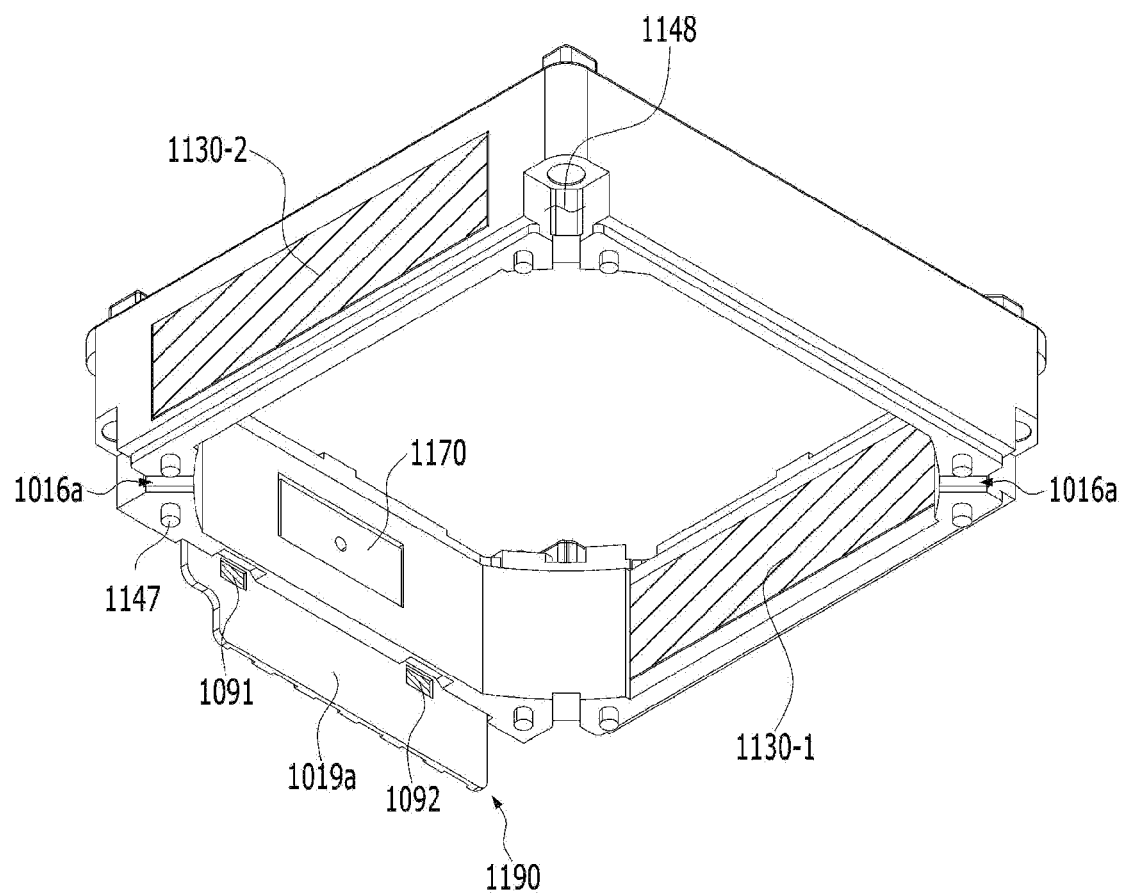
FIG. 25B is a perspective view of the housing to which first and second magnets, a circuit board, and the position sensor are coupled.
Figure 26:
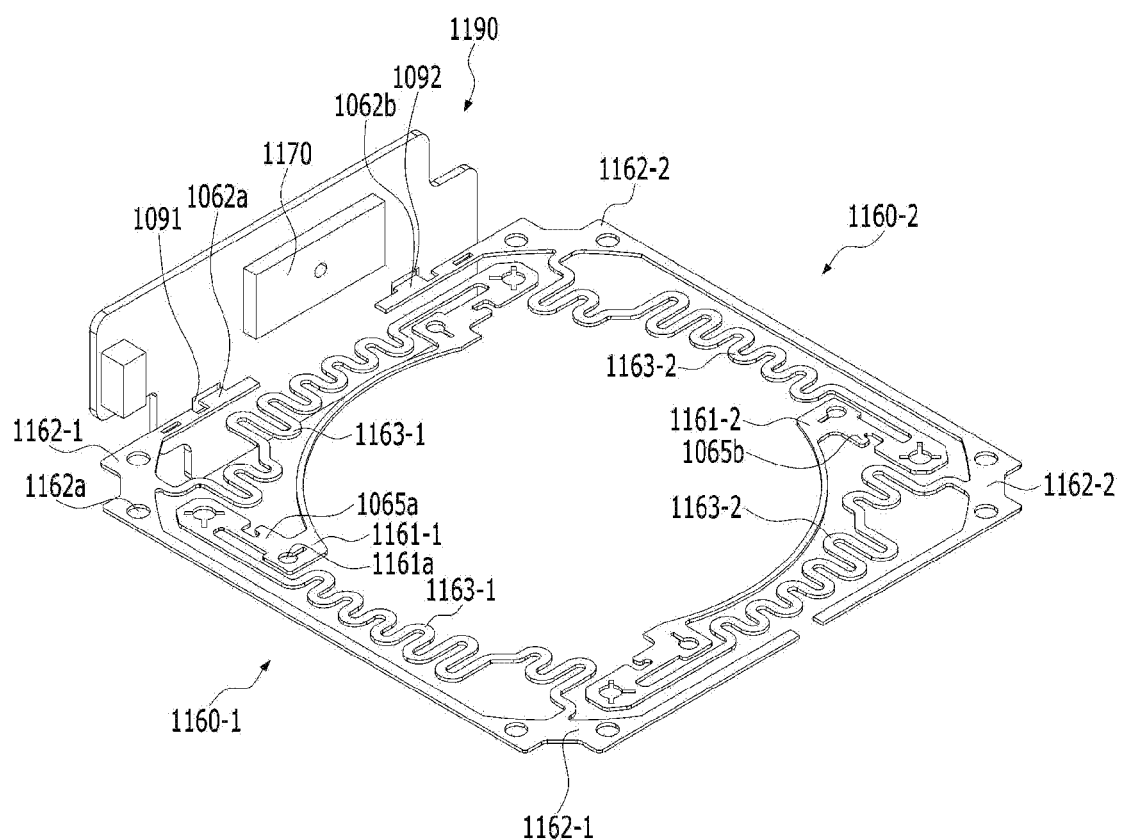
FIG. 26 is a view showing coupling between a lower elastic member, the circuit board, the position sensor, and the capacitor.
Figure 27:
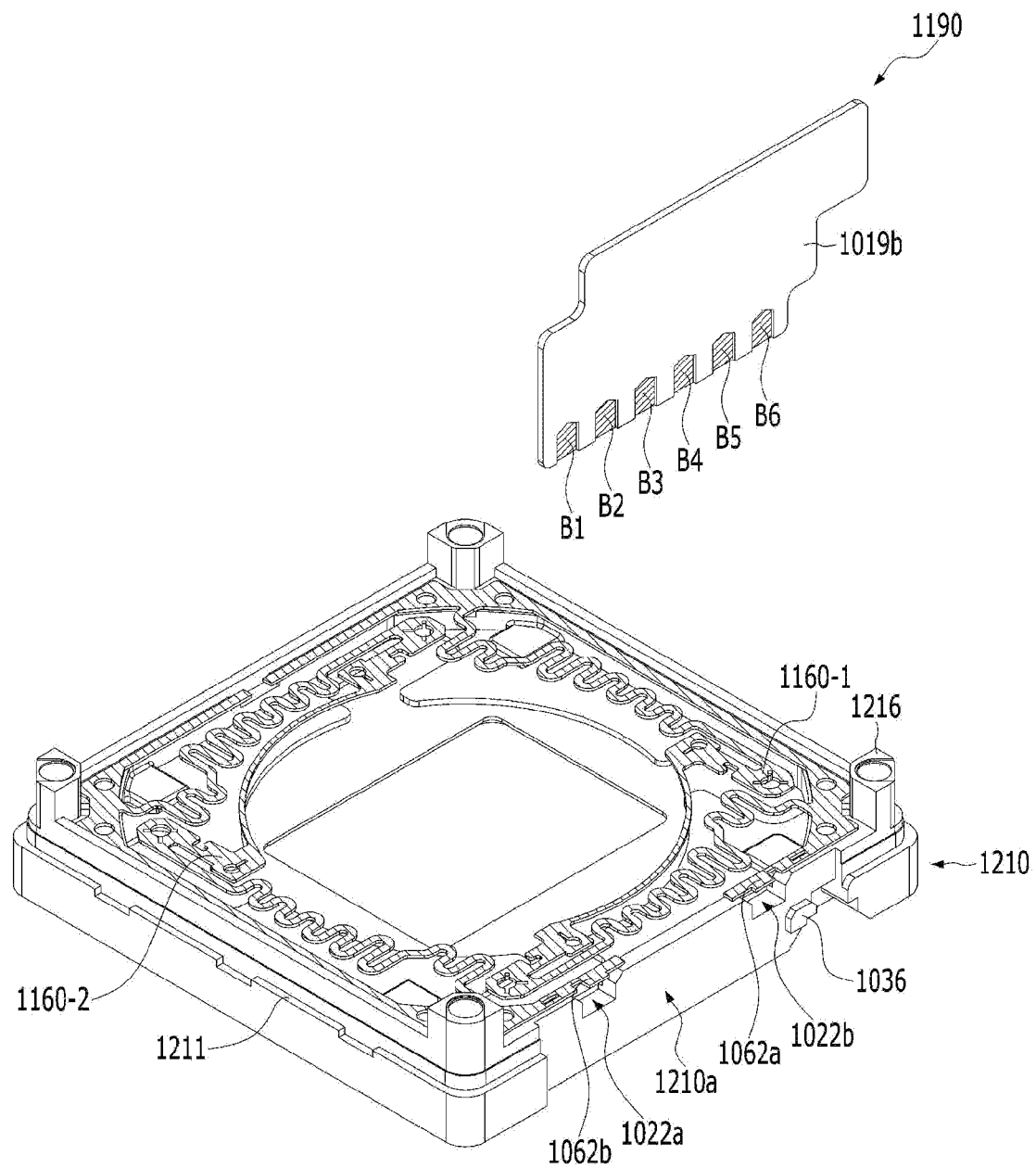
FIG. 27 is a perspective view of a base, the lower elastic member, and the circuit board.
Figure 28:
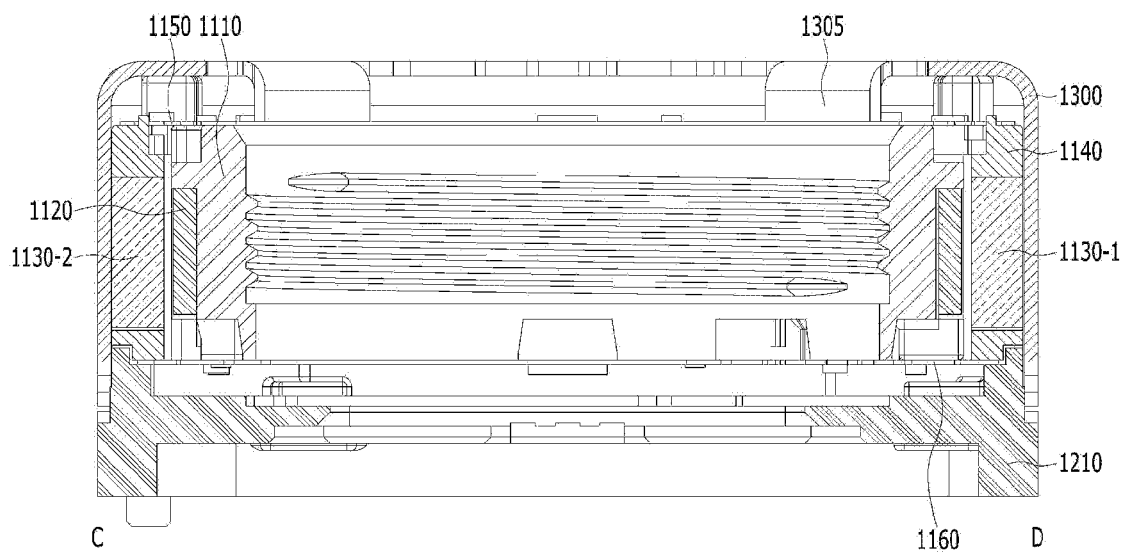
FIG. 28 is a cross-sectional view of the moving unit shown in FIG. 23, taken along line CD.
Figure 29:
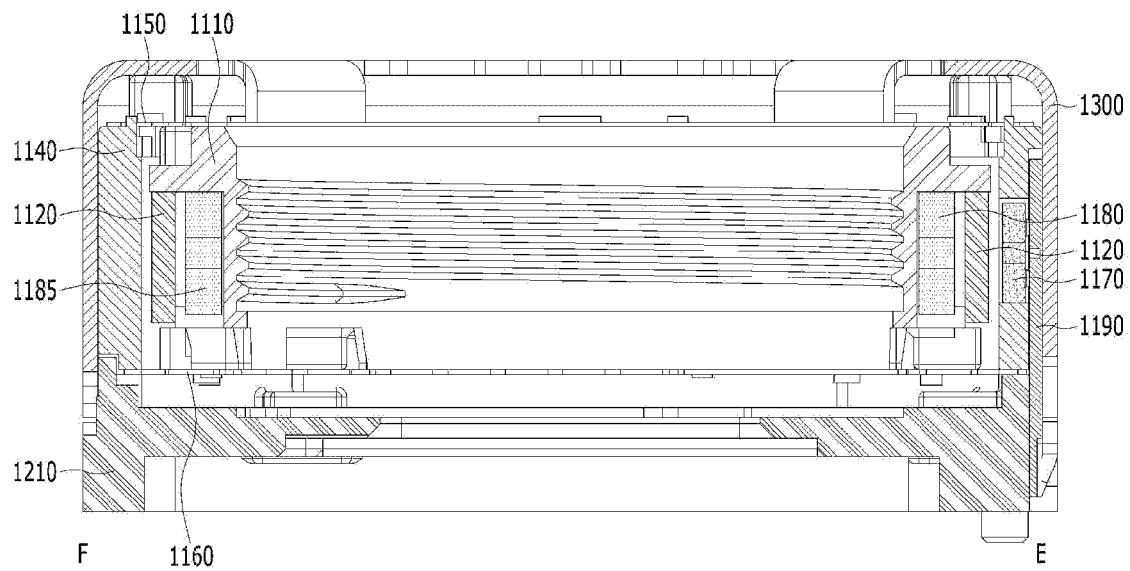
FIG. 29 is a cross-sectional view of the moving unit shown in FIG. 23, taken along line EF.

FIG. 22 is an exploded perspective view of the moving unit 1100 according to the embodiment, FIG. 23 is a perspective view of the moving unit 1100, with the cover member 1300 removed therefrom, FIG. 24A is a perspective view of a bobbin 1110, a sensing magnet 1180, and a balancing magnet 1185 shown in FIG. 22, FIG. 24B is a view showing coupling between the bobbin 1110, a coil 1120, the sensing magnet 1180, and the balancing magnet 1185 shown in FIG. 22, FIG. 25A is a perspective view of a housing 1140, a position sensor 1170, and a capacitor 1195 shown in FIG. 22, FIG. 25B is a perspective view of the housing 1140 to which first and second magnets 1130-1 and 1130-2, a circuit board 1190, and the position sensor 1170 are coupled, FIG. 26 is a view showing coupling between a lower elastic member 1160, the circuit board 1190, the position sensor 1170, and the capacitor 1195, FIG. 27 is a perspective view of a base 1210, the lower elastic member 1160, and the circuit board 1190, FIG. 28 is a cross-sectional view of the moving unit 1100 shown in FIG. 23, taken along line CD, and FIG. 29 is a cross-sectional view of the moving unit 1100 shown in FIG. 23, taken along line EF.

Referring to FIGS. 22 to 29, the moving unit 1100 may include a bobbin 1110, a coil 1120, a magnet 1130, and a housing 1140.

The moving unit 1100 may further include an upper elastic member 1150 and a lower elastic member 1160.

The moving unit 1100 may further include a position sensor 1170 for AF feedback operation. The moving unit 1100 may further include a sensing magnet 1180 for AF feedback operation. The moving unit 1100 may further include a balancing magnet 1185. In addition, the moving unit 1100 may further include a circuit board 1190, which is conductively connected to the position sensor 1170. In another embodiment, at least one of the position sensor 1170, the sensing magnet 1180, the balancing magnet 1185, or the circuit board 1190 may be omitted.

In addition, the moving unit 1100 may further include a capacitor 1195.

In addition, the moving unit 1100 may further include at least one of a cover member 1300 or a base 1210.

First, the bobbin 1110 will be described.

The bobbin 1110 may be provided for mounting of the lens module 1400, and may be disposed in the housing 1140. The bobbin 1110 may be moved in the optical-axis (OA) direction or the first direction (e.g. the Z-axis direction) due to electromagnetic interaction between the coil 1120 and the magnet 1130.

The bobbin 1110 may have formed therein an opening or a cavity for coupling to the lens module 1400. In an example, the opening in the bobbin 1110 may be a throughhole, and the shape thereof may be a circular shape, an elliptical shape, or a polygonal shape. However, the disclosure is not limited thereto.

The bobbin 1110 may include a first coupling portion 1113, which is disposed on the upper portion, the upper surface, or the upper end thereof to be coupled and secured to a first inner frame 1151 of the upper elastic member 1150, and a second coupling portion 1117, which is disposed on the lower portion, the lower surface, or the lower end thereof to be coupled and secured to a second inner frame 1161 of the lower elastic member 1160.

Each of the first and second coupling portions 1113 and 1117 may have a protrusion shape, but the disclosure is not limited thereto. In another embodiment, each of the first and second coupling portions 1113 and 1117 may have a recessed shape or a flat surface shape.

The bobbin 1110 may include a first escape recess 1112*a* formed in one region of the upper surface thereof, which corresponds to or is aligned with a first frame connection portion 1153 of the upper elastic member 1150 in the optical-axis (OA) direction. The first escape recess 1112*a* may have a shape depressed in the upper surface of the bobbin 1110.

In addition, the bobbin 1110 may include a second escape recess 1112*b* formed in one region of the lower surface thereof, which corresponds to or is aligned with a second frame connection portion 1163 of the lower elastic member 1160 in the optical-axis direction. The second escape recess 1112*b* may have a shape depressed in the lower surface of the bobbin 1110.

By virtue of the first escape recess 1112*a* and the second escape recess 1112*b* in the bobbin 1110, when the bobbin 1110 moves in the first direction, spatial interference between the bobbin 1110 and each of the first frame connection portion 1153 and the second frame connection portion 1163 may be prevented, and accordingly, the frame connection portions 1153 and 1163 may be easily elastically deformed.

The bobbin 1110 may include a plurality of side surfaces or outer side surfaces.

In an example, the bobbin 1110 may include side portions 1110*b*1 to 1110*b*4 and corner portions 1110*c*1 to 1110*c*4.

In an example, each of the first to fourth corner portions 1110*c*1 to 1110*c*4 of the bobbin 1110 may be disposed between two adjacent ones of the side portions of the bobbin 1110. The side surfaces or the outer side surfaces of the first to fourth side portions 1110*b*1 to 1110*b*4 of the bobbin 1110 may be referred to as "first to fourth side surfaces" or "first to fourth outer side surfaces" of the bobbin 1110.

The bobbin 1110 may have at least one groove 1105 formed in the side surface or the outer side surface thereof to allow the coil 1120 to be disposed or seated therein.

The coil 1120 may be disposed or seated in the groove 1105 in the bobbin 1110, or may be directly wound around the groove 1105 in the bobbin 1110 so as to rotate in the clockwise or counterclockwise direction about the optical axis OA. However, the disclosure is not limited thereto.

The shape and number of grooves 1105 in the bobbin 1110 may correspond to the shape and number of coils disposed on the outer side surface of the bobbin 1110. In another embodiment, the bobbin 1110 may not have a groove for seating of the coil therein, and the coil may be directly wound around and secured to the outer side surface of the bobbin 1110 having no groove. The bobbin may include a winding protrusion, around which the coil is wound.

In addition, the bobbin 1110 may have a recess 1180*a* formed in the outer side surface of one side portion (e.g. 1110*b*1) thereof to allow the sensing magnet 1180 to be seated therein. In an example, the recess 1180*a* may include an opening that is open in the lower surface of the bobbin 1110 in order to facilitate mounting of the sensing magnet 1180 therein. In addition, the recess 1180*a* may be formed in the bottom of the groove 1105 for seating of the coil therein, but the disclosure is not limited thereto.

In addition, the bobbin 1110 may have a recess (not shown) formed in the outer side surface of the side portion 1110*b*2, which is located opposite the side portion (e.g. 1110*b*1) in which the recess 1180*a* is formed, in order to allow the balancing magnet 1185 to be seated therein.

The bobbin 1110 may include a first stopper (not shown), which protrudes in the upward direction from the upper surface thereof, and a second stopper (not shown), which protrudes in the downward direction from the lower surface thereof.

When the bobbin 1110 moving in the first direction for autofocus moves beyond a prescribed range due to external impact or the like, the first and second stoppers of the bobbin 1110 may prevent the upper surface or the lower surface of the bobbin 1110 from directly colliding with the inner wall of the cover member 1300 or the upper surface of the base 1210.

The bobbin 1110 may have a recess 1119 formed in the upper surface thereof at a position corresponding to a protruding portion 1305 of the cover member 1300. In an example, the recess 1119 may be formed in the first escape recess 1112*a*, but the disclosure is not limited thereto.

The coil 1120 may be disposed on the bobbin 1110. In an example, the coil 1120 may be coupled to the bobbin 1110. In an example, the coil 1120 may be disposed on the outer side surface of the bobbin 1110.

In an example, the coil 1120 may be disposed in or wound around the groove 1105 in the bobbin 1110.

The coil 1120 may be a driving coil, which electromagnetically interacts with the magnet 1130 disposed in the housing 1140.

A driving signal (e.g. driving current or voltage) may be applied to the coil 1120 in order to generate electromagnetic force due to interaction with the magnet 1130.

The driving signal applied to the coil 1120 may be a DC signal, but the disclosure is not limited thereto. The driving signal may be an AC signal, or may include a DC signal and an AC signal.

The AF operation unit may move in the first direction due to electromagnetic force resulting from interaction between the coil 1120 and the magnet 1130.

The intensity and/or direction of electromagnetic force resulting from interaction between the coil 1120 and the magnet 1130 may be controlled by controlling the intensity and/or polarity (e.g. the direction in which current flows) of a driving signal applied to the coil 1120, whereby movement of the AF operation unit in the first direction may be controlled, and as a result, an autofocus function may be performed.

The AF operation unit may perform unidirectional driving or bidirectional driving using electromagnetic force resulting from interaction between the coil 1120 and the magnet 1130.

Here, unidirectional driving refers to movement of the AF operation unit in one direction, for example the upward direction (e.g. the +Z-axis direction), based on the initial position of the AF operation unit.

In addition, bidirectional driving refers to movement of the AF operation unit in two directions, for example the upward direction (e.g. the +Z-axis direction) or the downward direction (e.g. the —Z-axis direction), based on the initial position of the AF operation unit.

For example, the initial position of the AF operation unit (e.g. the bobbin 1110) may be the original position of the AF operation unit (e.g. the bobbin) in the state in which no power or driving signal is applied to the coil 1120 or the position at which the AF operation unit is located as the result of the upper elastic member 1150 and the lower elastic member 1160 being elastically deformed due only to the weight of the AF operation unit.

In addition, the initial position of the AF operation unit (e.g. the bobbin 1110) may be the position at which the AF operation unit is located when gravity acts in a direction from the bobbin 1110 toward the base 1210 or when gravity acts in a direction from the base 1210 toward the bobbin 1110.

The AF operation unit may include the bobbin 1110, which is elastically supported by the upper elastic member 1150 and the lower elastic member 1160, and components mounted to the bobbin 1110 so as to move together with the bobbin 1110. In an example, the AF operation unit may include at least one of the bobbin 1110, the coil 1120, the sensing magnet 1180, or the balancing magnet 1185. In the case in which the lens module 1400 is mounted, the AF operation unit may include the lens module 1400.

The coil 1120 may be disposed on the bobbin 1110 so as to have a closed-loop shape, for example a ring shape.

In an example, the coil 1120 may be formed in the shape of a closed loop that is wound in the clockwise or counterclockwise direction about the optical axis, and may be wound around or disposed on the outer side surface of the bobbin 1110.

In another embodiment, the coil 1120 may be formed in the shape of a coil ring that is disposed or wound in the clockwise or counterclockwise direction about an axis perpendicular to the optical axis. The number of coil rings may be the same as the number of magnets 1130, but the disclosure is not limited thereto. In an example, in the embodiment, the coil 1120 may include a first coil unit, which faces the first magnet 1130-1, and a second coil unit, which faces the second magnet 1130-2. In this case, the first coil unit may be disposed on the side portion of the bobbin 1110 that faces the first magnet 1130-1, and the second coil unit may be disposed on the side portion of the bobbin 1110 that faces the second magnet 1130-2.

The coil 1120 may be conductively connected to at least one of the upper elastic member 1150 or the lower elastic member 1160, and may be conductively connected to the circuit board 1190 via the upper elastic member 1150 or the lower elastic member 1160.

In an example, the coil 1120 may be coupled to lower elastic units 1160-1 and 1160-2 of the lower elastic member 1160 or to two of the lower elastic units of the lower elastic member by means of a solder or a conductive adhesive, but the disclosure is not limited thereto.

In an example, when the AF operation unit (e.g. the bobbin 1110) is located at the initial position, the coil 1120 disposed on the bobbin 1110 may overlap the magnet 1130 in a direction that passes through the optical axis and is perpendicular to the optical axis.

In addition, in an example, when the AF operation unit (e.g. the bobbin 1110) is located at the initial position, the coil 1120 disposed on the bobbin 1110 may overlap the position sensor 1170 in a direction that passes through the optical axis and is perpendicular to the optical axis, but the disclosure is not limited thereto. In another embodiment, the two components may not overlap each other.

Next, the housing 1140 will be described.

The housing 1140 may accommodate therein the bobbin 1110, on which the coil 1120 and the sensing magnet 1180 are disposed, and may support the magnet 1130, the circuit board 1190, the position sensor 1170, and the capacitor 1195.

Referring to FIGS. 25A and 25B, the housing 1140 is disposed in the cover member 1300. The housing 1140 may have a shape of a column having an opening to accommodate the bobbin 1110 therein.

In an example, the housing 1140 may include a plurality of side portions (e.g. 1141-1 to 1141-4) and a plurality of corner portions (e.g. 1142-1 to 1142-4) to form an opening. Here, the corner portions (e.g. 1142-1 to 1142-4) of the housing 1140 may alternatively be referred to as "pillar portions" of the housing 1140.

In an example, the housing 1140 may include side portions (e.g. 1141-1 to 1141-4) and corner portions (e.g. 1142-1 to 1142-4) to form an opening having a polygonal (e.g. quadrangular or octagonal) shape or a circular (or elliptical) shape.

The housing 1140 may include first and second side portions 1141-1 and 1141-2, which face each other, and third and fourth side portions 1141-3 and 1141-4, which face each other. In addition, the housing 1140 may include first and fourth corner portions 1142-1 and 1142-4, which face each other, and second and third corner portions 1142-2 and 1142-3, which face each other.

Each of the first to fourth side portions 1141-1 to 1141-4 of the housing 1140 may be disposed parallel to a corresponding one of the side plates 303 of the cover member 1300.

Each of the first to fourth side portions 1141-1 to 1141-4 of the housing 1140 may correspond to any one of the side portions 1110*b*1 to 1110*b*4 of the bobbin 1110, and each of the first to fourth corner portions 1142-1 to 1142-4 of the housing 1140 may correspond to any one of the first to fourth corner portions 1110*c*1 to 1110*c*4 of the bobbin 1110.

The inner side surface of each of the corner portions 1142-1 to 1142-4 of the housing 1140 may be a flat surface, a chamfered surface, or a curved surface.

The housing 1140 may have seating portions 1141*a* and 1141*b* formed in the side portions 1141-3 and 1141-4 of the housing 1140 to allow the magnet 1130 to be mounted therein. The number of seating portions 1141*a* and 1141*b* formed in the side portions of the housing 1140 may be the same as the number of magnets 1130-1 and 1130-2.

The seating portions 1141*a* and 1141*b* shown in FIG. 25A have a shape of an opening or a through-hole that penetrates each of the side portions 1141-3 and 1141-4 of the housing 1140, but the disclosure is not limited thereto. In another embodiment, the seating portions may have a shape of a recess or a groove.

The housing 1140 may include support portions 1018, which are formed adjacent to the seating portions 1141*a* and 1141*b* in order to support first surfaces of the edges of the magnets 130 facing the coil 1120.

In an example, the support portions 1018 may be located adjacent to the inner side surface of the housing 1140, and may protrude in the horizontal direction beyond the side surfaces of the seating portions 1141*a* and 1141*b*. In addition, in an example, the support portions 1018 may include tapered portions or inclined surfaces. In another embodiment, the housing 1140 may not include the support portions 1018.

In order to prevent the housing 1140 from directly colliding with the inner surface of the upper plate 1302 of the cover member 1300, the housing 1140 may include a stopper 1143 formed on the upper portion, the upper surface, or the upper end thereof. Here, the stopper 1143 may alternatively be referred to as a "boss" or a "protrusion."

The housing 1140 may include at least one first coupling portion 1144 formed on the upper portion, the upper surface, or the upper end thereof to be coupled to a hole 1152*a* in the first outer frame 1152 of the upper elastic member 1150. Although the first coupling portion 1144 of the housing 1140 is illustrated in FIG. 25A as having a protrusion shape, the disclosure is not limited thereto. In another embodiment, the first coupling portion of the housing may have a recessed shape or a flat surface shape.

In addition, the housing 1140 may include at least one second coupling portion 1147 formed on the lower portion, the lower surface, or the lower end thereof to be coupled to a hole 1162a in the second outer frame 1162 of the lower elastic member 1160. Although the second coupling portion 1147 is illustrated in FIG. 25B as having a protrusion shape, the disclosure is not limited thereto. In another embodiment, the second coupling portion may have a recessed shape or a flat surface shape.

Although the first and second coupling portions 1144 and 1147 are illustrated in FIGS. 25A and 25B as being disposed on at least one of the corner portions 1142-1 to 1142-4 of the housing 1140, the disclosure is not limited thereto. In another embodiment, the first and second coupling portions may be disposed on at least one of the side portions 1141-1 to 1141-4 and the corner portions 1142-1 to 1142-4 of the housing 1140.

In order to prevent the lower surface or the bottom of the housing 1140 from colliding with the base 1210 to be described later, the housing 1140 may include at least one stopper (not shown) protruding from the lower portion, the lower surface, or the lower end thereof.

A guide recess 1148 corresponding to a protruding portion 1216 of the base 1210 may be formed in the lower portion, the lower surface, or the lower end of at least one of the first to fourth corner portions 1142-1 to 1142-4 of the housing 1140.

In an example, the guide recess 1148 in the housing 1140 and the protruding portion 1216 of the base 1210 may be coupled to each other by means of an adhesive member, whereby the housing 1140 may be coupled to the base 1210.

The housing 1140 may include at least one escape recess 1015a formed in the upper portion, the upper surface, or the upper end of at least one of the first to fourth side portions 1141-1 to 1141-4 in order to avoid spatial interference with a connection portion between the first frame connection portion 1153 of the upper elastic member 1150 and the first outer frame 1152.

In addition, the housing 1140 may include at least one escape recess 1016a formed in the lower portion, the lower surface, or the lower end of at least one of the first to fourth corner portions 1142-1 to 1142-4 in order to avoid spatial interference with a connection portion between the second frame connection portion 1163 of the lower elastic member 1160 and the second outer frame 1162.

In an example, a guide protrusion 1144a for guiding the first frame connection portion 1153 of the upper elastic member 1150 may be formed on each of the corner portions 1142-1 to 1142-4 of the housing 1140. In an example, a damper (not shown) may be disposed between the guide protrusion 1114a and the first frame connection portion 1153.

The housing 1140 may have a structure (e.g. a protrusion or a recess) formed on any one side portion 1141-1 to be coupled to the circuit board 1190.

In an example, the housing 1140 may include a recess 1025a formed in the outer side surface of any one side portion 1141-1 to allow the circuit board 1190 to be disposed therein. The recess 1025a may have a shape identical to or coinciding with that of the circuit board 1190.

In an example, the circuit board 1190 may be attached to the side portion 1141-1 (or the recess 1025a) of the housing 1140 by means of an adhesive or the like.

In addition, the housing 1140 may include a first seating portion 1017a formed in the side portion 1141-1 to allow the position sensor 1170 to be seated or disposed therein. In addition, the housing 1140 may include a second seating portion 1017b formed in the corner portion 1142-1 to allow the capacitor 1195 to be seated or disposed therein.

The first seating portion 1017a and the second seating portion 1017b of the housing 1140 may be formed in the recess 1025a in the housing 1140 so as to be spaced apart from each other.

As shown in FIG. 25A, the first seating portion 1017a may have a shape of an opening or a through-hole penetrating the side portion 1141-1 of the housing 1140 in order to avoid interposition of the housing 1140 between the sensing magnet 1180 and the position sensor 1170, thereby increasing the output of the position sensor 1170, thus improving the sensitivity of the position sensor 1170. In another embodiment, the first seating portion may have a recessed shape.

The second seating portion 1017b may have a shape of a recess depressed in the outer side surface of the corner portion 1142-1 of the housing 1140, rather than a through-hole shape. In another embodiment, the second seating portion 1017b may have an opening shape or a through-hole shape.

In an example, the first seating portion 1017a of the housing 1140 may have a shape corresponding to or coinciding with that of the position sensor 1170, but the disclosure is not limited thereto.

The second seating portion 1017b of the housing 1140 may have a shape corresponding to or coinciding with that of the capacitor 1195, but the disclosure is not limited thereto.

The magnet 1130 may be a driving magnet, which generates electromagnetic force due to interaction with the coil 1120 and moves the bobbin 1110 using the electromagnetic force.

The magnet 1130 may be disposed in or coupled to the housing 1140.

In an example, the magnet 1130 may include a plurality of magnets 1130-1 and 1130-2, which are spaced apart from each other. In an example, the magnet 1130 may include first and second magnets 1130-1 and 1130-2, which are disposed on two opposite side portions 1141-3 and 1141-4 of the housing 1140. In another embodiment, the magnet may include four magnets disposed on the side portions 1141-1 to 1141-4 of the housing 1140.

In still another embodiment, the magnets may be disposed on at least two of the corner portions 1142-1 to 1142-4 of the housing 1140.

The magnet 1130 may be a monopolar-magnetized magnet, which has two different poles and an interface naturally formed between the different poles. In an example, each of the first and second magnets 1130-1 and 1130-2 may be a monopolar-magnetized magnet, which is disposed such that a first surface thereof facing the coil 1120 is an N pole and a second surface thereof located opposite the first surface is an S pole, but the disclosure is not limited thereto. The positions of the N pole and the S pole may be interchanged. In another embodiment, the magnet 1130 may be a bipolar-magnetized magnet, which is divided into two portions in a direction perpendicular to the optical axis in order to increase electromagnetic force.

When the magnet 1130 is a bipolar-magnetized magnet, the magnet 1130 may include a first magnet portion, a second magnet portion, and a partition wall disposed between the first magnet portion and the second magnet portion.

The first magnet portion may include an N pole, an S pole, and a first interface between the N pole and the S pole. In this case, the first interface may be a portion that includes a section having substantially no magnetism and thus almost no polarity and is naturally generated in order to form a magnet composed of one N pole and one S pole.

The second magnet portion may include an N pole, an S pole, and a second interface between the N pole and the S pole. In this case, the second interface may be a portion that includes a section having substantially no magnetism and thus almost no polarity and is naturally generated in order to form a magnet composed of one N pole and one S pole.

The partition wall may be a portion that separates or isolates the first magnet portion and the second magnet portion from each other and has substantially no magnetism and thus almost no polarity. For example, the partition wall may be a non-magnetic material or air. For example, the partition wall may be referred to as a "neutral zone" or a "neutral region."

The partition wall may be a portion artificially formed when the first magnet portion and the second magnet portion are magnetized, and the width of the partition wall may be larger than the width of each of the first interface and the second interface. Here, the width of the partition wall may be a length of the partition wall in a direction from the first magnet portion toward the second magnet portion.

In an example, the N pole of the first magnet portion and the S pole of the second magnet portion may be disposed so as to face the coil 1120, but the disclosure is not limited thereto. The positions of the two poles may be interchanged.

The sensing magnet 1180 may be disposed on the bobbin 1110.

In an example, the sensing magnet 1180 may be disposed on the outer side surface of the bobbin 1110 that faces or opposes the position sensor 1170, and the balancing magnet 1185 may be disposed on another outer side surface of the bobbin 1110 that is located opposite the outer side surface of the bobbin 1110 on which the sensing magnet 1180 is disposed. The sensing magnet 1180 may have a polyhedral shape, for example a hexahedral shape.

The sensing magnet 1180 (or the balancing magnet 1185) may overlap the coil 1120 in a direction parallel to a line that passes through the optical axis and is perpendicular to the optical axis, but the disclosure is not limited thereto. In another embodiment, the two components may not overlap each other.

In addition, the sensing magnet 1180 (or the balancing magnet 1185) may be located at a position inside the coil 1120. Here, the position inside the coil 1120 may be a position closer to the center of the bobbin 1110 than the coil 1120. That is, the coil 1120 may be located outside the sensing magnet 1180 and the balancing magnet 1185, whereby electromagnetic force between the coil 1120 and the first and second magnets 1130-1 and 1130-2 may be increased.

Each of the sensing magnet 1180 and the balancing magnet 1185 may be a monopolar-magnetized magnet that is disposed such that the upper surface thereof is an N pole and the lower surface thereof is an S pole, but the disclosure is not limited thereto. The positions of the two poles may be interchanged.

In an example, each of the sensing magnet 1180 and the balancing magnet 1185 may be disposed such that an interface between the N pole and the S pole is parallel to a direction perpendicular to the optical axis, but the disclosure is not limited thereto. Alternatively, in another embodiment, the interface between the N pole and the S pole may be parallel to the optical axis.

Alternatively, in another embodiment, each of the sensing magnet 1180 and the balancing magnet 1185 may be a bipolar-magnetized magnet.

The sensing magnet 1180 may be moved together with the bobbin 1110 in the optical-axis (OA) direction due to electromagnetic force resulting from interaction between the coil 1120 and the magnet 1130, and the position sensor 1170 may detect the intensity of a magnetic field of the sensing magnet 1180 moving in the optical-axis direction, and may output an output signal corresponding to the result of detection.

In an example, the controller 1830 of the camera module 2000-1 or the controller 780 of the terminal 200A may detect displacement of the bobbin 1110 in the optical-axis direction based on the output signal from the position sensor 1170.

The balancing magnet 1185 may serve to cancel the influence of the magnetic field of the sensing magnet 1180 on the coil 1120 and to balance the weight of the AF operation unit.

When the operation unit (e.g. the bobbin 1110) is located at the initial position, at least a portion of the position sensor 1170 and at least a portion of the sensing magnet 1180 may overlap each other in a direction parallel to a line that passes through the optical axis and is perpendicular to the optical axis, but the disclosure is not limited thereto. In another embodiment, the two components may not overlap each other.

The circuit board 1190 and the position sensor 1170 are disposed in the housing 1140.

In an example, the circuit board 1190 and the position sensor 1170 may be disposed on any one side portion 1141-1 of the housing 1140.

In an example, the circuit board 1190 may be disposed in the recess 1025a formed in the side portion 1141-1 of the housing 1140. At least a portion of the first surface 1019a of the circuit board 1190 may be in contact with the recess 1025a in the housing 1140.

The position sensor 1170 may be implemented as a Hall sensor alone, or may be implemented in the form of a driver IC including a Hall sensor.

When the position sensor 1170 is a Hall sensor, the position sensor 1170 may include two input terminals for receiving power or a driving signal and two output terminals for outputting an output signal.

When the position sensor 1170 is a driver IC, the position sensor 1170 may include first to sixth terminals.

The first and second terminals of the position sensor 1170 may serve to receive a driving signal. The third and fourth terminals of the position sensor 1170 may serve to transmit and receive a clock signal and a data signal related to the output from the Hall sensor using data communication using a protocol, for example I2C communication. In addition, the fifth and sixth terminals of the position sensor 1170 may serve to apply a driving signal to the coil 1120.

The circuit board 1190 may be conductively connected to the position sensor 1170. The circuit board 1190 may be conductively connected to the coil 1120.

In an example, the circuit board 1190 may include a plurality of terminals B1 to B6 to be conductively connected to an external device. In an example, the position sensor 1170 may be conductively connected to the terminals B1 to B6 of the circuit board 1190.

In an example, when the position sensor 1170 is a driver IC, each of the first to fourth terminals of the position sensor 1170 may be conductively connected to a corresponding one of the first to fourth terminals (e.g. B1 to B4) of the circuit board 1190. In addition, the coil 1120 may be conductively connected to the fifth and sixth terminals of the position sensor 1170.

The coil 1120 may be conductively connected to the circuit board 1190 via at least one of the upper elastic member 1150 or the lower elastic member 1160.

In an example, the circuit board 1190 may be conductively connected to the first and second lower elastic units 1160-1 and 1160-2. The circuit board 1190 may include terminals 1091 and 1092 for receiving a driving signal for driving the coil 1120 from the position sensor 1170. In an example, the coil 1120 may be conductively connected to the terminals 1091 and 1092 of the circuit board via the first and second lower elastic units 1160-1 and 1160-2, and the terminals 1091 and 1092 may be conductively connected to the fifth and sixth terminals of the position sensor 1170.

When the position sensor 1170 is a Hall sensor, each of the two input terminals and the two output terminals of the position sensor 1170 may be conductively connected to a corresponding one of the first to fourth terminals (e.g. B1 to B4) of the circuit board 1190. The coil 1120 may be conductively connected to the fifth and sixth terminals (e.g. B5 and B6) of the circuit board 1190. The coil 1120 may be conductively connected to the fifth and sixth terminals (e.g. B5 and B6) of the circuit board 1190 via at least one of the upper elastic member 1150 or the lower elastic member 1160. In an example, the coil 1120 may be conductively connected to the fifth and sixth terminals (e.g. B5 and B6) of the circuit board 1190 via the first and second lower elastic units 1160-1 and 1160-2.

For example, the circuit board 1190 may be a printed circuit board or an FPCB.

In an example, the terminals 1091 and 1092 may be formed on the first surface 1019a of the circuit board 1190, and the terminals B1 to B6 may be formed on the second surface 1019b of the circuit board 1190.

In an example, the plurality of terminals B1 to B6 may be arranged in a line on the lower end of the second surface 1019b of the circuit board 1190, but the disclosure is not limited thereto. In this case, the second surface 1019b of the circuit board 1190 may be a surface located opposite the first surface 1019a of the circuit board 1190.

The circuit board 1190 may include circuit patterns or wirings for conductively connecting the position sensor 190 to the terminals 1091, 1092, and B1 to B6.

The position sensor 1170 may be mounted or disposed on the first surface 1019a of the circuit board 1190. The position sensor 1170 may be disposed in the first seating portion 1017a formed in the side portion 1141-1 of the housing 1140.

When the bobbin 1110 is located at the initial position, the position sensor 1170 disposed on the side portion 1141-1 of the housing 1140 may overlap the sensing magnet 1180 disposed on the bobbin 1110 in a direction perpendicular to the optical axis, but the disclosure is not limited thereto. In another embodiment, the two components may not overlap each other.

The position sensor 1170 may detect the intensity of a magnetic field of the sensing magnet 1180 mounted on the bobbin 1110 during movement of the bobbin 1110, and may output an output signal (e.g. output voltage) corresponding to the result of detection.

The capacitor 1195 may be disposed or mounted on the first surface 1019a of the circuit board 1190, and may be conductively connected to the circuit board 1190.

The capacitor 1195 may be of a chip type, and may include a first terminal, which is conductively connected to one end of the capacitor 1195, and a second terminal, which is conductively connected to the other end of the capacitor 1195. The capacitor 1195 may alternatively be referred to as a "capacitive element" or a "condenser."

In another embodiment, the capacitor 1195 may be included in the circuit board 1190. In an example, the circuit board 1190 may include a capacitor, which includes a first conductive layer, a second conductive layer, and an insulating layer (e.g. a dielectric layer) disposed between the first conductive layer and the second conductive layer.

The capacitor 1195 may be conductively connected in parallel to two terminals of the position sensor 1170, through which power or a driving signal is supplied to the position sensor 1170.

In an example, the capacitor 1195 may be conductively connected in parallel to the first and second terminals (e.g. B1 and B2) of the circuit board 1190 for supplying power or a driving signal to the position sensor 1170. Since the capacitor 1195 is conductively connected in parallel to the first and second terminals B1 and B2 of the circuit board 1190, the capacitor 1195 may serve as a smoothing circuit for removing ripple components included in the power or the driving signal supplied to the position sensor 1170 from the outside, and thus may supply a stable and consistent power signal to the position sensor 1170.

In an example, the capacitor 1195 may prevent overcurrent, which is caused by high-frequency noise, ESD, or the like introduced from the outside, from being applied to the position sensor 1170, and may prevent a calibration value regarding displacement of the bobbin, which is obtained based on the signal output from the position sensor 1170, from being reset due to the overcurrent.

The upper elastic member 1150 and the lower elastic member 1160 may be coupled to the bobbin 1110. In an example, the upper elastic member 1150 and the lower elastic member 1160 may be coupled to the bobbin 1110 and the housing 1140, and may support the bobbin 1110 with respect to the housing 1140.

In an example, the upper elastic member 1150 may be coupled to the upper portion, the upper surface, or the upper end of the bobbin 1110 and to the upper portion, the upper surface, or the upper end of the housing 1140. The lower elastic member 1160 may be coupled to the lower portion, the lower surface, or the lower end of the bobbin 1110 and to the lower portion, the lower surface, or the lower end of the housing 1140.

At least one of the upper elastic member 1150 or the lower elastic member 1160 may be divided or separated into two or more units. In an example, the lower elastic member 1160 may include a first lower elastic unit 1160-1 and a second lower elastic unit 1160-2, which are spaced apart from each other.

The upper elastic member 1150 and the lower elastic member 1160 may be implemented as leaf springs, but the disclosure is not limited thereto. The elastic members may be implemented as coil springs, suspension wires, or the like.

Although the upper elastic member 1150 is illustrated in FIG. 23 as including a single upper elastic unit, rather than being divided into a plurality of units, the disclosure is not limited thereto. In another embodiment, the upper elastic member may include a plurality of upper elastic units, and the plurality of upper elastic units may be conductively connected to the coil 1120.

The upper elastic member 1150 may include a first inner frame 1151, which is coupled to the upper portion, the upper surface, or the upper end of the bobbin 1110, a first outer frame 1152, which is coupled to the upper portion, the upper surface, or the upper end of the housing 1140, and a first frame connection portion 1153, which connects the first inner frame 1151 to the first outer frame 1152. Here, the inner frame may be referred to as an "inner portion," the outer frame may alternatively be referred to as an "outer portion," and the frame connection portion may alternatively be referred to as a "connection portion."

The first inner frame 1151 of the upper elastic member 1150 may have formed therein a hole 1151a or a recess, which is coupled to the first coupling portion 1113 of the bobbin 1110. The first outer frame 1152 of the upper elastic member 1150 may have formed therein a hole 1152a or a recess, which is coupled to the first coupling portion 1144 of the housing 1140. A slit may be formed in each of the recesses 1151a and 1152a. In another embodiment, the slit may not be formed.

The lower elastic member 1160 may include a plurality of lower elastic units.

In an example, the first and second lower elastic units 1160-1 and 1160-2 may be coupled to the bobbin 1110. Alternatively, the first and second lower elastic units 1160-1 and 1160-2 may be coupled to the bobbin 1110 and the housing 1140.

The first and second lower elastic units 1160-1 and 1160-2 may be disposed between the bobbin 1110 and the base 1210.

At least one of the first lower elastic unit 1160-1 or the second lower elastic unit 1160-2 may include a second inner frame 1161-1 or 1161-2, which is coupled to the lower portion, the lower surface, or the lower end of the bobbin 1110, a second outer frame 1162-1 or 1162-2, which is coupled to the lower portion, the lower surface, or the lower end of the housing 1140, and a second frame connection portion 1163-1 or 1163-2, which connects the second inner frame 1161-1 or 1161-2 to the second outer frame 1162-1 or 1162-2.

In addition, the second inner frame 1161-1 or 1161-2 of at least one of the first lower elastic unit 1160-1 or the second lower elastic unit 1160-2 may have formed therein a hole 1161a in order to be coupled to the second coupling portion 1117 of the bobbin 1110 by means of a solder or a conductive adhesive member.

The second outer frame 1162-1 or 1162-2 of at least one of the first lower elastic unit 1160-1 or the second lower elastic unit 1160-2 may have formed therein a hole 1162a in order to be coupled to the second coupling portion 1147 of the housing 1140.

In an example, one end of the coil 1120 may be connected to one end of the second inner frame 1161-1 of the first lower elastic unit 1160-1 by means of a solder or a conductive member, and the other end of the coil 1120 may be connected to one end of the second inner frame 1161-2 of the second lower elastic unit 1160-2 by means of a solder or a conductive member.

In an example, the second inner frame 1161-1 of the first lower elastic unit 1160-1 may be provided with a bonding portion 1065a, to which one end of the coil 1120 is coupled, and the second inner frame 1161-2 of the second lower elastic unit 1160-2 may be provided with a bonding portion 1065b, to which the other end of the coil 1120 is coupled. In an example, the bonding portions 1065a and 1065b of the first and second lower elastic units 1160-1 and 1160-2 may have insertion grooves formed therein to guide the coil 1120.

The second outer frame 1162-1 of the first lower elastic unit 1160-1 may be provided with a first bonding portion 1062a in order to be coupled to the first terminal 1091 of the circuit board 1190.

In an example, the first bonding portion 1062a may have a structure that protrudes from the outer side surface of the second outer frame 1162-1 toward the circuit board 1190 in order to be easily coupled to the first terminal 1091 of the circuit board 1190.

The second outer frame 1162-2 of the second lower elastic unit 1160-2 may be provided with a second bonding portion 1062b in order to be coupled to the second terminal 1092 of the circuit board 1190.

In an example, the second bonding portion 1062b may be spaced apart from the first bonding portion 1062a, and may have a structure that protrudes from the outer side surface of the second outer frame 1162-2 toward the circuit board 1190 in order to be easily coupled to the second terminal 1092 of the circuit board 1190.

The coil 1120 may be conductively connected to the first and second terminals 1091 and 1092 of the circuit board 1190 via the first lower elastic unit 1160-1 and the second lower elastic unit 1160-2.

Each of the first frame connection portion 1153 and the second frame connection portion 1163 of the upper elastic member 1150 and the lower elastic member 1160 may be bent or curved at least once so as to form a predetermined pattern. The upward and/or downward movement of the bobbin 1110 in the first direction may be flexibly (or elastically) supported by positional change or fine deformation of the first and second frame connection portions 1153 and 1163.

In order to absorb and dampen vibration of the bobbin 1110, the moving unit 1100 may further include a damper (not shown) disposed between the upper elastic member 1150 and the housing 1140.

In an example, the damper (not shown) may be disposed in the space between the first frame connection portion 1153 of the upper elastic member 1150 and the bobbin 1110 (and/or the housing 1140).

In addition, in an example, the moving unit 1100 may further include a damper (not shown) disposed between the second frame connection portion 1163 of each of the first and second lower elastic units 1160-1 and 1160-2 and the bobbin 1110 (and/or the housing 1140).

In addition, in an example, a damper (not shown) may be further disposed between the inner side surface of the housing 1140 and the outer side surface of the bobbin 1110.

The base 1210 may have an opening corresponding to the opening in the bobbin 1110 and/or the opening in the housing 1140, and may have a shape coinciding with or corresponding to the shape of the cover member 1300, for example a quadrangular shape.

The base 1210 may have a step 1211 formed on the lower end of the outer side surface thereof, to which an adhesive may be applied when the cover member 1300 is fixedly adhered thereto. In this case, the step 1211 may guide the cover member 1300 that is coupled to the upper side thereof, and may face the lower end of the side plate 1303 of the cover member 1300. An adhesive member and/or a sealing member may be disposed or applied between the lower end of the side plate 1303 of the cover member 1300 and the step 1211 of the base 1210.

The base 1210 may be disposed under the bobbin 1110 and the housing 1140.

In an example, the base 1210 may be disposed under the lower elastic member 1160.

The base 1210 may have a protruding portion 1216 formed on a corner of the upper surface thereof so as to correspond to the guide recess 1148 in the housing 1140. In an example, the protruding portion 1216 may have a shape of a polygonal pillar protruding from the upper surface of the base 1210 so as to be perpendicular to the upper surface of the base 1210, and may alternatively be referred to as a "pillar portion."

The protruding portion 1216 may be inserted into the guide recess 1148 in the housing 1140, and may be fastened or coupled to the guide recess 1148 by means of an adhesive member (not shown), such as epoxy or silicone.

The base 1210 may have a seating recess 1210*a* formed in the side surface thereof corresponding to the side portion (e.g. 1141-1) of the housing 1140, on which the circuit board 1190 is disposed, so that the lower end of the circuit board 1190 is seated therein. The seating recess 1210*a* in the base 1210 may have a structure depressed in the outer side surface of the base 1210 corresponding to the side portion (e.g. 1141-1) of the housing 1140.

In an example, the terminals B1 to B6 of the circuit board 1190 may be disposed on the lower end of the second surface 1019*b* of the circuit board 1190, and may be located in the seating recess 1210*a* in the base 1210.

In addition, the base 1210 may have recesses 1022*a* and 1022*b* formed therein in order to prevent spatial interference with the bonding portions 1062*a* and 1062*b* of the first and second lower elastic units 1160-1 and 1160-2 and to facilitate soldering. The recesses 1022*a* and 1022*b* in the base 1210 may be depressed in the upper surface of the base 1210, and may be connected to the seating recess 1210*a*, but the disclosure is not limited thereto. The recesses may not be connected to the seating recess.

In an example, a protrusion 1036 for supporting the circuit board 1190 may be formed in the seating recess 1210*a* in the base 1210. In another embodiment, the protrusion may be omitted.

The protrusion 1036 of the base 1210 may protrude from the bottom of the seating recess 1210*a*, and may support a portion of the circuit board 1190, but the disclosure is not limited thereto.

The cover member 1300 may accommodate other components of the moving unit 1100 in an accommodation space defined by the cover member 1300 and the base 1210.

The cover member 1300 may be formed in the shape of a box having an open lower portion and including an upper plate 1302 and a side plate 1303 connected to the upper plate 1302. The lower end of the side plate 1303 of the cover member 1300 may be coupled to the upper portion of the base 1210. The upper plate 1302 of the cover member 1300 may have a polygonal shape, for example a quadrangular shape or an octagonal shape.

The cover member 1300 may have an opening, a hole, or a cavity 1301 formed in the upper plate 1302 thereof to expose a lens (not shown) coupled to the bobbin 1110 to external light.

The cover member 1300 may be formed of a non-magnetic material, such as SUS or plastic, in order not to be attached to the magnet 1130. However, the cover member 1300 may be formed of a magnetic material to function as a yoke. For example, the cover member 1300 may be formed of a metal or plastic material, but the disclosure is not limited thereto.

The cover member 1300 may include a protruding portion 1305 extending from the upper plate 1302 toward the bobbin 1110. The protruding portion 1305 may alternatively be referred to as an "extending portion."

The cover member 1300 may include at least one protruding portion 1305 extending from a region adjacent to the cavity 1301 formed in the upper plate 1302 toward the upper surface of the bobbin 1110.

In an example, the cover member 1300 may have four protruding portions 1305 corresponding to four corners of the upper plate 1302, and the bobbin 1110 may have formed therein four recesses 1119 corresponding to the protruding portions 1305.

At least a portion of the protruding portion 1305 of the cover member 1300 may be disposed in or inserted into the recess 1119 formed in the upper surface of the bobbin 1110. In an example, one end or a distal end of the protruding portion 1305 may be disposed in the recess 1119.

As the bobbin 1110 moves in the optical-axis direction to perform AF operation, the protruding portion 1305 of the cover member 1300 may come into contact with the bottom surface of the recess 1119 in the bobbin 1110, and accordingly, the protruding portion 1305 of the cover member 1300 may serve as a stopper that restricts movement of the bobbin 1110 in the upward direction within a predetermined range.

Alternatively, in another embodiment in which the magnet is disposed on a corner portion of the housing, the protruding portion 1305 of the cover member 1300 may function as a yoke, and may alternatively be referred to as an inner yoke.

In still another embodiment, the housing 1140 may be omitted, and the protruding portion of the cover member 1300 may support or fix the magnet.

Referring to FIG. 21, the upper surface of the upper plate 1011A of the cover member 1310 may be in contact with the rear surface 10078 of the display panel 751.

For example, the rear surface 1007B of the display panel 751 may be the rear surface of a component (e.g. glass or a substrate) disposed closest to the camera module 1000, among the components constituting the general display panel 751.

Since the upper surface of the upper plate 1011A of the cover member 1310 is in contact with the rear surface 1007B of the display panel 751, the length of the optical path between the display panel 751 and the optical-path changing unit 1320 may be reduced. Accordingly, loss of light may be reduced, and reduction in the amount of light that is introduced into the optical-path changing unit 1320 may be minimized.

The portable terminal 200A may include a front surface or a front side 1007A and a rear surface or a rear side formed opposite the front surface or the front side.

In an example, structurally, the front surface or the front side 1007A of the portable terminal 200A may be glass (e.g. front tempered glass) included in the display panel 751 or the touchscreen panel 753.

The touchscreen panel 753 and the display panel 751 may be located adjacent to the front surface or the front side 1007A of the portable terminal 200A. In an example, the front surface or the front side 1007A of the portable terminal 200A may be the "front surface of the display panel 751."

For example, in an embedded type in which the display panel is integrated with the touchscreen panel, the front surface or the front side 1007A of the portable terminal 200A may be the "front surface of the display panel." Alternatively, for example, in an add-on type in which the display panel is provided separately from the touchscreen panel, the front surface or the front side 1007A of the portable terminal 200A may be the "front surface of the touchscreen panel." Alternatively, for example, in the cases of both the embedded type and the add-on type, the front surface or the front side of the portable terminal may correspond to the front surface of the display panel. The display panel 753 may include an active area.

The first surface 1008A of the reflection member 1322 may be fixedly disposed at a position spaced apart from the front surface 1007A of the display panel 751 by a predetermined distance d3. Alternatively, in an example, the first surface 1008A of the reflection member 1322 may be fixedly disposed at a position spaced apart from the rear surface 10078 of the display panel 751 by a predetermined distance d4.

For example, d3 may be a distance between the first surface 1008A of the reflection member 1322 and the front surface 1007A of the display panel 751 in the vertical direction 1014A. For example, d4 may be a distance between the first surface 1008A of the reflection member 1322 and the rear surface 10078 of the display panel 751 in the vertical direction 1014A. For example, the vertical direction 1014A may be a direction perpendicular to the optical-axis (OA) direction of the moving unit 1100. Alternatively, for example, the vertical direction 1014A may be a direction perpendicular to the front surface 1007A or the rear surface 10078 of the display panel 751.

In an example, the first surface 1008A of the reflection member 1322 may be parallel to the front surface 1007A or the rear surface 1007B of the display panel 751, and the second surface 1008B of the reflection member 1322 may be perpendicular to the front surface 1007A or the rear surface 10078 of the display panel 751.

The distance d3 or d4 between the front surface or the front side 1007A (or the rear surface or the rear side 10078) of the portable terminal 200A and the reflection member 1322 in the vertical direction 1014A may be a fixed distance, and may be constant, rather than being changed by AF operation of the camera module 1000.

In an example, the reflection member 1322 of the embodiment may be stationary, rather than being movable in the vertical direction 1014A and the horizontal direction 1014B. This may mean that the optical-path changing unit 1320 does not move or shift in the vertical direction 1014A or the horizontal direction 1014B. For example, the horizontal direction 1014B may be perpendicular to the vertical direction 1014A.

For example, the horizontal direction 1014B may be the optical-axis (OA) direction or a direction parallel to the optical axis OA. For example, the horizontal direction 1014B may be a direction parallel to the display panel 751. For example, the horizontal direction 1014B may be a direction parallel to the front surface 1007A or the rear surface 10078 of the display panel 751.

Since the lens module 1400 is moved in the horizontal direction 1014B by the moving unit 1100 but is not moved in the vertical direction 1014A, a distance d5 (refer to FIG. 32b) between the display panel 751 and the moving unit 1100 in the vertical direction 1014A may be a fixed distance, and may be constant, rather than being changed by AF operation of the camera module 1000.

The first surface 1008A of the reflection member 1322 may be located below the upper plate 1011A of the cover member 1310 in order to be protected from external impact.

For example, a distance H1 between the first surface 1008A of the reflection member 1322 and the upper surface of the upper plate 1011A of the cover member 1310 in the vertical direction 1014A may be 0.3 mm to 1 mm. For example, H1 may be 0.5 mm to 0.8 mm. For example, H1 may be 0.6 mm to 0.7 mm.

In an example, as shown in FIG. 21, the distance d4 between the first surface 1008A of the reflection member 1322 and the rear surface 10078 of the display panel 751 in the vertical direction 1014A may be equal to H1.

For example, the thickness of the upper plate 1011A of the cover member 1310 may be 0.5 mm to 0.15 mm, but the disclosure is not limited thereto.

For example, the distance d3 between the first surface 1008A of the reflection member 1322 and the front surface 1007A of the display panel 751 in the vertical direction 1014A may be the sum of d4 and the thickness of the display panel 751.

For example, in the case of a liquid crystal display (LCD) panel of a portable terminal, the thickness of the display panel 751 may be 1 mm to 2 mm, but the disclosure is not limited thereto. In addition, for example, in the case of an organic light-emitting diode (OLED) panel of a portable terminal, the thickness of the display panel 751 may be 0.1 mm to 0.2 mm, but the disclosure is not limited thereto.

For example, in the case of an LCD panel of a portable terminal, d3 may be 1.3 mm to 3 mm. For example, d3 may be 1.5 mm to 2.5 mm. For example, d3 may be 1.6 mm to 1.8 mm.

For example, in the case of an OLED panel of a portable terminal, d3 may be 0.4 mm to 1.2 mm. For example, H1 may be 0.6 mm to 1 mm. For example, H1 may be 0.6 mm to 0.8 mm.

A distance H3 between the second surface 10088 of the reflection member 1322 and the lens module 1400 in the horizontal direction 10148 may be 0.2 mm to 0.6 mm. For example, H3 may be 0.3 mm to 0.5 mm. For example, H3 may be 0.4 mm to 0.45 mm. For example, H3 may be 0.45 mm to 0.6 mm.

For example, H3 may be greater than or equal to the range of the stroke of the AF operation unit in a direction from the initial position of the AF operation unit of the moving unit 1100 toward the second surface 10088. Otherwise, AF operation may not be performed normally due to collision or spatial interference between the lens module 1400 and the second surface 1008B.

For example, H3 may be a distance between the lens module 1400 and the second surface 10088 when the AF operation unit (e.g. the bobbin 1110) of the moving unit 1100 is located at the initial position. Alternatively, in another embodiment, H3 may be a distance between the lens module 1400 and the second surface 1008B when the AF operation unit is located farthest away from the second surface 10088.

In addition, for example, H3 may be a distance between a first lens, which is located closest to the second surface 10088 among the lenses of the lens module 1400, and the second surface 10088. In addition, for example, H3 may be a distance between one region (e.g. the central region) of the first lens, which is located closest to the second surface 1008B, and the second surface 1008B.

For example, the ratio of H3 to d4 (H3:d4) may be 1:0.5 to 1:5. Alternatively, for example, the ratio of H3 to d4 (H3:d4) may be 1:0.5 to 1:1.1. Alternatively, for example, the ratio of H3 to d4 (H3:d4) may be 1:1 to 1:1.5. Alternatively, for example, the ratio of H3 to d4 (H3:d4) may be 1:1.2 to 1:1.5. For example, the ratio of H3 to d4 (H3:d4) may be 1:1.5 to 1:2. Alternatively, for example, the ratio of H3 to d4 (H3:d4) may be 1:2 to 1:5.

When the value obtained by dividing d4 by H3 (d4/H3) is less than 0.5, H3 may have too large a value, which may greatly increase loss of light that is introduced into the lens module through the reflection member 1322.

On the other hand, when the value obtained by dividing d4 by H3 (d4/H3) is greater than 5, d4 may have too large a value, which may reduce the amount of light that is introduced into the reflection member 1322 through the display panel. Alternatively, when the value obtained by dividing d4 by H3 (d4/H3) is greater than 5, H3 may have too small a value, which may restrict the stroke of the lens module 1400 for AF operation.

For example, in the case of an LCD panel of a portable terminal, the ratio of H3 to d3 (H3:d3) may be 1:2.1 to 1:15. Alternatively, for example, in the case of an LCD panel of a portable terminal, the ratio of H3 to d3 (H3:d3) may be 1:2.5 to 1:6. For example, in the case of an LCD panel of a portable terminal, the ratio of H3 to d3 (H3:d3) may be 1:3 to 1:5.

When the value obtained by dividing d3 by H3 (d3/H3) is less than 2.1, d3 may have too small a value, which may cause the reflection member 1322 and the display panel 751 to be too close to each other. Therefore, the display panel 751 and the reflection member 1322 may collide with each other due to external impact, which may cause damage to the camera module. Alternatively, when the value obtained by dividing d3 by H3 (d3/H3) is less than 2.1, H3 may have too large a value, which may greatly increase loss of light that is introduced into the lens module through the reflection member 1322.

On the other hand, when the value obtained by dividing d3 by H3 (d3/H3) is greater than 15, H3 may have too small a value, which may restrict the stroke of the lens module 1400 for AF operation.

For example, in the case of an OLED panel of a portable terminal, the ratio of H3 to d3 (H3:d3) may be 1:0.7 to 1:6. Alternatively, for example, in the case of an OLED panel of a portable terminal, the ratio of H3 to d3 (H3:d3) may be 1:1 to 1:2.5. For example, in the case of an OLED panel of a portable terminal, the ratio of H3 to d3 (H3:d3) may be 1:1.5 to 1:2.

Referring to FIG. 4, a distance H2 between the second surface 10088 of the reflection member 1322 and the upper surface of the upper plate 1302 of the cover member 1300 in the horizontal direction 1014B may be 0.2 mm to 0.8 mm, but the disclosure is not limited thereto. For example, H2 may be 0.4 mm to 0.6 mm. For example, H2 may be 0.5 mm to 0.6 mm.

The second surface 1008B of the reflection member 1322 and the lens module 1400 may be disposed so as to be spaced apart from each other. In an example, a gap or an empty space may be present between the second surface 1008B of the reflection member 1322 and the lens module 1400.

For example, the distance D1 between the second surface 1008B of the reflection member 1322 and the image sensor 1810 in the horizontal direction 1014B may be the sum of the distance H3 between the second surface 1008B and the lens module 1400 in the horizontal direction 10148 and the total top length (TTL) of the lens module 1400.

For example, D1 may be 3.2 mm to 6.6 mm. For example, D1 may be 3.5 mm to 6 mm. For example, D1 may be 4 mm to 5 mm.

For example, the ratio of d4 to D1 (d4:D1) may be 1:3.2 to 1:22. For example, the ratio of d4 to D1 (d4:D1) may be 1:5 to 1:10. Alternatively, for example, the ratio of d4 to D1 (d4:D1) may be 1:10 to 1:15. Alternatively, for example, the ratio of d4 to D1 (d4:D1) may be 1:15 to 1:20.

When the value obtained by dividing D1 by d4 (D1/d4) is less than 3.2, d4 may have too large a value, which may reduce the amount of light that is introduced into the reflection member 1322 through the display panel.

When the value obtained by dividing D1 by d4 (D1/d4) is greater than 22, D1 may have too small a value, which may restrict the stroke of the lens module 1400 for AF operation.

For example, in the case of an LCD panel of a portable terminal, the ratio of d3 to D1 (d3:D1) may be 1:1.1 to 1:5.1. For example, in the case of an LCD panel of a portable terminal, the ratio of d3 to D1 (d3:D1) may be 1:2 to 1:4. For example, in the case of an LCD panel of a portable terminal, the ratio of d3 to D1 (d3:D1) may be 1:2.5 to 1:3.

For example, in the case of an OLED panel of a portable terminal, the ratio of d3 to D1 (d3:D1) may be 1:2.7 to 1:16.5. For example, in the case of an OLED panel of a portable terminal, the ratio of d3 to D1 (d3:D1) may be 1:3 to 1:10. For example, in the case of an OLED panel of a portable terminal, the ratio of d3 to D1 (d3:D1) may be 1:5 to 1:8.

In an example, the distance H3 between the second surface 1008B of the reflection member 1322 and the lens module 1400 in the horizontal direction 1014B may be shorter than the distance d3 between the first surface 1008A of the reflection member 1322 and the front surface 1007A of the display panel 751 in the vertical direction 1014A. In another embodiment, the distance between the second surface 1008B of the reflection member 1322 and the lens module 1400 in the horizontal direction 1014B may be equal to or longer than the distance between the first surface 1008A of the reflection member 1322 and the front surface 1007A of the display panel 751 in the vertical direction 1014A.

In addition, in an example, the distance H3 between the second surface 1008B of the reflection member 1322 and the lens module 1400 in the horizontal direction 1014B may be shorter than the distance d4 between the first surface 1008A of the reflection member 1322 and the rear surface 1007B of the display panel 751 in the vertical direction 1014A. In another embodiment, the distance between the second surface 10088 of the reflection member 1322 and the lens module 1400 in the horizontal direction 1014B may be equal to or longer than the distance between the first surface 1008A of the reflection member 1322 and the rear surface 10078 of the display panel 751 in the vertical direction 1014A.

The distance d3 between the front surface 1007A of the display panel 751 and the first surface 1008A of the reflection member 1322 in the vertical direction 1014A may be longer than the distance between the front surface 1007A of the display panel 751 and the upper surface of the upper plate 1011A of the cover member 1310 in the vertical direction 1014A. In another embodiment, the former may be shorter than or equal to the latter.

With regard to d1, d2, d3, and d4, the front surface 1007A or the rear surface 1007B of the display panel may be a portion corresponding to an active area or a viewing area S1 of the display panel 751.

As shown in FIG. 21, a first edge (or a first corner) at which the first surface 1008A of the reflection member 1322 and the third surface 1008C thereof meet each other may be located closer to a non-viewing area S2 than a second edge (or a second corner) at which the first surface 1008A of the reflection member 1322 and the second surface 10088 thereof meet each other.

In an example, the reflection member 1322 may be located closer to the non-viewing area S2 than the moving unit 1100 (or the image sensor 1810).

Figure 30A:
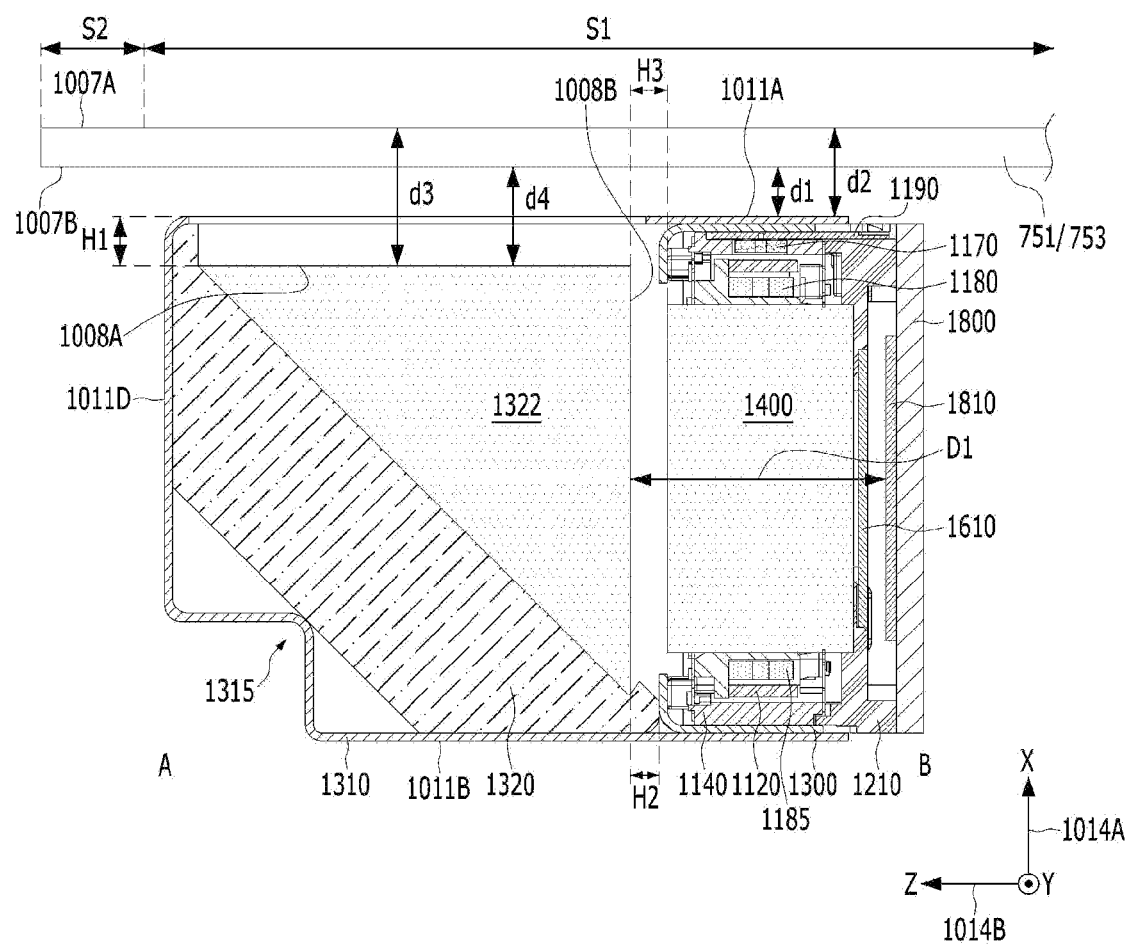
FIG. 30A shows another embodiment of the camera module disposed behind a display panel of a portable terminal.

FIG. 30A shows another embodiment of the camera module 1000 disposed behind the display panel 751 of the portable terminal 200A.

Referring to FIG. 30A, the upper plate 1011A of the cover member 1310 may be located so as to be spaced apart from the display panel 751 by a predetermined distance d1.

For example, d1 may be 0.1 mm to 1 mm. For example, d1 may be 0.2 mm to 0.5 mm. For example, d1 may be 0.4 mm to 0.8 mm.

When d1 is shorter than 0.1 mm, the distance between the camera module and the display panel becomes too short, which may cause damage to the camera module due to external impact. On the other hand, when d1 is longer than 1 mm, d3 and d4 may greatly increase, which may reduce the amount of light that is introduced into the first surface 1008A of the reflection member 1322 through the display panel 751.

For example, the distance d2 between the upper surface of the upper plate 1011A of the cover member 1310 and the front surface 1007A of the display panel 751 in the vertical direction 1014A may be the sum of d1 and the thickness of the display panel 751.

For example, in the embodiment shown in FIG. 30A, d4 may be the sum of H1 and d1.

For example, in the embodiment shown in FIG. 30A, d3 may be the sum of H1 and d2.

For example, d1 may be shorter than H1. In another embodiment, d1 may be equal to or longer than H1.

Figure 30B:
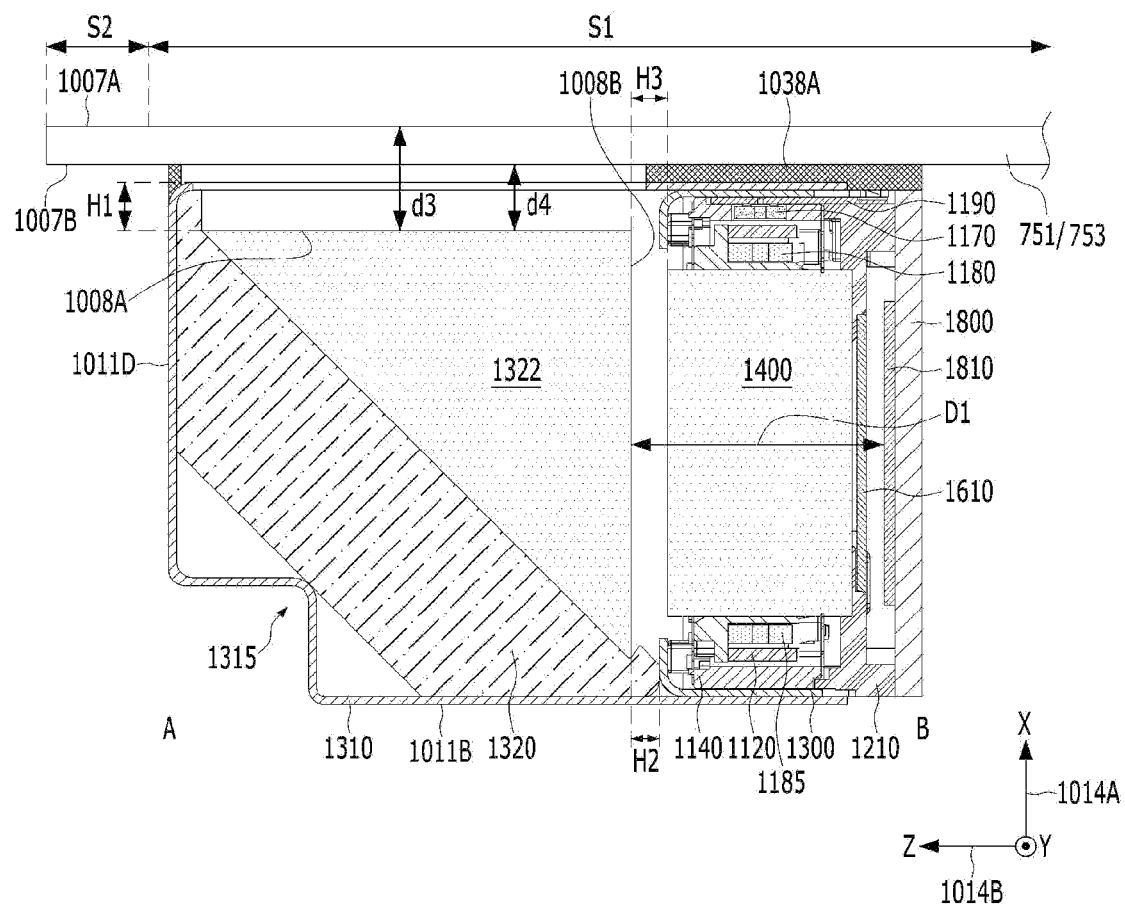
FIG. 30B shows a camera module according to another embodiment having a shock-absorbing member.

FIG. 30B shows a camera module according to another embodiment having a shock-absorbing member. Referring to FIG. 30B, the upper plate 1011A of the cover member 1310 may be spaced apart from the display panel 751, and the camera module may include a shock-absorbing member 1038A, which is disposed between the upper plate 1011A of the cover member 1310 and the display panel 751.

The shock-absorbing member 1038A may be in contact with the upper surface of the upper plate 1011A of the cover member 1310 and the rear surface 1007B of the display panel 751. The shock-absorbing member 1038A may prevent the display panel 751 and the camera module 1000 from colliding with each other due to external impact, and may absorb external impact.

The shock-absorbing member 1038A may be made of a material capable of absorbing impact, for example, PORON® or silicone. For example, the shock-absorbing member 1038A may have an opening corresponding to the first opening 1311 in the cover member 1310 to expose or open the first surface 1008A of the reflection member 1322.

The shock-absorbing member 1038A may be disposed between the display panel 751 and the moving unit 1100 and/or between the display panel 751 and the circuit board 1800. In an example, the shock-absorbing member 1038A may be disposed between the cover member 1300 of the moving unit 1100 and the rear surface 1007B of the display panel 751, between the base 1210 and the rear surface 1007B of the display panel 751, and/or between the rear surface 1007B of the display panel 751 and the circuit board 1800.

Figure 30C:
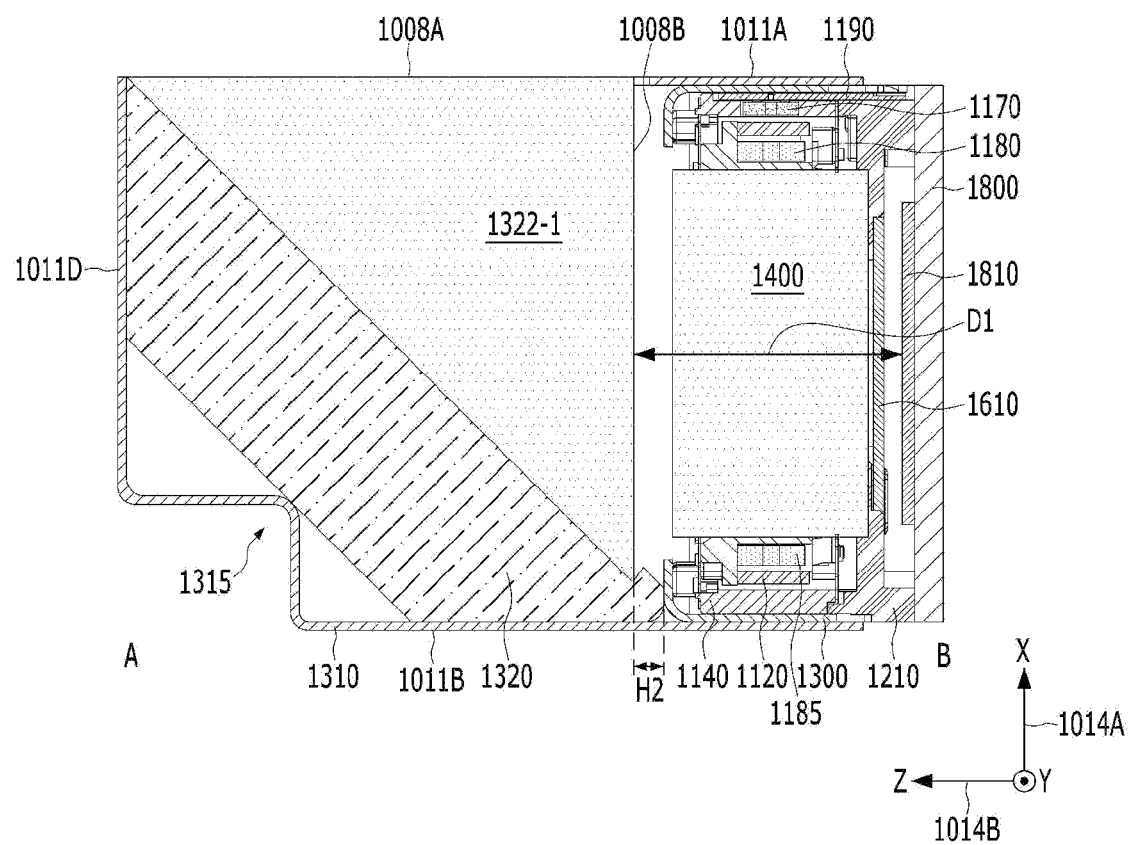
FIG. 30C shows a camera module including a reflection member according to another embodiment.

FIG. 30C shows a camera module including a reflection member 1322-1 according to another embodiment.

Referring to FIG. 30C, the first surface 1008A of the reflection member 1322-1 may be located in the same plane as the upper surface of the upper plate 1011A of the cover member 1310.

In an example, based on the lower plate 1011B of the cover member 1310, the height of the first surface 1008A of the reflection member 1322-1 may be equal to the height of the upper surface of the upper plate 1011A of the cover member 1310.

The embodiment shown in FIG. 30C may be a case in which H1 is 0 in the embodiment shown in FIG. 21. Alternatively, the embodiment shown in FIG. 30C may be a case in which H1 is 0 in the embodiment shown in FIG. 30A.

Compared with FIG. 21 and FIG. 30A, the distance d3 (or d4) between the first surface 1008A of the reflection member 1322-1 shown in FIG. 30C and the front surface 1007A (or the rear surface 1007B) of the display panel 751 may be reduced, which may reduce loss of light that is introduced into the first surface 1008A of the reflection member 1322-1 through the display panel 751.

Figure 30D:
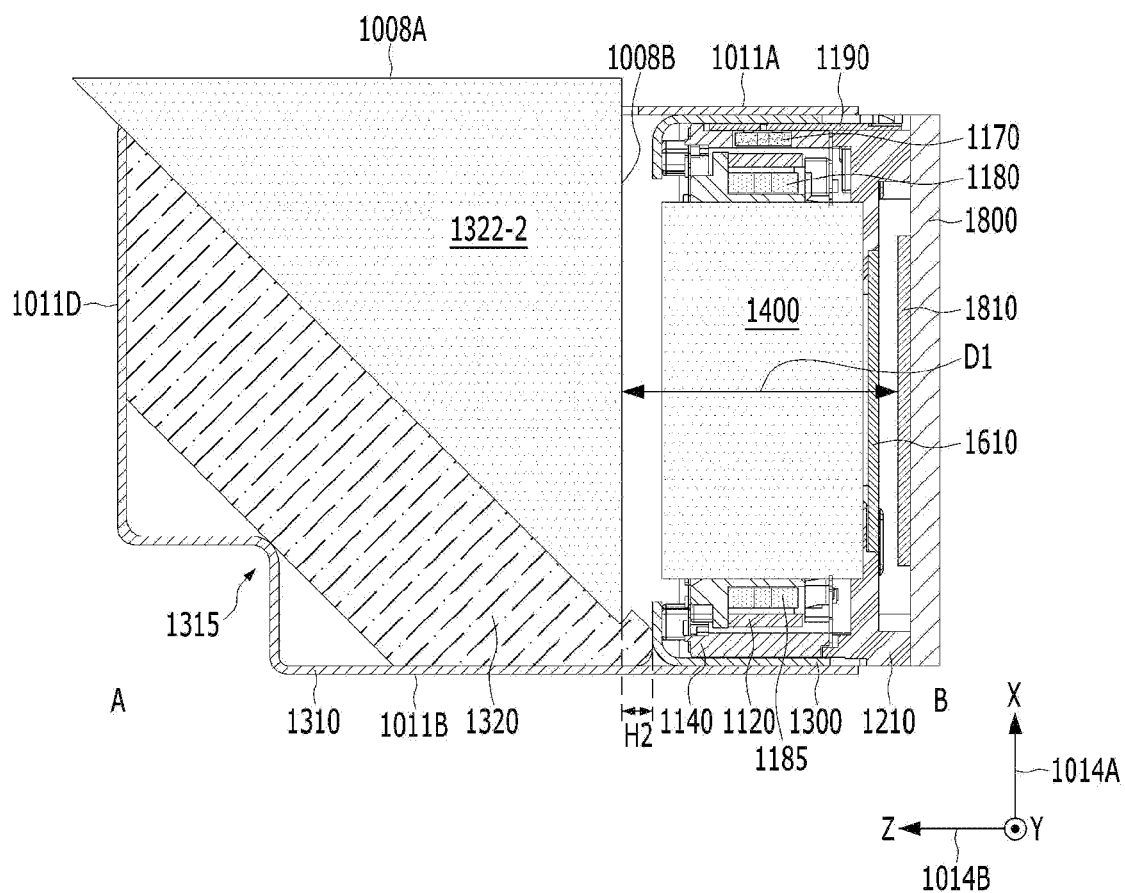
FIG. 30D shows a camera module including a reflection member according to still another embodiment.

FIG. 30D shows a camera module including a reflection member 1322-2 according to still another embodiment.

Referring to FIG. 30D, the first surface 1008A of the reflection member 1322-2 may protrude from the upper surface of the upper plate 1011A of the cover member 1310.

In an example, the first surface 1008A of the reflection member 1322-2 may be located closer to the display panel 751 than the upper surface of the upper plate 1011A of the cover member 1310. In an example, the first surface 1008A of the reflection member 1322-2 may be located closer to the front surface 1007A (or the rear surface 1007B) of the display panel 751 than the upper surface of the upper plate 1011A of the cover member 1310.

Compared with FIG. 21 and FIGS. 30A to 30C, the embodiment shown in FIG. 30D may further reduce the distance between the display panel and the first surface 1008A of the reflection member 1322-2, thereby further reducing loss of light that is introduced into the first surface 1008A of the reflection member 1322-2 through the display panel 751.

In addition, in the embodiments shown in FIGS. 30C and 30D, the first surface 1008A of the reflection member 1322-1 or 1322-2 may be in contact with the rear surface 1007B of the display panel 751. In another embodiment, the first surface 1008A of the reflection member 1322-1 or 1322-2 may be spaced apart from the rear surface 1007B of the display panel 751.

The shock-absorbing member 1038A shown in FIG. 30B may also be applied to the embodiments shown in FIGS. 30C and 30D.

Figure 31:
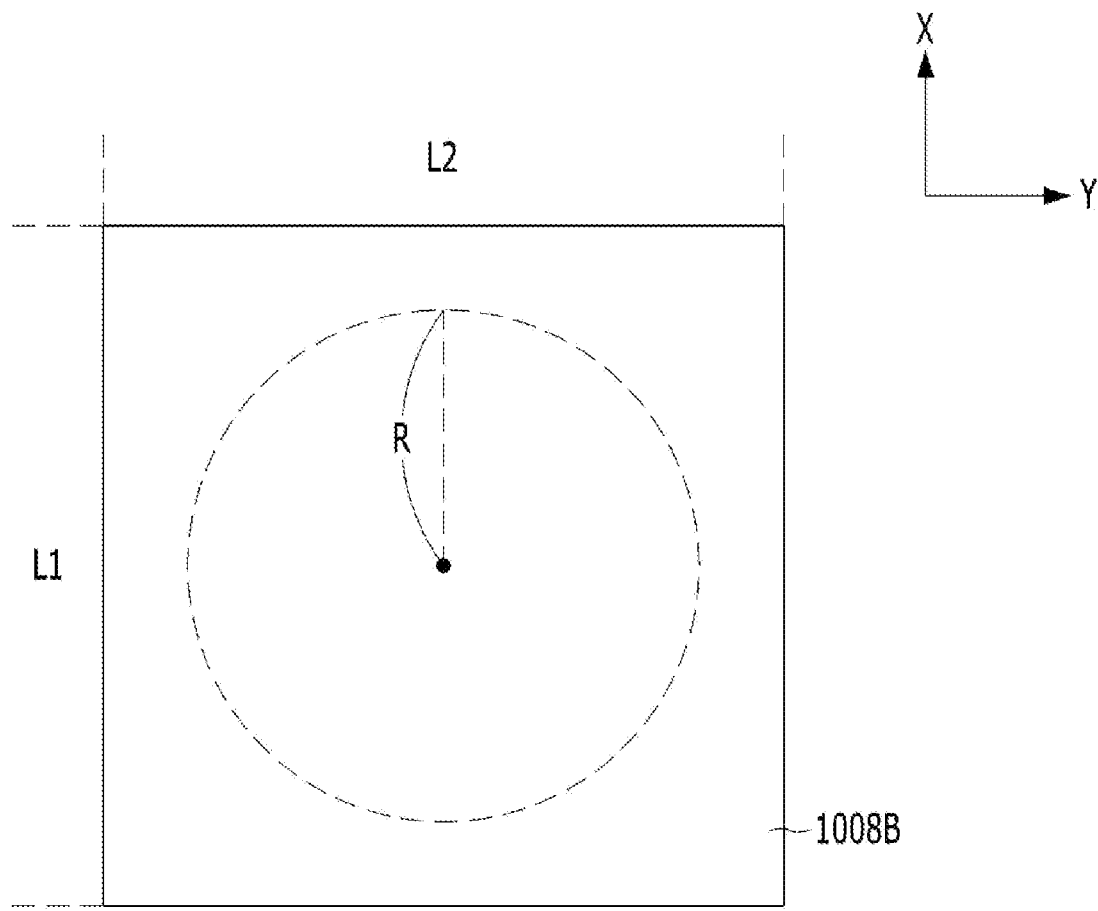
FIG. 31 shows a second surface of the reflection member and a diameter of a lens of a lens module.

FIG. 31 shows the second surface 1008B of the optical-path changing unit 1320 and a diameter of the lens of the lens module 1400. For example, the diameter R of the lens may be a diameter of a first lens in the vertical direction 1014A, which is located closest to the second surface 1008B.

Referring to FIG. 31, the length L1 of the second surface 10088 of the optical-path changing unit 1320 in the longitudinal direction may be greater than the diameter R of the lens (L1>R). In another embodiment, the length of the second surface 10088 in the longitudinal direction may be equal to the diameter of the lens. In an example, the longitudinal direction of the second surface 10088 may be the vertical direction 1014A or the X-axis direction.

The length L2 of the second surface 10088 in the transverse direction may be greater than the diameter R of the lens (L2>R). In another embodiment, the length of the second surface 10088 in the transverse direction may be equal to the diameter of the lens. In an example, the transverse direction of the second surface 10088 may be a direction perpendicular to the vertical direction 1014A. The transverse direction of the second surface 10088 may be a direction (e.g. the Y-axis direction) perpendicular to the optical-axis (OA) direction.

The area of the second surface 10088 of the optical-path changing unit 1320 may be larger than the area of the cross-section of the lens in a direction parallel to a plane perpendicular to the optical axis. In another embodiment, the area of the second surface 10088 may be equal to the area of the cross-section of the lens.

In an example, the size of the first surface 1008A of the reflection member 1322 may be equal to the size of the second surface 10088, and the description of L1 and L2 of the second surface 10088 and the diameter R of the lens may also be applied to the first surface 1008A and the diameter of the lens. Here, the size may be a length in the vertical direction (e.g. the X-axis direction), a length in a direction (e.g. the Y-axis direction) perpendicular to the vertical direction 1014A, or an area.

In another embodiment, the area of the first surface 1008A of the reflection member 1322 may be different from the area of the second surface 1008B thereof. In an example, the area of the first surface 1008A may be larger or smaller than the area of the second surface 1008B.

Figure 32A:
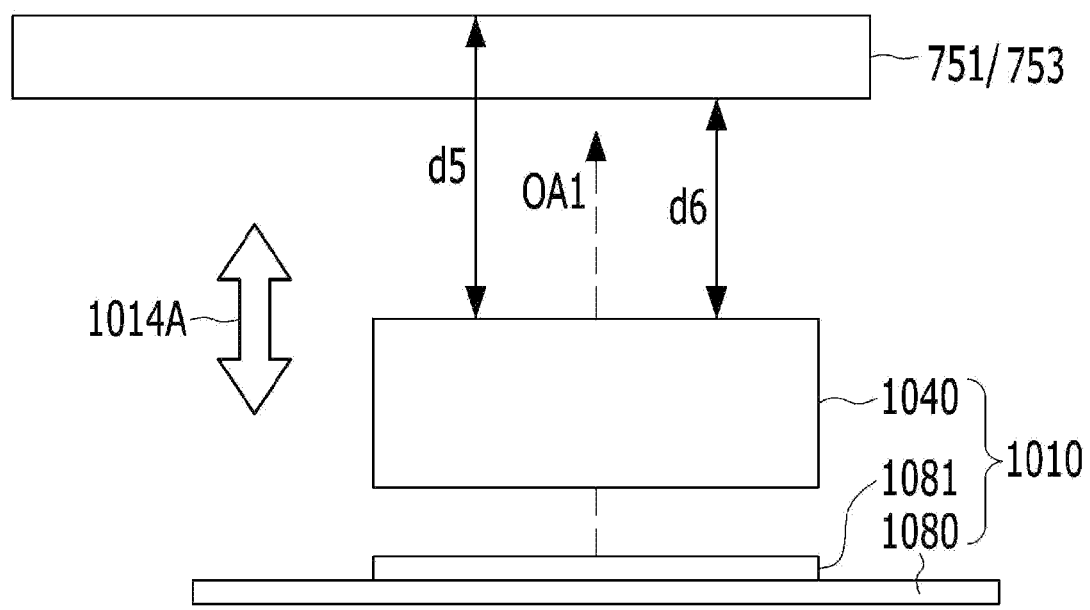
FIG. 32A is a schematic conceptual diagram of a camera module according to a comparative example, which is disposed below a display panel.
Figure 32B:
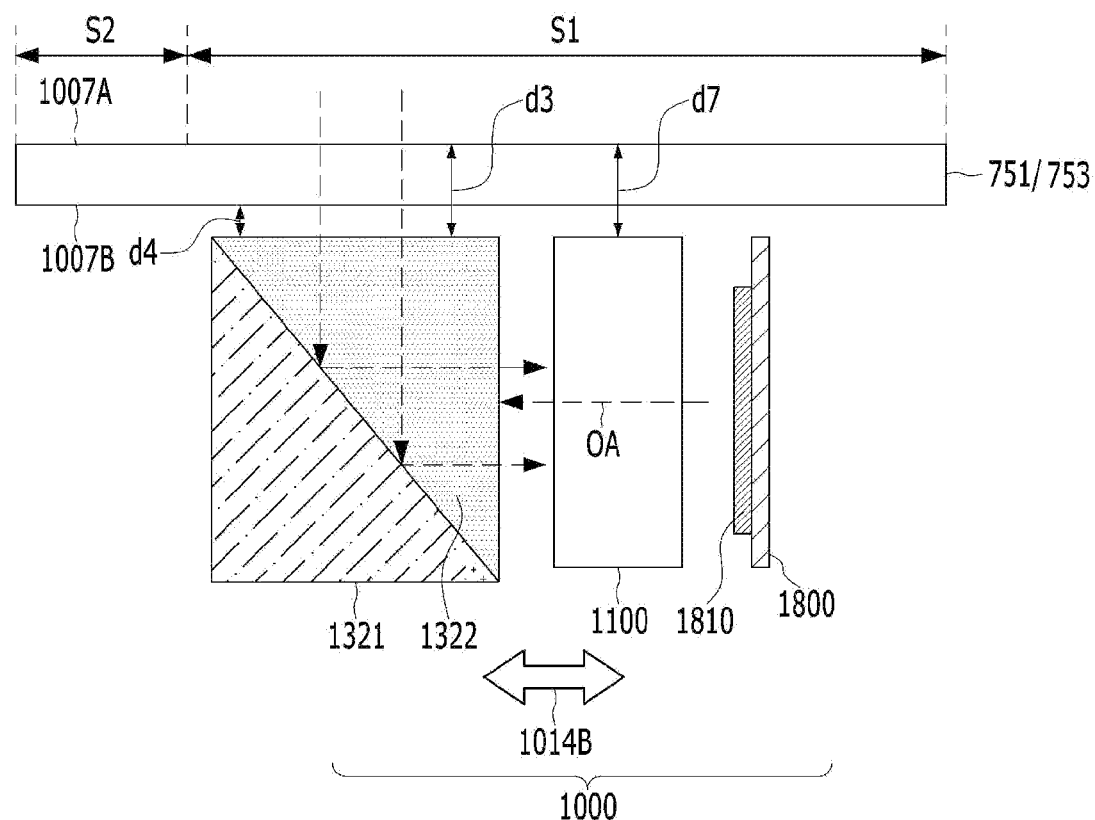
FIG. 32B is a schematic conceptual diagram of the camera module according to the embodiment, which is disposed below a display panel.

FIG. 32A is a schematic conceptual diagram of a camera module 1010 according to a comparative example, which is disposed below the display panel 751, and FIG. 32B is a schematic conceptual diagram of the camera module 1000 according to the embodiment, which is disposed below the display panel 751.

Referring to FIGS. 31 to 32B, the camera module 1010 may include a circuit board 1080, an image sensor 1081 disposed on the circuit board 1080, and a lens-driving unit 1040 disposed on the image sensor 1081.

The lens-driving unit 1040 may be disposed between the lower surface (or the rear surface) of the display panel 751 and the image sensor 1081.

The lens-driving unit 1040 may include a lens module and a driving unit for moving the lens module in the vertical direction 1014A. As the lens module of the lens-driving unit 1040 is moved in the vertical direction 1014A, the distance d5 (or d6) between the lens module (or the lens) of the lens-driving unit 1040 and the front surface (or the rear surface) of the display panel 751 may be changed.

Because light is introduced into the lens-driving unit 1040 through the display panel 751 from the outside of the portable terminal, the amount of light that is introduced into the lens-driving unit 1040 may be reduced by the display panel 751.

In addition, as d5 (or d6) increases, the amount of light that is introduced into the lens module of the lens-driving unit 1040 may be greatly reduced. In addition, as shown in FIG. 32A, as the lens module moves in the vertical direction 1014A by the lens-driving unit 1040, the amount of light that is introduced into the lens module may be greatly changed.

In an example, there may be a large difference between the amount of light that is introduced into the lens module when the lens module is located closest to the display panel 751 and the amount of light that is introduced into the lens module when the lens module is located farthest away from the display panel 751.

In the camera module 10 shown in FIG. 32A, in which the amount of light is reduced by the display panel 751, the amount of light that is introduced into the lens module of the lens-driving unit 1040 is further reduced as d5 (or d6) increases. Therefore, AF operation may not be performed normally, an image generated by the image sensor 1081 may be dark, and the resolution of the image sensor 1081 may be reduced.

In particular, when the lens-driving unit 1040 reaches a position farthest from the display panel 751 during AF operation, the amount of light that is introduced into the image sensor 1081 may be greatly reduced.

Referring to FIG. 32B, the first surface 1008A of the reflection member 1322 of the optical-path changing unit 1320 may be fixedly disposed at a position spaced apart from the front surface 1007A of the display panel 751 by a predetermined distance d3. Alternatively, in an example, the first surface 1008A of the reflection member 1322 of the optical-path changing unit 1320 may be fixedly disposed at a position spaced apart from the rear surface 1007B of the display panel 751 by a predetermined distance d4.

The distance d3 or d4 between the front surface or the front side 1007A (or the rear surface or the rear side 1007B) of the portable terminal 200A and the optical-path changing unit 1320 in the vertical direction 1014A may be a predetermined fixed distance, and may be constant, rather than being changed by AF operation of the camera module 1000.

Since the lens module 1400 is moved in the horizontal direction 1014B by the moving unit 1100 but is not moved in the vertical direction 1014A, a distance d7 between the display panel 751 and the moving unit 1100 in the vertical direction 1014A may be a predetermined distance, and may be constant, rather than being changed by AF operation of the camera module 1000.

In an example, d7 may be a distance between the front surface 1007A (or the rear surface 1007B) of the display panel 751 and the bobbin 1110 (or the lens module 1400) of the moving unit 1100 in the vertical direction 1014A.

Although the amount of light is reduced by the display panel 751, since the distances d3 and d4 are constant, the amount of light that is introduced into the reflection member 1322 may be constant regardless of AF operation of the camera module 1000.

Accordingly, according to the embodiment, a sufficient amount of light for AF operation may be uniformly introduced into the reflection member 1322, and AF operation may be smoothly performed in the configuration in which the amount of light is reduced by the display panel 751. That is, the embodiment may secure a uniform amount of light for stable AF operation.

The light that is introduced in the vertical direction 1014A may be reflected or refracted in the horizontal direction 1014B by the reflection member 1322, and the lens module 1400 may be moved in the horizontal direction 1014B by the moving unit 1100, whereby autofocus may be performed. Therefore, it is possible to prevent AF operation from being performed abnormally due to insufficiency in amount of light in the optical instrument in which the camera module is disposed so as to overlap the active area of the display panel 751 in the vertical direction 1014A and to prevent the resolution of the image sensor 1810 from being deteriorated.

Figure 33:
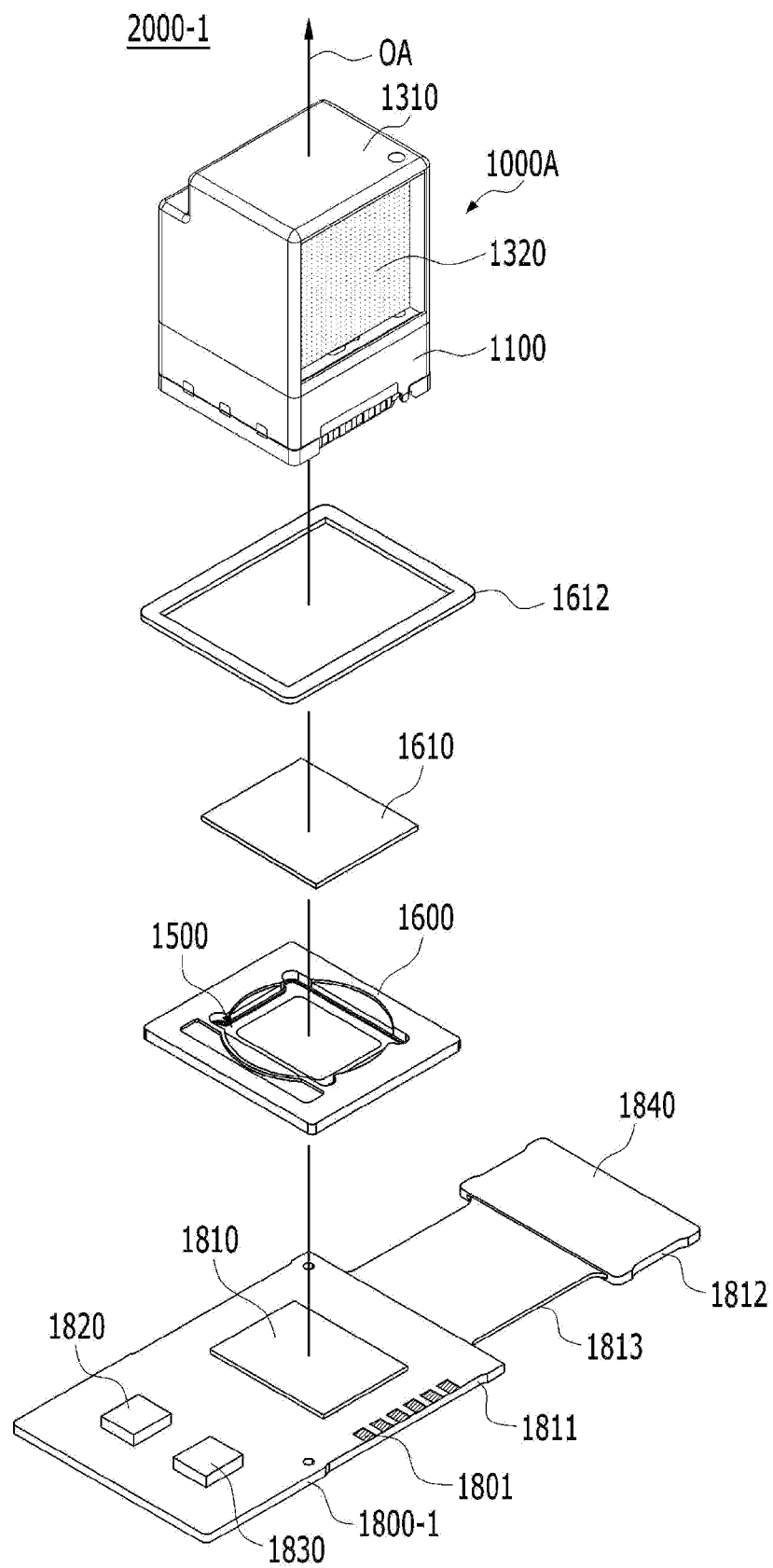
FIG. 33 is an exploded perspective view of a camera module according to another embodiment.

FIG. 33 is an exploded perspective view of a camera module 2000-1 according to another embodiment. Referring to FIG. 33, the camera module 2000-1 may be a modified example of the camera module 1000 shown in FIGS. 18 and 19.

The camera module 2000-1 may further include an adhesive member 1612 and a sensor base 1600 compared to the camera module 1000 shown in FIG. 18. The circuit board 1800-1 shown in FIG. 33 may be a modified example of the circuit board 1800 shown in FIG. 19.

In an example, the circuit board 1800-1 may include a first board 1811 on which the image sensor 1810 is disposed, a second board 1812, and a third board 1813 connecting the first board 1811 to the second board 1812. The circuit board 1800-1 may include terminals 1801 conductively connected to the terminals B1 to B6 of the circuit board 1190 of the moving unit 1100.

The adhesive member 1612 may couple or attach the base 1210 of the moving unit 1100 to the circuit board 1800-1. For example, the adhesive member 1612 may be an epoxy, a thermosetting adhesive, an ultraviolet curable adhesive, or the like.

The sensor base 1600 may be disposed under the base 1210 of the moving unit 1100. In an example, the sensor base 1600 may be disposed on the circuit board 1800-1.

The sensor base 1600 may include a seating portion 1500, in which the filter 1610 is mounted, seated, or disposed. In an example, the seating portion 1500 may be formed in the shape of a recess depressed in the upper surface of the sensor base 1600, but the disclosure is not limited thereto. In another embodiment, the seating portion may have a shape of a protruding portion protruding from the upper surface of the sensor base 1600.

The sensor base 1600 may have an opening or a hole formed therein to expose or open the active area of the image sensor 1810.

The filter 1610 is disposed or mounted in the seating portion 1500 of the sensor base 1600.

The filter 1610 may serve to block introduction of light within a specific frequency band, among the light that has passed through the lens module 1400, into the image sensor 1810. The filter 1610 may be an infrared cut filter, but the disclosure is not limited thereto. In this case, the filter 1610 may be disposed parallel to the xy-plane.

In this case, the infrared cut filter may be formed of a film material or a glass material. For example, the infrared cut filter may be formed by coating an infrared cut coating material on a plate-type optical filter, such as photographing-surface protecting cover glass or cover glass.

In another embodiment, the filter 1610 may be disposed under the base 1210 of the moving unit 1100. Alternatively, in another embodiment, the base 1210 may have a seating portion formed in the lower surface thereof to allow the filter 1610 to be seated therein. In this case, the sensor base may be omitted.

The circuit board 1800-1 may be disposed under the moving unit 1100, and the image sensor 1810 may be disposed or mounted on the upper surface of the circuit board 1800-1. The image sensor 1810 may receive an image contained in the light introduced thereinto through the reflection member 1322 and the lens module 1400, and may convert the received image into an electrical signal.

The image sensor 1810 may be located so as to allow the lens module 1400 to be aligned with the optical axis. Thereby, the image sensor may obtain light that has passed through the lens module 1400. The image sensor 1810 may output an image using light emitted thereto. For example, the image sensor 1810 may be a charge coupled device (CCD), a metal oxide semiconductor (MOS), a CPD, or a CID. However, the type of image sensor is not limited thereto.

The filter 1610 and the image sensor 1810 may be spaced apart from each other so as to face each other in the horizontal direction 10148 or the optical-axis (OA) direction.

The camera module 2000-1 may be conductively connected to the circuit board 1800-1, and may further include a connector 1840 having a port to be conductively connected to an external device.

The camera module 2000-1 may further include a motion sensor 1820, which is disposed or mounted on the circuit board 1800-1. The motion sensor 1820 may be conductively connected to the controller 1830 via a circuit pattern formed on the circuit board 1800-1.

The motion sensor 1820 may output rotational angular speed information regarding the movement of the camera module 2000-1. The motion sensor 1820 may be implemented as a two-axis or three-axis gyro sensor or an angular speed sensor.

The camera module 2000-1 may further include a controller 1830, which is disposed or mounted on the circuit board 1800-1. The controller 1830 may be conductively connected to the position sensor 1170. In an example, the controller 1830 may be conductively connected to the coil 1120.

In an example, the circuit board 1800-1 may be conductively connected to the circuit board 1190 of the moving unit 1100, and the controller 1830 may be conductively connected to the coil 1120 and the position sensor 1170 via the circuit board 1800-1.

In addition, the controller 1830 may perform AF feedback operation of the AF operation unit of the moving unit 1100 based on the output signal applied thereto from the position sensor 1170.

The camera modules 200-1 to 200-11, 1000, and 2000-1 according to the embodiments may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Alternatively, for example, the optical instrument according to the embodiment may include a mobile device, a phone, a smartphone, a portable terminal equipped with a camera, etc.

Figure 34:
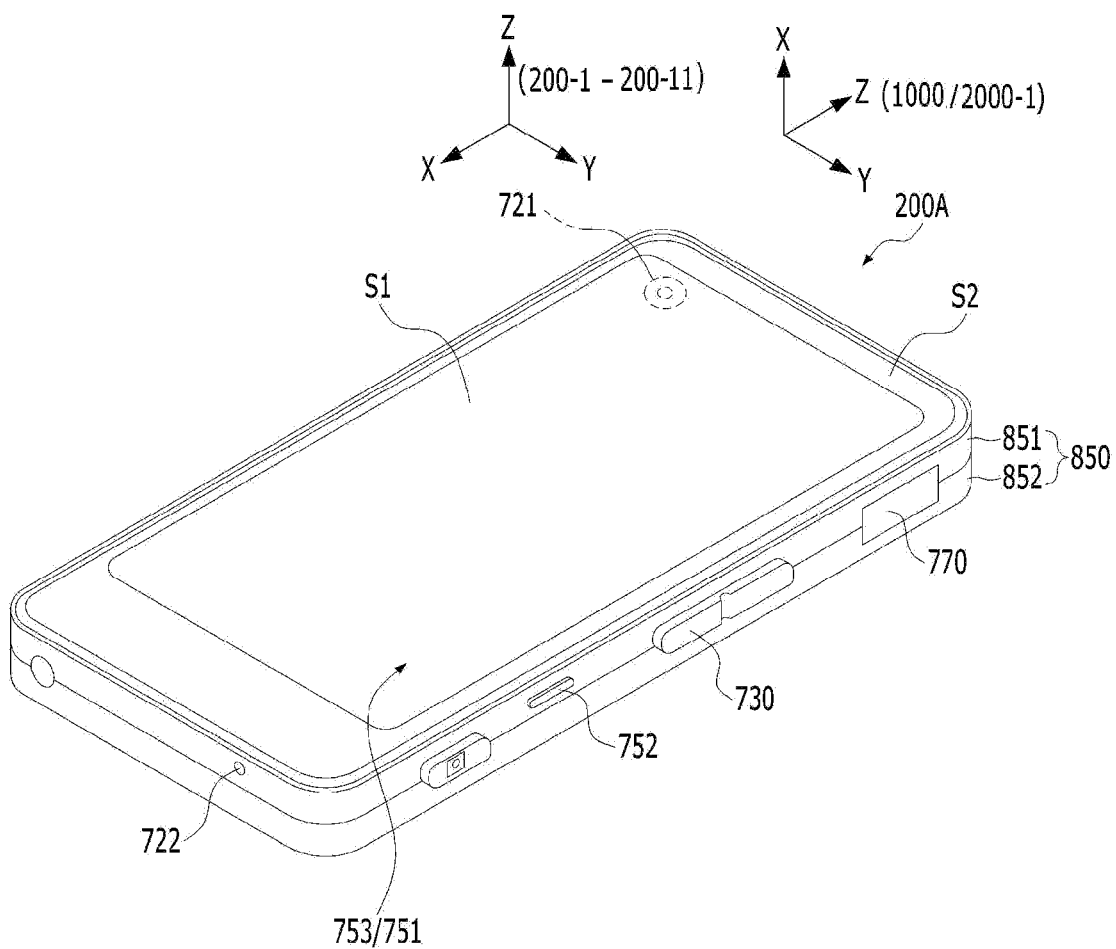
FIG. 34 is a perspective view of a portable terminal according to an embodiment.
Figure 35:
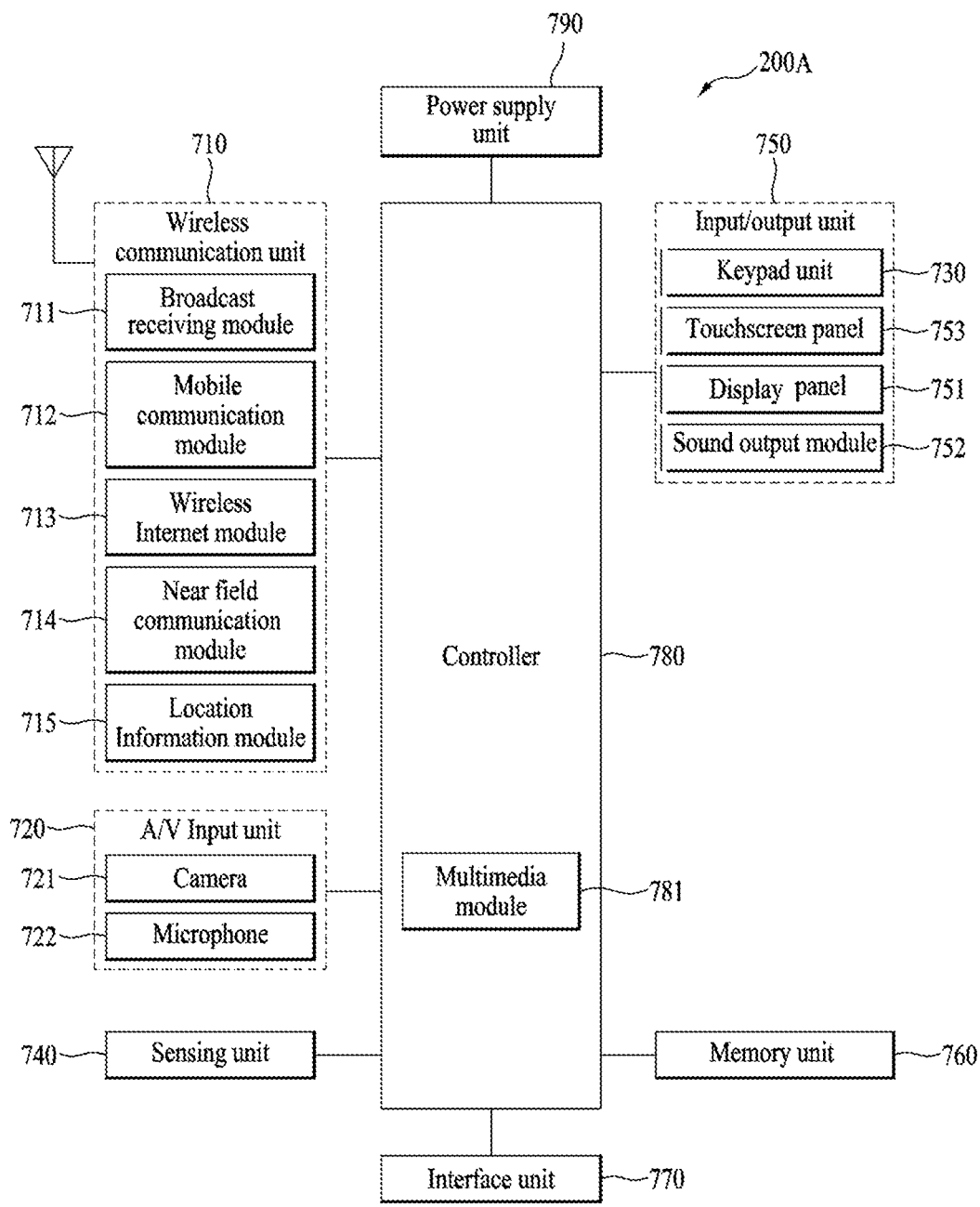
FIG. 35 is a configuration diagram of the portable terminal shown in FIG. 34.

FIG. 34 is a perspective view of an optical instrument 200A according to an embodiment, and FIG. 35 is a configuration diagram of the optical instrument 200A shown in FIG. 34. In FIG. 34, the X-axis direction, the Y-axis direction, and the Z-axis direction are defined based on those in the embodiments 200-1 to 200-11 shown in FIGS. 1 to 17 and those in the embodiments 1000 and 2000-1 shown in FIGS. 18 to 33, and the optical instrument will be described using the defined directions.

Referring to FIGS. 34 and 35, the optical instrument 200A may include a body 850, a wireless communication unit 710, an A/V input unit 720, a sensor unit 740, an input/output unit 750, a memory 760, an interface unit 770, a controller 780, and a power supply unit 790.

The body 850 shown in FIG. 34 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. In an example, the wireless communication unit 710 may include a broadcast receiving module 711, a mobile communication module 712, a wireless Internet module 713, a nearfield communication module 714, and a position information module 715.

The audio/video (A/V) input unit 720 serves to input audio signals or video signals, and may include a camera 721 and a microphone 722.

The camera 721 may include any one of the camera modules 200-1 to 200-11, 1000, and 2000-1 according to the embodiments.

The sensor unit 740 may sense the current state of the terminal 200A, such as the open or closed state of the terminal 200A, the position of the terminal 200A, the presence or absence of user touch, the orientation of the terminal 200A, or the acceleration/deceleration of the terminal 200A, and may generate a sensing signal to control the operation of the terminal 200A. In an example, when the terminal 200A is a slide-type phone, whether the slide-type phone is open or closed may be detected. In addition, the sensor unit 740 serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display panel 751, a touchscreen panel 753, and a sound output module 752. The keypad unit 730 may generate input data in response to input to a keypad.

The display panel 751 may include a plurality of pixels, the color of which varies in response to electrical signals. In an example, the display panel 751 may include at least one of a liquid crystal display, a thin-film transistor liquid crystal display, an organic light-emitting diode, a flexible display, or a 3D display.

The touchscreen panel 753 may convert variation in capacitance, caused by user touch on a specific region of the display panel 751, into an electrical input signal. In an example, the touchscreen panel 753 may include at least one sensing electrode for sensing user touch.

The touchscreen panel 751 and the display panel 753 may be provided separately from each other, or may be integrated with each other.

For example, the touchscreen panel may be of an add-on type or an embedded type. The add-on type may be a type in which the touchscreen panel is attached to an outer side of the display panel in a film form. The embedded type may be a type in which the touchscreen panel is mounted in the display panel. For example, the embedded type may include an in-cell type or an on-cell type.

The sound output module 752 may output audio data received from the wireless communication unit 710 in a call-signal reception mode, a call mode, a recording mode, a voice recognition mode, or a broadcast reception mode, or may output audio data stored in the memory 760. The sound output module 752 may include a speaker for outputting a sound.

The memory 760 may store programs for processing and control of the controller 780, and may temporarily store input/output data (e.g. a phone book, messages, audio, still images, pictures, and moving images). In an example, the memory 760 may store images captured by the camera 721, for example, pictures or moving images.

The interface unit 770 serves as a passage for connection between the terminal 200A and an external device. The interface unit 770 may receive data or power from the external device, and may transmit the same to respective components in the terminal 200A, or may transmit data in the terminal 200A to the external device. In an example, the interface unit 770 may include a wired/wireless headset port, an external charger port, a wired/wireless data port, a memory card port, a port for connection to a device having an identification module, an audio input/output (I/O) port, a video input/output (I/O) port, and an earphone port.

The controller 780 may control the overall operation of the terminal 200A. In an example, the controller 780 may perform control and processing related to voice calls, data communication, and video calls.

The controller 780 may include a multimedia module 781 for multimedia playback. The multimedia module 781 may be provided in the controller 780, or may be provided separately from the controller 780.

The controller 780 may perform pattern recognition processing, by which writing or drawing input to the touchscreen is perceived as characters or images.

The power supply unit 790 may supply power required to operate the respective components upon receiving external power or internal power under the control of the controller 780.

Referring to FIGS. 3B, 34, and 35, the portable terminal 200A may include a front surface or a front side 7A and a rear surface or a rear side formed opposite the front surface or the front side.

Structurally, the front surface or the front side 7A of the portable terminal 200A may be glass (e.g. front tempered glass) included in the display panel 751 or the touchscreen panel 753.

The touchscreen panel 753 and the display panel 751 may be located adjacent to the front surface or the front side 7A of the portable terminal 200A.

The display panel 751 may include an active area.

Each of the camera modules 200-1 to 200-11 described with reference to FIGS. 1 to 17 may be fixedly disposed at a position spaced apart from the display panel 753, and the image sensor 810 may be disposed so as to be spaced apart from the lens module 400 (or the lens). The image sensor 810 may be moved in the optical-axis direction by a driving unit, and the "driving unit" may include the coil 120 and the magnet 130 described above. In addition, the driving unit may include at least one of a second circuit board 805, a first circuit board 800, or a support member 220. In addition, the driving unit may further include a position sensor 170. In addition, the driving unit may further include a sensing magnet 180.

The embodiment relates to a camera module configured to receive light passing through the active area of the display panel 751. The camera module may include a lens module 400 (or a lens) fixed in the optical-axis direction, an image sensor 810 disposed so as to be spaced apart from the lens, and a driving unit configured to move the image sensor 810 in the optical-axis direction.

The lens module 400 (or the lens) may face the active area in the optical-axis direction.

In an example, the lens module 400 (or the lens) may be spaced apart from the active area in the optical-axis direction or a direction perpendicular to the display panel.

In an example, a portion of the lens module 400 (or the lens) may be spaced apart from the active area in a direction perpendicular to the optical axis or a direction parallel to the display panel.

At least a portion of the lens module 400 (or the lens) may overlap the active area in the optical-axis direction. In an example, at least a portion of the lens module 400 (or the lens) may overlap the active area in a direction perpendicular to the display panel. At least a portion of the lens module 400 (or the lens) may be disposed under the active area.

At least a portion of the image sensor 810 may overlap the active area in the optical-axis direction. Alternatively, at least a portion of the image sensor 810 may overlap the active area in a direction perpendicular to the display panel. At least a portion of the image sensor 810 may be disposed under the active area. In an example, the active area may be a display area or a viewing area in which an image is displayed.

In an example, the image sensor 810 and the active area may be disposed or arranged parallel to each other.

The front surface or the front side of the portable terminal 200A may include a viewing area S1 that is visible to the user and a non-viewing area S2 that is invisible to the user.

The viewing area S1 may be a display surface of the front surface 7A of the display panel 751, on which an image is displayed so as to be visible to the user. In addition, a touch surface, to which user touch is input, may be included in the viewing area. In addition, in an example, the non-viewing area S2 may be an area (e.g. a black area) in which an image identifiable by the user is not visible.

In an example, the non-viewing area S2 may be disposed around the active area. In an example, the non-viewing area S2 may be disposed so as to surround the active area.

Each of the camera modules 200-1 to 200-11 may be disposed behind the viewing area S1 of the portable terminal 200A. In an example, each of the camera modules 200-1 to 200-11 may not be exposed to the viewing area S1 of the portable terminal 200A.

In an example, at least a portion of each of the camera modules 200-1 to 200-11 (e.g. the lens module 400) may overlap the viewing area S1 in the optical-axis direction or a direction perpendicular to the front surface 7A of each of the camera modules 200-1 to 200-11. In addition, each of the camera modules 200-1 to 200-11 may not overlap the non-viewing area S2 in the optical-axis direction or a direction perpendicular to the front surface 7A of each of the camera modules 200-1 to 200-11.

In another embodiment, at least another portion of each of the camera modules 200-1 to 200-11 (e.g. the lens module 400) may overlap the non-viewing area S2 in the optical-axis direction or a direction perpendicular to the front surface 7A of each of the camera modules 200-1 to 200-11.

The display panel 751 may include an active area including a plurality of pixels. In an example, the active area may be included in the viewing area S1.

At least a portion of each of the camera modules 200-1 to 200-11 (e.g. at least a portion of the lens or at least a portion of the lens barrel) may overlap the active area of the display panel 751 in the optical-axis direction or a direction perpendicular to the front surface 7A of each of the camera modules 200-1 to 200-11.

In addition, in an example, at least a portion of each of the camera modules 200-1 to 200-11 (e.g. at least a portion of the lens or at least a portion of the lens barrel) may overlap at least one of the pixels in the active area of the display panel 751 in the optical-axis direction or a direction perpendicular to the front surface 7A of each of the camera modules 200-1 to 200-11.

In an example, the lens or the lens barrel of each of the camera modules 200-1 to 200-11 may face or oppose the display panel 751 in the optical-axis (OA) direction (e.g. the Z-axis direction).

Since each of the camera modules 200-1 to 200-11 is disposed behind the active area of the display panel 751, the embodiment may reduce the size of a bezel of the portable terminal 200A, and may increase the size of the display area (e.g. the active area). In addition, in an example, the speaker of the sound output module 752 may be disposed on the side surface of the portable terminal 200A in order to increase the size of the display area.

In addition, in each of the camera modules 200-1 to 200-11 according to the embodiments, the distance D1 or D2 between the front surface 7A (or the rear surface 7B of the display panel 751 and the lens module 400 in the optical-axis direction is constant regardless of autofocus operation.

Therefore, although the amount of light is reduced by the touchscreen panel 753 and the display panel 751, a constant amount of light may be introduced into the lens module 400. Since the embodiment secures a constant amount of light, AF operation may be smoothly performed in the configuration in which the amount of light is reduced by the touchscreen panel 753 and the display panel 751.

In addition, since the image sensor 810 is moved in the optical-axis direction to perform autofocus, each of the embodiments 200-1 to 200-11 may include a lens module 400 including a large-diameter lens, which may lead to an increase in the resolution of each of the camera modules 200-1 to 200-11.

In addition, referring to FIGS. 18 to 33, 34, and 35, the embodiments relate to camera modules 1000 and 2000-1 configured to receive light passing through the active area of the display panel 751. The camera module may include a reflection member 1322 fixed in the vertical direction 1014A and the horizontal direction 1014B (or the optical-axis direction), a lens module 1400 disposed so as to be spaced apart from the reflection member 1322, a moving unit 1100 configured to move the lens module 1400 in the horizontal direction 1014B, and an image sensor 1810 disposed so as to be spaced apart from the moving unit 1100 in the horizontal direction 1014B. In an example, the optical-axis direction of the lens module 1400 (or the lens) may be parallel to the active area of the display panel 751.

In an example, the lens module 1400 (or the lens) may be spaced apart from the active area in the vertical direction 1014A or a direction perpendicular to the display panel 751.

At least a portion of the optical-path changing unit 1320 may overlap the active area in the vertical direction 1014A (or a direction perpendicular to the optical axis OA). In an example, the entire area of the optical-path changing unit 1320 may overlap the active area in the vertical direction 1014A (or a direction perpendicular to the optical axis OA).

At least a portion of the reflection member 1322 may overlap the active area in the vertical direction 1014A (or a direction perpendicular to the optical axis OA). In an example, the entire area of the reflection member 1322 may overlap the active area in the vertical direction 1014A (or a direction perpendicular to the optical axis OA).

At least a portion of the lens module 1400 may overlap the active area in the vertical direction 1014A (or a direction perpendicular to the optical axis OA). In an example, the entire area of the lens module 1400 may overlap the active area in the vertical direction 1014A (or a direction perpendicular to the optical axis OA).

At least a portion of each of the camera modules 1000 and 2000-1 may overlap the active area of the display panel 751 in the vertical direction 1014A (or a direction perpendicular to the optical axis OA). In an example, at least one of the moving unit 1100, the circuit board 1800 or 1800-1, or the image sensor 1810 may overlap the active area of the display panel 751 in the vertical direction 1014A or a direction perpendicular to the front surface 1007A of the display panel 751.

At least a portion of the image sensor 1810 may overlap the active area in the vertical direction 1014A (or a direction perpendicular to the optical axis). Alternatively, at least a portion of the image sensor 1810 may overlap the active area in a direction perpendicular to the display panel 751.

At least a portion of the image sensor 1810 may be disposed under the active area. In an example, the active area may be a display area or a viewing area in which an image is displayed.

In an example, the active area of the image sensor 1810 may be disposed or arranged so as to be perpendicular to the front surface 1007A or the rear surface 10078 of the display panel 751.

Each of the camera modules 1000 and 2000-1 may be disposed behind the viewing area S1 of the portable terminal 200A. In an example, each of the camera modules 1000 and 2000-1 may not be exposed to the viewing area S1 of the portable terminal 200A.

In an example, at least a portion of each of the camera modules 1000 and 2000-1 may overlap the viewing area S1 in the vertical direction 1014A or a direction perpendicular to the front surface 1007A of the display panel 751. In addition, each of the camera modules 1000 and 2000-1 may not overlap the non-viewing area S2 in the vertical direction 1014A or a direction perpendicular to the front surface 1007A of the display panel 751.

In another embodiment, a portion of each of the camera modules 1000 and 2000-1 may overlap the non-viewing area S2 in the vertical direction 1014A or a direction perpendicular to the front surface 1007A of the display panel 751.

In addition, in an example, at least a portion of each of the camera modules 1000 and 2000-1 may overlap at least one of the pixels in the active area of the display panel 751 in the vertical direction 1014A or a direction perpendicular to the front surface 1007A of the display panel 751.

In an example, the reflection member 1322 may overlap at least one of the pixels in the active area in the vertical direction 1014A or a direction perpendicular to the front surface 1007A of the display panel 751. In addition, at least one of the moving unit 1100, the circuit board 1800 or 1800-1, or the image sensor 1810 may overlap at least one of the pixels in the active area in the vertical direction 1014A or a direction perpendicular to the front surface 1007A of the display panel 751.

In an example, the first surface 1008A of the reflection member 1322 of each of the camera modules 1000 and 2000-1 may face or oppose the active area of the display panel 751 in the vertical direction 1014A.

In an example, the first surface 1008A of the reflection member 1322 of each of the camera modules 1000 and 2000-1 may face or oppose at least one of the pixels in the active area of the display panel 751 in the vertical direction 1014A.

Since each of the camera modules 1000 and 2000-1 is disposed behind the active area of the display panel 751, the embodiment may reduce the size of a bezel of the optical instrument 200A, and may increase the size of the display area (e.g. the active area). In addition, in an example, the speaker of the sound output module 752 may be disposed on the side surface of the portable terminal 200A in order to increase the size of the display area.

In addition, in each of the camera modules 1000 and 2000-1 according to the embodiments, the distance d3 or d4 between the front surface 1007A (or the rear surface 1007B) of the display panel 751 and the first surface 1008A of the reflection member 1322 in the vertical direction is constant regardless of autofocus operation.

Therefore, although the amount of light is reduced by the touchscreen panel 753 and the display panel 751, a constant amount of light may be introduced into the reflection member 1322. According to the embodiment, since the amount of light that is introduced into the camera module is constant, AF operation may be smoothly performed, and deterioration in the resolution of the camera module may be prevented in the configuration in which the amount of light is reduced by the touchscreen panel 753 and the display panel 751.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera module and an optical instrument for smoothly performing autofocus operation without insufficiency in amount of light in the configuration in which the amount of light is reduced by a display module.

The invention claimed is:

1. An optical instrument comprising:
a display panel comprising an active area; and
a camera module configured to receive light passing through the active area, wherein the camera module comprises:
 a fixed unit comprising a housing and a lens coupled to the housing and fixedly disposed at a position spaced apart from the display panel;
 a moving unit comprising a second circuit board, a holder disposed on the second circuit board, an image sensor disposed on the second circuit board so as to be spaced apart from the lens, and a filter coupled to the holder and disposed between the lens and the image sensor;
 a driving unit comprising a coil disposed on one of the housing and the holder and a magnet disposed on the other one of the housing and the holder; and
 a support member configured to support the second circuit board,
wherein the support member comprises:
 a first elastic member extending in the optical-axis direction and coupled to a first terminal of a first circuit board; and
 a second elastic member extending in the direction perpendicular to the optical-axis direction and comprising a first coupling portion coupled to a first terminal of the second circuit board by a solder or a conductive adhesive, a second coupling portion coupled to a second terminal of the first circuit board by a solder or a conductive adhesive, and a connecting portion connecting the first coupling portion and the second coupling portion, wherein the moving unit is configured to move in an optical-axis direction by an interaction between the coil and the magnet, wherein the lens is fixed in the optical-axis direction and in a direction perpendicular to the optical-axis direction, and wherein the magnet overlaps the coil in the optical-axis direction.

2. The optical instrument according to claim 1, wherein at least a portion of the lens overlaps the active area in the optical-axis direction.

3. The optical instrument according to claim 1, wherein at least a portion of the lens overlaps the active area in a direction perpendicular to the display panel.

4. The optical instrument according to claim 1, wherein at least a portion of the lens is disposed under the active area.

5. The optical instrument according to claim 1,
wherein the active area comprises a plurality of pixels, and
wherein at least a portion of the lens overlaps at least one of the plurality of pixels in the optical-axis direction.

6. The optical instrument according to claim 1, wherein at least a portion of the image sensor overlaps the active area in the optical-axis direction.

7. The optical instrument according to claim 1, wherein the active area is a display area displaying an image thereon.

8. The optical instrument according to claim 1, wherein at least a portion of the image sensor is disposed under the active area.

9. The optical instrument according to claim 1, wherein the image sensor and the active area are disposed parallel to each other.

10. The optical instrument according to claim 1, wherein the display panel comprises a non-viewing area disposed around the active area.

11. The optical instrument according to claim 1, comprising a first circuit board disposed under the housing.

12. The optical instrument according to claim 11, comprising:
a support member conductively connecting the first circuit board to the second circuit board and supporting the image sensor so that the image sensor is movable.

13. The optical instrument according to claim 11, comprising a support member conductively connecting the first circuit board and the second circuit board.

14. The optical instrument according to claim 1, comprising an elastic member coupled to the housing and the holder.

15. The optical instrument according to claim 1, wherein the connecting portion comprises:
at least one straight portion; and
at least one curved portion having a shape extending from the straight portion in a direction perpendicular to the optical-axis direction so as to be bent to the right or the left.

16. The optical instrument according to claim 1, wherein a width of the connecting portion is less than a width of the first coupling portion and a diameter of the second coupling portion.

17. The optical instrument according to claim 1, wherein the support member is a suspension wire.

18. An optical instrument comprising:
a display panel comprising an active area; and
a camera module configured to receive light passing through the active area,
wherein the camera module comprises:
a first circuit board;
a housing disposed on the first circuit board;
a lens barrel coupled to the housing and fixedly disposed at a position spaced apart from the display panel;
a moving unit comprising a second circuit board disposed to be spaced apart from the first circuit board, a holder disposed on the second circuit board, an image sensor disposed on the second circuit board, and a filter coupled to the holder and disposed between the lens barrel and the image sensor;
a support member configured to support the second circuit board; and
a driving unit configured to move the moving unit in an optical-axis direction,
wherein the driving unit comprises:
a coil disposed on one of the housing and the holder; and
a magnet disposed on the other one of the housing and the holder,
wherein the lens barrel is fixed in the optical-axis direction and in a direction perpendicular to the optical-axis direction, and
wherein the magnet overlaps the coil in the optical-axis direction, and
wherein the support member comprises:
a first elastic member extending in the optical-axis direction coupled to a first terminal of the first circuit board; and
a second elastic member extending in the direction perpendicular to the optical-axis direction and connecting the first elastic member and a second terminal of the second circuit board.

19. An optical instrument comprising:
a display panel comprising an active area; and
a camera module configured to receive light passing through the active area,
wherein the camera module comprises:
a first circuit board;
a housing disposed on the first circuit board;
a lens barrel coupled to the housing and fixedly disposed at a position spaced apart from the display panel;
a moving unit comprising a second circuit board disposed to be spaced apart from the first circuit board, a holder disposed on the second circuit board, and an image sensor disposed on the second circuit board and a filter coupled to the holder and disposed between the lens and the image sensor;
a support member conductively connecting the first circuit board to the second circuit board and supporting the second circuit board;
a coil disposed on one of the housing and the holder; and
a magnet disposed on the other one of the housing and the holder,
wherein the moving unit is configured to move in an optical-axis direction by an interaction between the coil and the magnet,
wherein the lens barrel is fixed in the optical-axis direction and in a direction perpendicular to the optical-axis direction,
wherein the magnet overlaps the coil in the optical-axis direction, and wherein an upper end of the support member extending in the direction perpendicular to the optical-axis direction is coupled to the second circuit board and a lower end of the support member extending in the optical-axis direction is coupled to the first circuit board.

\* \* \* \* \*